United States Patent
Adjakple et al.

(10) Patent No.: US 12,532,241 B2
(45) Date of Patent: Jan. 20, 2026

(54) SIDELINK ADAPTATION PROTOCOL FOR REMOTE UE CONNECTIVITY

(71) Applicant: INTERDIGITAL PATENT HOLDINGS, INC., Wilmington, DE (US)

(72) Inventors: Pascal Adjakple, Great Neck, NY (US); Zhuo Chen, Claymont, DE (US); Rocco Di Girolamo, Laval (CA); Joseph Murray, Schwenksville, PA (US); Guodong Zhang, Woodbury, NY (US); Kyle Pan, Saint James, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 532 days.

(21) Appl. No.: 17/999,264

(22) PCT Filed: May 19, 2021

(86) PCT No.: PCT/US2021/033179
§ 371 (c)(1),
(2) Date: Nov. 18, 2022

(87) PCT Pub. No.: WO2021/236786
PCT Pub. Date: Nov. 25, 2021

(65) Prior Publication Data
US 2023/0199607 A1    Jun. 22, 2023

Related U.S. Application Data

(60) Provisional application No. 63/094,485, filed on Oct. 21, 2020, provisional application No. 63/026,904, filed on May 19, 2020.

(51) Int. Cl.
*H04W 40/02* (2009.01)
*H04W 84/04* (2009.01)
(Continued)

(52) U.S. Cl.
CPC ......... *H04W 40/02* (2013.01); *H04W 84/047* (2013.01); *H04W 88/04* (2013.01); *H04W 92/18* (2013.01)

(58) Field of Classification Search
CPC ..... H04W 40/02; H04W 88/04; H04W 92/18; H04W 76/11; H04W 76/14; H04W 84/047
See application file for complete search history.

(56) References Cited

U.S. PATENT DOCUMENTS

2021/0051512 A1* 2/2021 Hampel ............... H04W 40/22
2021/0058989 A1* 2/2021 Simsek ................ H04L 47/283
(Continued)

FOREIGN PATENT DOCUMENTS

WO    2019/242683 A1    12/2019

OTHER PUBLICATIONS

3rd Generation Partnership Project, "Technical Specification Group Services and System Aspects; Service requirements for the Evolved Packet System (EPS) (Release 17)", 3GPP TS 22.278 V17.1.0, Dec. 2019, 52 pages.

(Continued)

*Primary Examiner* — Oussama Roudani
(74) *Attorney, Agent, or Firm* — Flaster Greenberg P.C.

(57) ABSTRACT

Methods, systems, and devices that may assist in remote UE connectivity. There may be use of an enhanced version of Backhaul Adaption Protocol (BAP) on the sidelink for multi-hop connection oriented sidelink communication or multi-hop connectionless sidelink communication, with additional enhancements to allow multiplexing and demultiplexing of bearers over Relay Link (RaL) RLC channels.

20 Claims, 58 Drawing Sheets

(51) Int. Cl.
H04W 88/04 (2009.01)
H04W 92/18 (2009.01)

(56) References Cited

U.S. PATENT DOCUMENTS

2021/0168852 A1* 6/2021 Panteleev ............. H04L 5/0055
2022/0295375 A1* 9/2022 Wang ................... H04W 76/14

OTHER PUBLICATIONS

3rd Generation Partnership Project, "Technical Specification Group Services and System Aspects; Service requirements for the 5G system; Stage 1 (Release 17)", 3GPP TS 22.261 V17.1.0, Dec. 2019, 83 pages.
3rd Generation Partnership Project, "Technical Specification Group Services and System Aspects; Service aspects; Charging and billing (Release 17)", 3GPP TS 22.115 V17.0.0, Dec. 2019, 32 pages.
"3rd Generation Partnership project; Technical Specification Group Radio Access Network; NR; NR and NG-RAN Overall Description; Stages 2 (Release 16)", 3GPP Standard; Technical Specification;3GPP TS 38.300, 3rd Generation Partnership Project (3GPP), Mobile Competence Centre; 650, Route Des Lucioles;F-06921 Sophia-Antipolis Cedex;France vol. RAN WG2,No. V16.1.0, Apr. 8, 2020, pp. 1-133.
"CR to 38.300 on Integrated Access and Backhaul for NR," Jun. 20, 2020, pp. 23.
3GPP TR 23.752 V0.3.0, "3rd Generation Partnership Project; Technical Specification Group Services and System Aspects; Study on system enhancement for Proximity based Services (ProSe) in the 5G System (5GS) (Release 17)," Jan. 2020, pp. 72.
3GPP TR 36.746 V15.1.1, "3rd Generation Partnership Project; Technical Specification Group Radio Access Network; Study on further enhancements to LTE Device to Device (D2D), User Equipment (UE) to network relays for Internet of Things (IoT) and wearables; (Release 15)," Apr. 2018, pp. 55.
3GPP TS 22.115, Technical Specification Group Services and System Aspects Service aspects; Charging and Billing, version 3.1.0, Apr. 1999, pp. 13.
3GPP TS 22.261: Technical Specification Group Services and System Aspects; Service requirements for next generation new services and markets; V0.1.1, Stage 1, Aug. 2016, pp. 24.
3GPP TS 22.278, Technical Specification Group Services and System Aspects; Service requirements for evolution of the 3GPP system, V1.0.0, Jun. 2006, pp. 15.
3GPP TS 29281 V16.00, "3rd Generation Partnership Project; Technical Specification Group Core Network and Terminals; General Packet Radio System (GPRS) Tunnelling Protocol User Plane (GTPv1-U) (Release 16)," Dec. 2019, pp. 33.
3GPP TS 38340 V1.0.0, "3rd Generation Partnership Project; Technical Specification Group Radio Access Network; NR; Backhaul Adaptation Protocol (BAP) specification (Release 16)," Mar. 2020, pp. 21.
IETF RFC 4960, "Stream Control Transmission Protocol," Sep. 2007, pp. 152.
RP-161303: "Further Enhancements LTE Device to Device, UE to Network Relays for IoT and Wearables," Jun. 13-16, 2016, pp. 7.
RP-193253 (revision of RP-193118) New SID, "Study on NR sidelink relay," Dec. 9-12, 2019, pp. 5.
Townsley a Valencia Cisco Systems a Rubens Ascend Communications G Pall G Zorn Microsoft Corporation B Palter Redback Networks W: "Layer Two Tunneling Protocol "L2TP"; rfc2661.txt", Layer Two Tunneling Protocol "L2TP"; RFC2661.TXT, Internet Engineering Task Force, IETF; Standard, Internet Society (ISOC) 4, Rue Des Falaises CH-1205 Geneva, Switzerland, Aug. 1, 1999, pp. 80.

* cited by examiner

| | | | | | | | | |
|---|---|---|---|---|---|---|---|---|
| D/C | PDU Type | SOURCE | | | | | | Oct 1 |
| SOURCE (cont.) | | | | | | | | Oct 2 |
| SOURCE (cont.) | | | | | | | | Oct 3 |
| SOURCE (cont.) | | | | L-TEID | | | | Oct 4 |
| DESTINATION | | | | | | | | Oct 5 |
| DESTINATION (cont.) | | | | | | | | Oct 6 |
| DESTINATION (cont.) | | | | | | | | Oct 7 |
| Control Data | | | | | | | | Oct 8 |

| | | | | | | |
|---|---|---|---|---|---|---|
| D/C | R | R | R | PDU Type | SRC | Oct 1 |
| SOURCE (cont.) | | | | | | Oct 2 |
| SOURCE (cont.) | | | | | | Oct 3 |
| SOURCE (cont.) | | | | | L-TEID | Oct 4 |
| L-TEID (cont.) | | | | | | Oct 5 |
| DESTINATION | | | | | | Oct 6 |
| DESTINATION (cont.) | | | | | | Oct 7 |
| DESTINATION (cont.) | | | | | | Oct 8 |
| Control Data | | | | | | Oct 9 |

SIDELINK ADAPTATION PROTOCOL FOR REMOTE UE CONNECTIVITY

CROSS-REFERENCE TO RELATED APPLICATIONS

This application is the National Stage Application of International Patent Application No. PCT/US2021/033179, filed May 19, 2021, which claims the benefit of U.S. Provisional Patent Application No. 63/026,904, filed on May 19, 2020, entitled "Sidelink Adaptation Protocol For Remote UE Connectivity," and U.S. Provisional Patent Application No. 63/094,485, filed on Oct. 21, 2020, entitled "Sidelink Adaptation Protocol For Remote UE Connectivity," the contents of both are hereby incorporated by reference herein.

BACKGROUND

LTE Remote UE Release 15 Work

In 3GPP RAN, a Release 15 study item "Further Enhancements LTE Device to Device, UE to Network Relays for IoT and Wearable" was approved (RP-161303: "Further Enhancements LTE Device to Device, UE to Network Relays for IoT and Wearables"). The objective of this SI is to study enhancements to ProSe UE-to-network relaying and to the LTE D2D framework for commercial and public safety applications such as wearable and IoT devices. The resulting protocol stack architecture is captured in FIG. 1 and FIG. 2 (from 3GPP TR 36.746 V15.1.1 Study on further enhancements to LTE Device to Device (D2D), User Equipment (UE) to network relays for Internet of Things (IoT) and wearables; (Release 15)). The detail of the adaptation protocol was not studied.

1.1 NR Integrated Access Backhaul Release 16 Work

In 3GPP RAN, a release 16 study item on "Integrated Access and Backhaul for NR" was approved. The objective of the study is to identify and evaluate potential solutions for the following requirements and aspects associated with the efficient operation of integrated access and wireless backhaul for NR. This work led to the specification of a Backhaul Adaptation Protocol (BAP) (3GPP TS 38340 V1.0.0) in support of data forwarding between a DeNB and a remote UE. The protocol stack that uses this BAP is captured in 38.300 (R2-2002407, CR 0153 to 38.300 on Integrated Access and Backhaul for NR). It should be noted that the BAP does not support multiplexing of different users or bearers with the same QoS level once the corresponding data units are multiplexed onto the backhaul RLC channels, and therefore doesn't provide mechanism at the peer receiver BAP to route the received data units to the correct upper layer protocol instances. This function is instead provided by the GTP-U protocol (3GPP TS 29281 V16.0.0) in the user plane or STCP protocol (Stream Transmission Control Protocol, IETF RFC 4960) in the control plane.

NR Remote UE Release 17 Work

In 3GPP, a release 17 study was conducted by the SA working group SA2 to identify and evaluate architecture enhancements of 5G System design needed to support proximity based services based on SA1 requirements defined in TS 22.278 V17.1.0, TS 22.261 V17.1.0 and TS 22.115 V17.0.0 and determine which of the solutions can proceed to normative specifications. The resulting protocol stack architecture is captured in FIG. 3 and FIG. 4 (from 3GPP TR 23.752 V0.3.0 (Release 17)). The detail of the adaptation protocol was not studied.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in remote UE connectivity.

In an example, there may be use of an enhanced version of Backhaul Adaption Protocol (BAP) on the sidelink for multi-hop connection oriented sidelink communication or multi-hop connectionless sidelink communication, with additional enhancements to allow multiplexing and demultiplexing of bearers over Relay Link (RaL) RLC channels.

In another example, there may be a new intra-device packet routing data link layer protocol denoted Relay Link Tunneling Protocol (RaLTP) that runs over an enhanced BAP on the sidelink or Uu link and provide bearer multiplexing and demultiplexing over the RaL RLC channels, in support of multi-hop connection oriented sidelink communication or multi-hop connectionless sidelink communication.

In another example, there may be a data link layer based end-to-end keep alive procedure, there may be a data link layer based end-to-end flow control procedure, or there may be a data link layer end-to-end RLF indication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 49 illustrates an exemplary Local TEID based RaLAP Control PDU format—Example 1;

FIG. 50 illustrates an exemplary Local TEID based RaLAP Control PDU format—Example 2;

DETAILED DESCRIPTION

Figure 1:
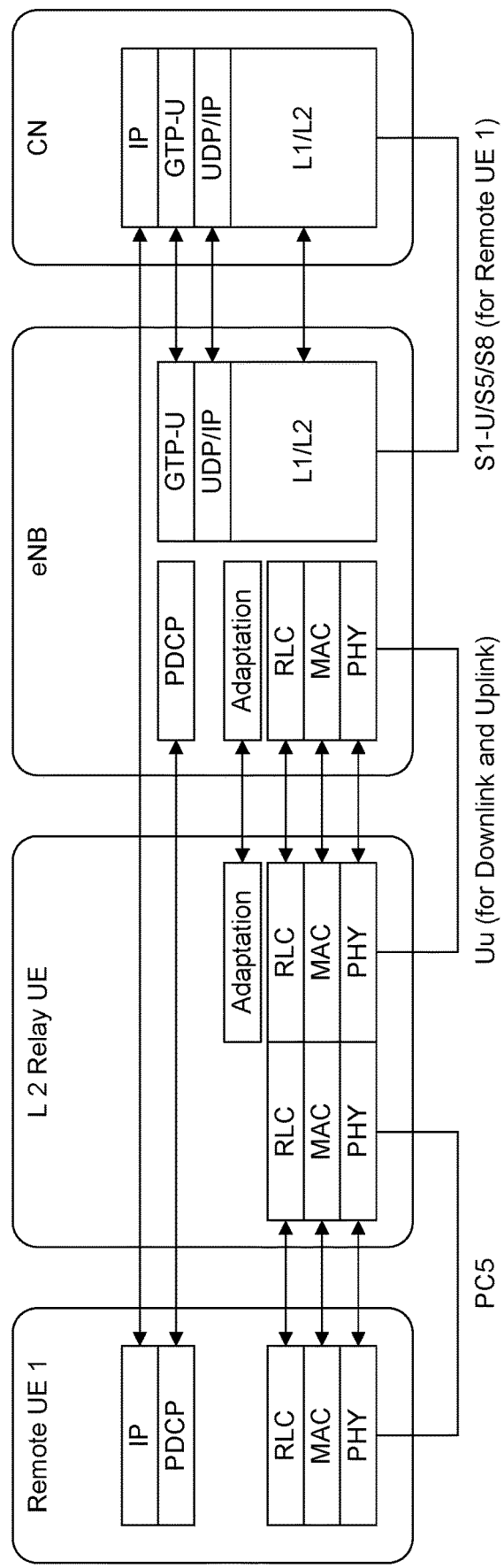
FIG. 1 illustrates an exemplary user plane radio protocol stack for layer 2 evolved UE-to-Network relay (PC5)
Figure 2:
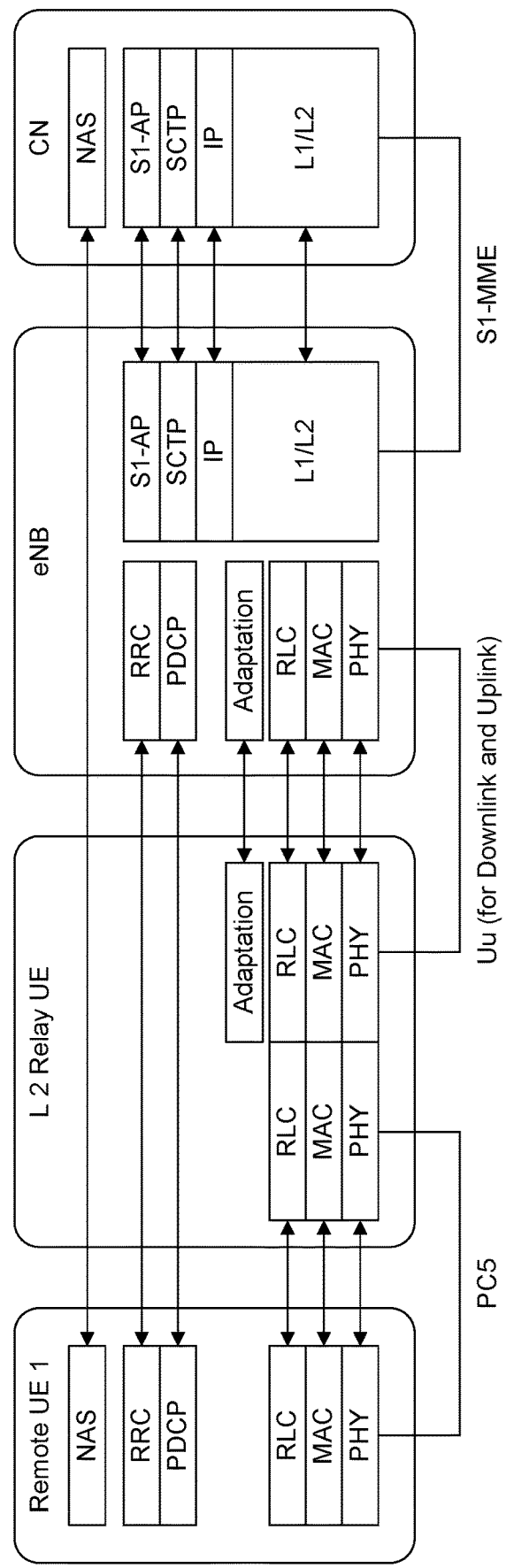
FIG. 2 illustrates an exemplary control plane radio protocol stack for layer 2 evolved UE-to-Network relay (PC5)
Figure 3:
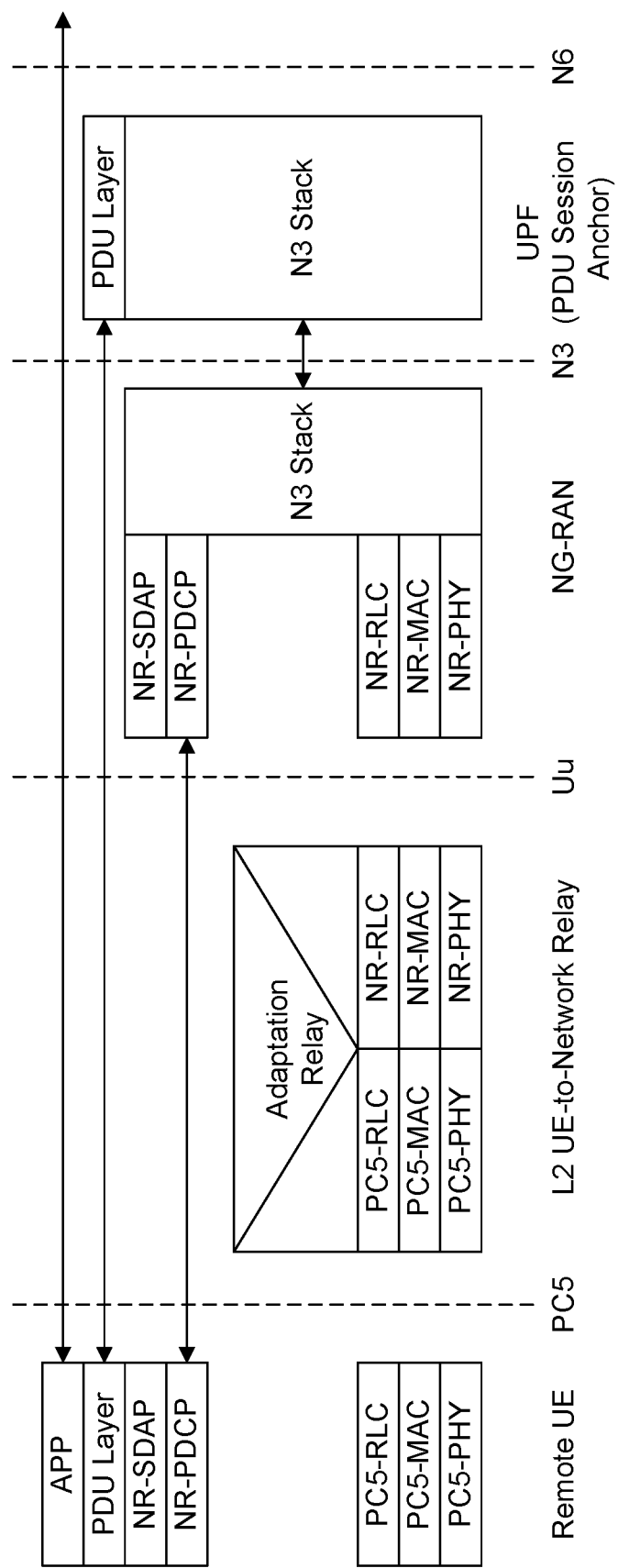
FIG. 3 illustrates an exemplary user plane stack for L2 UE-to-Network Relay UE.
Figure 4:
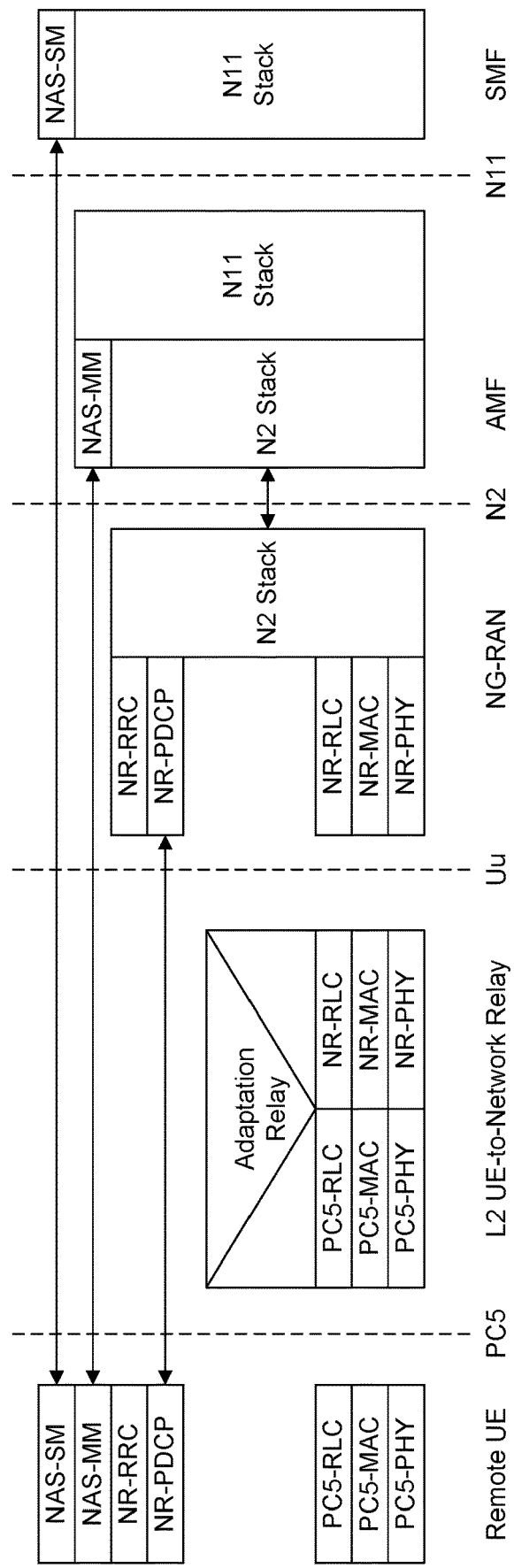
FIG. 4 illustrates an exemplary control plane for L2 UE-to-Network Relay UE.

The following terms are used herein.

Relay Link (RaL): a radio link of a relay node over sidelink (PC5) interface or Uu interface RaL RLC channel: An RLC channel between two nodes, which is used to transport relay link packets.

Ingress RaL RLC channel: An RaL RLC channel on which a packet is received by a node.

Egress RaL RLC channel: An RaL RLC channel on which a packet is transmitted by a node.

Ingress link: A radio link on which a packet is received by a node.

Egress link: A radio link on which a packet is transmitted by a node.

Local Link (LoL): an access radio link over sidelink (PC5) interface or Uu interface Local UE: A UE is a local UE to a node if this UE is served over a local link by this node. The node for which a UE is a local UE may be for example a base station, a Relay UE, a UE-to-Network Relay, a peer UE.

Remote UE: A UE is a remote UE with respect to a node if this UE is served over multi-hop link by this node, wherein the multi-hop link may comprise of only sidelinks, only Uu links or a combination of sidelink and Uu link.

Routing ID: Routing identity that comprises a routing address and a path identity.

Translated Address: this is an address an intermediary node on a communication path uses to override the current destination filed (address) in a packet before forwarding the packet to the next hop. The intermediary node maintains a mapping between the original destination address and the translated address for address translation purposes.

Translated Tunnel Identity: this is a tunnel identity an intermediary node on a communication path uses to override the current TEID filed (tunnel identity) in a packet before forwarding the packet to the next hop. The intermediary node maintains a mapping between the original tunnel identity and the translated tunnel identity for tunnel identity translation purposes.

Translated Path Identity: this is a path identity an intermediary node on a communication path uses to override the current PATH filed (path identity) in a packet before forwarding the packet to the next hop. The intermediary node maintains a mapping between the original path identity and the translated path identity for path identity translation purposes.

Translated Routing Identity: this is a routing identity an intermediary node on a communication path uses to override the current routing identity in a packet e.g., the destination filed (address) and the path field (path identity) in a packet before forwarding the packet to the next hop. The intermediary node maintains a mapping between the original routing identity and the translated routing identity for routing identity translation purposes.

Issues

For 3GPP RAN there is a need to identify mechanisms to support QoS for relaying functionality wherein a remote UE, is served over a multi-hop link that includes Uu link and PC5 interface sidelink(s). Also, there is a need to investigate the impact on user plane protocol stack and control plane procedure in support of such a remote UE. As discussed above, the BAP does not support multiplexing of different users or bearers with the same QoS once the corresponding data units are multiplexed onto the backhaul RLC channels, and therefore doesn't provide mechanism at the peer receiver BAP to route the received data units to the correct upper layer protocol instances. This function is instead provided by the GTP-U protocol (3GPP TS 29281 V16.0.0) in the user plane or STCP protocol (Stream Transmission Control Protocol, IETF RFC 4960) in the control plane. However, UDP/IP is the only path protocol defined to transfer GTP message in version 1 of GTP while UDP/IP or TCP/IP can be used as path protocols for GTP messages in version 0 of the GTP protocol. Because of overhead and complexity, it is likely that UDP/IP or TCP/IP will not be used as path protocol over the sidelink, as highlighted by the protocol stack examples provided in FIG. 1, FIG. 2, FIG. 3, and FIG. 4. Assuming these path protocols are not used, then it might not be efficient to use the GTP or STCP directly over a link adaptation protocol such as BAP, and even if there was a re-use of the BAP over sidelink, additional enhancements such as the ability to differentiate/demultiplex at the peer BAP receiver, different bearers with the same QoS or different users will be needed. In light of this, the 5G NR protocol stack architecture needs to be enhanced to provide data transfer function and QoS support for data exchange between peer remote UEs/RSUs or between a remote UE/RSU and a controller node, such as a base station or an RSU base station.

Disclosed herein are enhancements to the NR protocol stack, for sidelink data connectivity between a remote UE (or a UE-like RSU) and a base station (or a base station like RSU), or for sidelink connectivity between two peer-remote UEs. Disclosed herein is the use of an enhanced version of Backhaul Adaption Protocol (BAP) on the sidelink for multi-hop connection oriented sidelink communication or multi-hop connectionless sidelink communication, with additional enhancements to allow multiplexing and demultiplexing of bearers over Relay Link (RaL) RLC channels. The resulting protocol is an inter-device packet routing data link layer (DLL) protocol denoted Relay Link Adaptation Protocol (RaLAP). Disclosed herein is a new intra-device packet routing data link layer protocol denoted Relay Link Tunneling Protocol (RaLTP) that runs over an enhanced BAP on the sidelink or Uu link and provide bearer multiplexing and demultiplexing over the RaL RLC channels, in support of multi-hop connection oriented sidelink communication or multi-hop connectionless sidelink communication. The RaLTP also provide supports for end-to-end keep-alive mechanism of a multi-hop data link. Disclosed herein are configuration methods for the RaLAP protocol or the RaLTP protocol including data link layer address translation capability at the intermediary hops between the source and destination nodes in support of connectionless packet routing. Disclosed herein is a data link layer based end-to-end keep alive procedure. Disclosed herein is a data link layer based end-to-end flow control procedure. Disclosed herein is a data link layer end-to-end RLF indication.

With reference to the aforementioned enhancement, the subject matter (SM) disclosed herein include the following.

First subject matter for a first device may include instructions stored in the first device which, when executed cause the first device to: control (e.g., use) intra-device packet routing data link layer (DLL) protocol (e.g., RaLTP) for packet routing to or from data link upper layer protocols based on a RaLTP DLL routing entries; control inter-device packet routing DLL protocol (e.g., RaLAP) for packet routing between the first device and a second device based on a RaLAP DLL routing entries; control Quality of Service (QoS) of packet transfer function based on RaLAP and RaLTP DLL QoS entries; perform inter-device packet routing actions on a packet based on a first RaLAP address or RaLAP path identity or a first RaLTP identity; perform intra-device packet routing actions on a packet based on a first RaLAP address or first RaLTP identity; or perform Quality of Service actions for a packet transfer based on a first RaLAP address and first RaLTP identity, or an upper layer protocol identity. Packet routing may be to or from data link upper layer protocols.

The first device may receive from a third device, information indicating parameters which may include the following: a) plurality of entries for control of inter-device packet routing, control of intra-device packet routing, or control of QoS for transfer of a packet from upper layer protocol above RaLAP and RaLTP to next hop, in which each entry may include upper layer protocol IDentity (ID), RaLAP routing ID that includes RaLAP address and RaLAP path ID, translated RaLAP ID that includes a translated RaLAP address and a translated RaLAP path ID, RaLTP ID, translated RaLTP ID, next hop RaLAP address, egress link ID, or egress RLC Channel ID.; b) a plurality of entries for control of inter-device packet routing, control of intra-device packet routing, or control of QoS for transfer of a packet from ingress link RaLAP and RaLTP to next hop, in which each entry may include RaLAP ID that includes RaLAP address and RaLAP path identity, translated RaLAP ID that includes a translated RaLAP address and a translated RaLAP path identity, RaLTP ID, translated RaLTP ID, next hop RaLAP address, ingress link ID, ingress RLC Channel ID, egress link ID, or egress RLC Channel ID; or c) plurality of entries for control of inter-device packet routing, or control of intra-device packet routing of a packet from ingress link RaLAP and RaLTP to upper layer protocol or local link, in which each entry may include RaLAP ID that includes RaLAP address and RaLAP path ID, RaLTP ID, or Upper layer protocol ID.

The parameters associated with the first device of the first subject matter for control of routing or QoS may further be preconfigured into the device or specified by standards, and may include the following: a) a plurality of entries for control of inter-device packet routing, control of intra-device packet routing, or control of QoS for transfer of a packet from upper layer protocol above RaLAP and RaLTP to next hop, in which each entry may include upper layer protocol ID, RaLAP routing ID consisting of RaLAP address and RaLAP path identity, translated RaLAP routing ID that includes a translated RaLAP address and a translated RaLAP path ID, RaLTP ID, translated RaLTP ID, next hop RaLAP address, egress link ID, or egress RLC Channel ID; b) a plurality of entries for control of inter-device packet routing, or control of intra-device packet routing, or control of QoS for transfer of a packet from ingress link RaLAP and RaLTP to next hop, in which each entry may include RaLAP ID that includes RaLAP address and RaLAP path identity, translated RaLAP ID that includes a translated RaLAP address and a translated RaLAP path identity, RaLTP ID, translated RaLTP ID, next hop RaLAP address, ingress link ID, ingress RLC Channel ID, egress link ID, or egress RLC Channel ID; c) in which each entry may include RaLAP ID that includes RaLAP address and RaLAP path ID, RaLTP ID, or Upper layer protocol ID.

The RaLAP or RALTP may further include a transmitting part and a receiving part. The first RaLTP identity may be an identity of a bearer, an identity of a tunnel associated with a bearer, an identity of a tunnel associated with an upper layer protocol above the intra-device routing DLL protocol, or an identity of an upper layer protocol above the intra-device routing DLL protocol. The upper layer protocol may be a Packet Data Convergence Protocol (PDCP). The tunnel may be between the first device and a second device. The tunnel may be a multi-hop tunnel between the first device and the second device. A third device may be a base station, a roadside unit base station, a relay User Equipment (UE), a UE-to-Network (NW) relay, a UE, or a roadside unit UE. The third device may be the same as the second device. The first device or second device may be a base station, a roadside unit base station, a relay UE, a UE-to-NW relay, a UE, or a roadside Unit UE.

The first RaLTP identity may be an identity which is a translation from a second RaLTP identity at a fourth device on the communication path between the first device and the second device. The first RaLAP address may be an address which is a translation from a second RaLAP address at a fourth device on the communication path between the first device and the second device. The fourth device may be a relay UE or a UE-to-NW relay.

Intra-device packet routing actions may be performed on a packet based on a first RaLAP address or a first RaLTP identity and may further include: selecting from the plurality of entries for control of inter-device packet routing, control of intra-device packet routing, or control of QoS for transfer of a packet from upper layer protocol above RaLAP and RaLTP to next hop, in which the entry with its upper layer protocol identity corresponds to the upper layer protocol identity of this packet; selecting the RaLTP identity in the entry selected above as the first RaLTP entity; or including the first RaLTP identity into the Tunnel End Point ID (TEID) field of this packet header.

The performing of inter-device packet routing actions on a packet based on a first RaLAP address or a RaLAP path identity or a first RaLTP identity, may further include: selecting from the plurality of entries for control of inter-device packet routing, control of intra-device packet routing, or control of QoS for transfer of a packet from upper layer protocol above RaLAP and RaLTP to next hop, in which the entry with its upper layer protocol identity corresponds to the upper layer protocol identity of this packet; selecting the RaLAP address from the routing identity in the entry selected above as the first RaLAP address; selecting the path identity from the routing identity in the entry selected above if the path identity is available; or including into the destination field of this packet header the first RaLAP address and if available the path identity.

The performing of Quality of Service actions for a packet transfer based on a first RALAP address and a first RaLTP identity or an upper layer protocol identity may further include: a) selecting from the plurality of entries for control of inter-device packet routing, control of intra-device packet routing, or control of QoS for transfer of a packet from upper layer protocol above RaLAP and RaLTP to next hop, in which the entry with its upper layer protocol identity corresponds to the upper layer protocol identity of this packet; selecting the egress link ID and the egress RLC channel ID in the entry selected above; or submitting the packet to the RLC entity that corresponds to the selected egress link ID and the selected egress RLC channel ID.

The performing of inter-device packet routing actions on a packet based on a first RaLAP address or an RaLAP path identity or a first RaLTP identity may further include: determining the first RaLTP identity as the identity in the Tunnel End point ID (TEID) field of this packet header; determining the first RaLAP address and the RaLAP path identity as the address and path identity in the destination field of this packet header; selecting from the plurality of entries for control of inter-device packet routing, control of intra-device packet routing, or control of QoS for transfer of a packet from ingress link RaLAP and RaLTP to next hop, in which the entry with its RaLAP address corresponds to the first RaLAP address, and whose egress link corresponding to the Next hop RaLAP address is available and its RaLTP identity corresponds to the first RaLTP identity; selecting the egress link corresponding to the next hop RaLAP address in the entry selected above; selecting the translated RaLAP address in the selected entry as the first RaLAP address if RaLAP address translation applies, and including the first RaLAP address into the destination field of this packet header; or selecting the translated RaLTP identity in the selected entry as the first RaLTP identity if RALTP identity translation applies, and including the first RaLTP identity into the TEID field of this packet header.

The performing of Quality of Service actions for a packet transfer based on a first RaLAP address and a first RaLTP identity, or an upper layer protocol identity may further include: selecting from the plurality of entries for control of inter-device packet routing, or control of intra-device packet routing, or control of QoS for transfer of a packet from ingress link RaLAP and RaLTP to next hop, the entry with its ingress link ID corresponds to this packet ingress link, its ingress RLC channel ID correspond to this packet ingress RLC channel, its egress link ID corresponds to selected egress link; selecting the egress RLC channel corresponding to the egress RLC channel ID of the selected entry above; or submitting this packet to the RLC entity that corresponds to the selected egress link ID and the selected RLC channel ID.

The performing of intra-device packet routing actions based on a first RaLAP address and a first RaLTP identity, or an upper layer protocol identity may further include: determining the first RaLTP identity as the identity in the Tunnel End point ID (TEID) field of this packet header; determining the first RaLAP address and the RaLAP path identity as the address and path identity in the destination field of this packet header; selecting from the plurality of entries for control of inter-device packet routing, control of intra-device packet routing, control of QoS for transfer of a packet from ingress link RaLAP and RaLTP to upper layer or local link, the entry with its RaLAP address corresponds to the first RaLAP address, and its RaLTP identity corresponds to the first RaLTP identity; selecting the upper layer protocol identity in the selected entry; removing the RaLAP and RaLTP headers from the packet; or submitting the packet without the RaLAP header and without RaLTP header to the upper layer protocol that corresponds to the selected upper layer protocol identity.

The first device and the second device may exchange end-to-end keep-alive messages. The first device and the second device may be connected through one or more PC5 interface links. The first device and the second device may be connected through one or more PC5 interface link, and at least one Uu interface link. The first RaLTP identity may be coded into the packet header by reusing the reserved bit in the BAP PDU header. The first RaLTP identity may reuse the Tunneling End point ID (TEID) of the Generalized Tunneling Protocol in User Plane (GTP-U). There may be at least one RaLAP entity per RaLAP routing address space or per routing network. The may be at least one RaLTP entity per RaLTP identity space or per routing network. The first device may receive from a third device information in PC5 RRC signaling. The first device may receive from a third device information in Uu RRC signaling. The RaLAP protocol and the RaLTP protocol may constitute one protocol. The third device may be on the communication path between the first device and the second device.

The plurality of entries for control of inter-device packet routing, control of intra-device packet routing, or control of QoS for transfer of a packet from upper layer protocol above RaLAP and RaLTP to next hop may be specific to a RaLAP routing address space, specific to a RaLTP identity space, or specific to a combination of RaLAP routing address space and RaLTP identity space.

The upper layer protocol identity may be submitted to RaLTP protocol, RaLAP protocol with an indication of an RaLAP routing address space, or an indication of an RaLTP identity space, an indication of a combination RaLAP routing address space and RaLTP identity space.

The plurality of entries for control of inter-device packet routing, control of intra-device packet routing, or control of QoS for transfer of a packet from ingress link RaLAP and RaLTP to next hop may be specific to a RaLAP routing address space, specific to a RaLTP identity space, or specific to a combination of RaLAP routing address space and RaLTP identity space.

The plurality of entries for control of inter-device packet routing, control of intra-device packet routing, or control of QoS for transfer of a packet from ingress link RaLAP and RaLTP to upper layer or local link may be specific to a RaLAP routing address space, specific to a RaLTP identity space, or specific to a combination of RaLAP routing address space and RaLTP identity space.

The first device and the second device may exchange end-to-end radio link failure (RLF) indication messages. The first device and the second device may exchange end-to-end flow control message. The and a fifth device may exchange hop-by-hop keep-alive message, with the fifth device being on the communication path between the first device and the second device. The first device and a fifth device may exchange hop-by-hop RLF indication, with the fifth device being on the communication path between the first device and the second device. The first device and a fifth device may exchange hop-by-hop flow control message, with the fifth device being on the communication path between the first device and the second device.

Architecture Option 1
Sidelink Adaptation Protocol Structure and Entities

Figure 5:
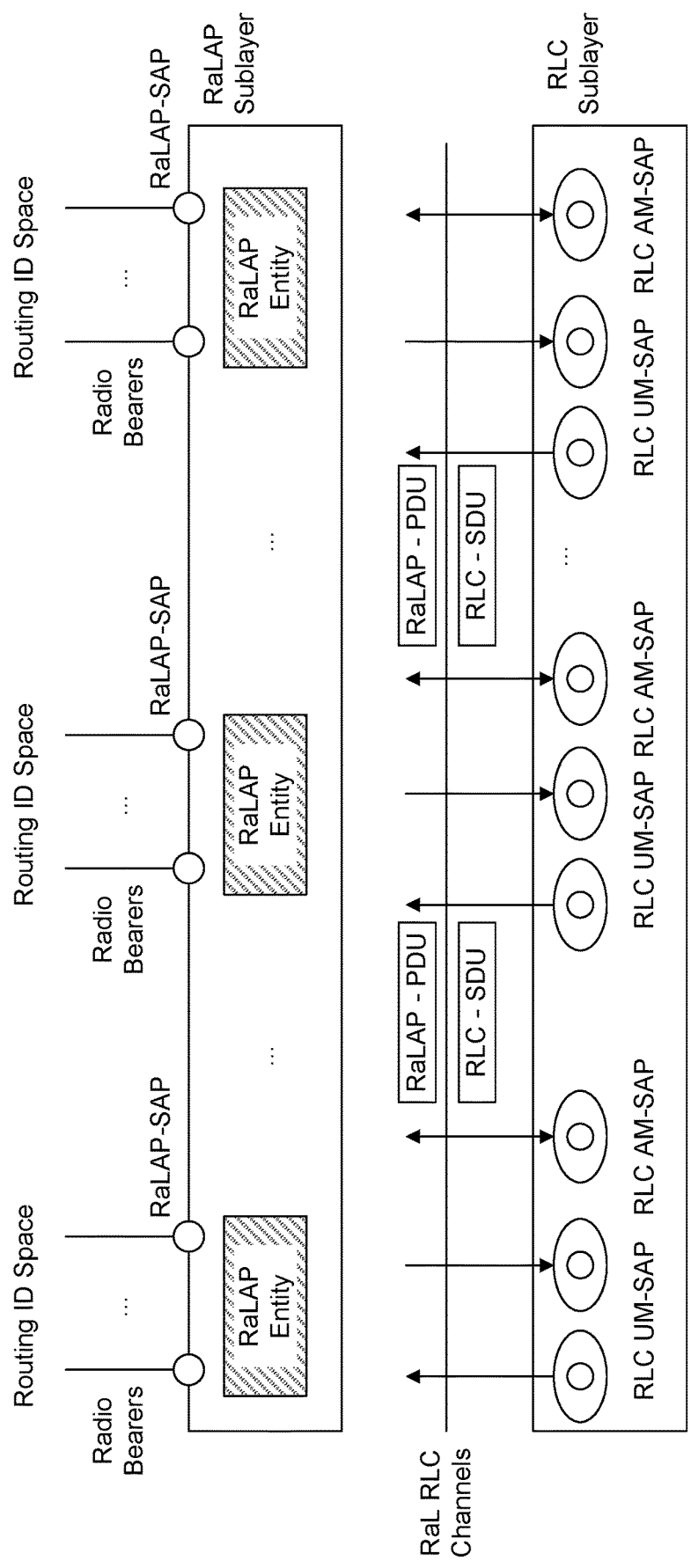
FIG. 5 illustrates an exemplary RaLAP layer, structure view.

To address the issues described herein, a first option of a link adaptation protocol denoted herein Architecture Option 1 is disclosed. This architecture option assumes the use of a BAP with enhancements to enable intra-node routing including multiplexing bearers into RLC channel, and demultiplexing of traffic from RLC channel into corresponding bearers and forwarding to the proper upper layer protocol. The resulting protocol is denoted Relay Link Adaptation Protocol (RaLAP). The FIG. 5 represents one possible structure for RaLAP at a node. In the RaLAP sublayer, in one embodiment it is disclosed one RaLAP entity be instantiated per routing identity space per node. In another embodiment, it is disclosed that the RaLAP layer includes two RaLAP entities per routing identity space per node wherein there is a first RaLAP entity that communicates with a first sub-network or node for e.g. upstream node and, there is a second RaLAP entity that communicate with a second subnetwork or node for e.g. downstream node, wherein the network node including the RaLAP sublayer serves as a communication hop between the two subnetworks served by the two RaLAP entities. Such two entities will be denoted paired RaLAP entities or paired RaLAP entity of one another. In yet another alternative, it is disclosed one RaLAP entity be instantiated per routing address space per node. It should be noted herein that a routing identity comprises a routing address and a path identity. In another embodiment, it is disclosed that the RaLAP layer includes two RaLAP entities per routing address space per node, wherein there is a first RaLAP entity that communicates with a first sub-network or node for e.g. upstream node and, there is a second RaLAP entity that communicate with a second subnetwork or node for e.g. downstream node, wherein the network node including the RaLAP sublayer serves as a communication hop between the two subnetworks served by the two RaLAP entities.

In yet another embodiment, it is disclosed one RaLAP entity per routing ID space per sidelink L2 destination ID or per routing address space per sidelink L2 destination ID, wherein there is one RaLAP entity that communicates with one L2 Destination ID, and a second RaLAP entity that communicate with a second L2 Destination ID, wherein the network node including the RaLAP sublayer serves as a communication hop between the two sidelink L2 Destination IDs.

In another embodiment, it is disclosed one RaLAP entity per routing ID space per sidelink L2 link for e.g. unicast link ID or per routing address space per sidelink L2 link for e.g. unicast link ID, wherein there is one RaLAP entity that communicates with one L2 link ID, and a second RaLAP entity that communicate with a second L2 link ID, wherein the network node including the RaLAP sublayer serves as a communication hop between the two sidelink L2 links.

One or more routing identity space or routing address space may be configured into a node for example a relay UE node 202, a UE-to-Network Relay node 203, a remote UE, an RSU, a gNB, a gNB DU or a gNB CU. A routing identity space or a routing address space may be defined on the basis of one routing identity space or one routing address space per serving gNB, or on the basis of one routing identity space or one routing address space per a peer destination remote UE, or on the basis of one routing identity space or one routing address space per source UE, or on the basis of one routing identity space or one routing address space per layer-2 destination ID, or on the basis of one routing identity space or one routing address space per routing tree or on the basis of one per routing network.

It should be noted that when there is only one RaLAP routing identity space or routing address space per node, then the qualifying terms used herein, wherein references are made to "per routing ID space" or "per routing address space" can be omitted. For example, the term "per routing address space per L2 Destination ID" becomes "per L2 Destination ID".

Each RaLAP entity has a transmitting part and a receiving part on the node that implements the RaLAP entity. Furthermore, the transmitting part has a corresponding receiving entity of an RaLAP entity at the communicating peer node across a sidelink or across a Uu link as illustrated in in FIG. 6.

Figure 6:
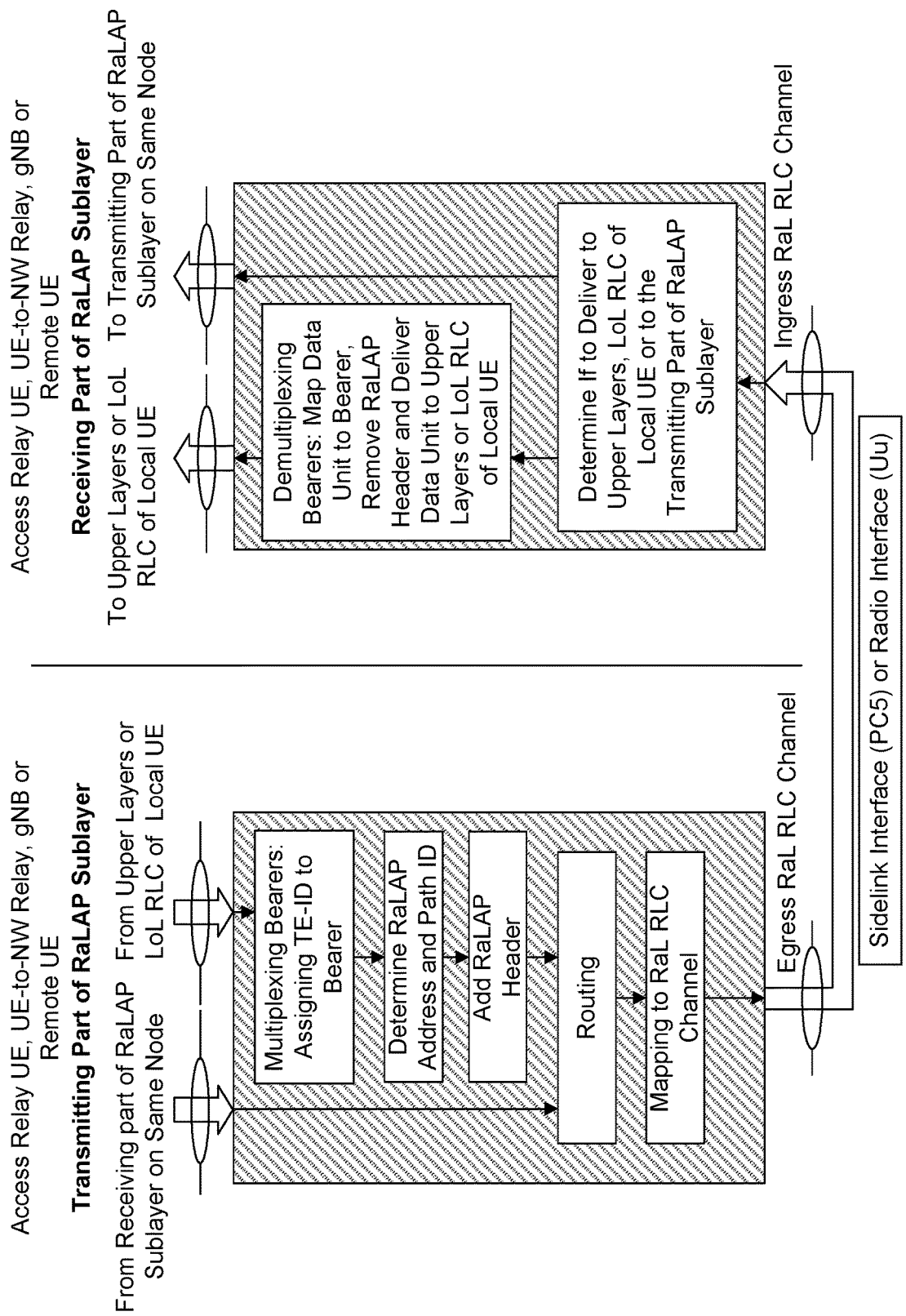
FIG. 6 illustrates an exemplary functional view of RaLAP sublayer.

The FIG. 6 shows an example of the functional view of the RaLAP sublayer at a node. In this example, the receiving part on the RaLAP entity delivers RaLAP PDUs to the collocated transmitting part on the RaLAP entity. Alternatively, the receiving part may deliver RaLAP SDUs to the collocated transmitting part. When passing RaLAP SDUs, the receiving part removes the RaLAP header and the transmitting part adds the RaLAP header with the same RaLAP routing ID as carried on the RaLAP PDU header prior to removal. Passing RaLAP SDUs in this manner is therefore functionally equivalent to passing RaLAP PDUs, in implementation. In the remaining of this disclosure, RaLAP SDU or RaLAP PDU is simply referred to as RaLAP data units or RaLAP packet unless indicated otherwise.

Services

Services Provided to Upper Layers

The following services may be provided by the RaLAP sublayer to upper layers: Data transfer Service Expected from Lower Layers An RaLAP sublayer expects the following services from lower layers per RLC entity: acknowledged data transfer service or unacknowledged data transfer service.

Functions

The RaLAP support the following functions: data transfer, inter-node routing, intra-node routing, QoS requirements, Hop-by-hop flow control feedback signaling, end-to-end flow control feedback signaling, hop-by-hop RLF indication, end-to-end RLF indication, hop-by-hop keep alive indication, or end-to-end keep alive indication.

Inter-node routing may include the following: determination of RaLAP destination and path for packets from upper layers; determination of transmitting part of the RaLAP sublayer on the same node for routing to next hop of packets from receiving part of the RaLAP sublayer on the same node; In other words, the RaLAP sublayer must determine the RaLAP entity to use on a node for routing to next hop of packets received from another RaLAP entity on the same node; routing of packets to next hop; differentiating traffic to be delivered to upper layers from traffic to be delivered to egress link; or differentiating traffic to be delivered over SL egress link versus traffic to be delivered over Uu egress link.

Intra-node routing may include the following: differentiating traffic to be delivered to upper layers from traffic to be delivered to egress link; or demultiplexing of bearers, e.g., demultiplexing of traffic mapped to the same SL RLC channel, but designated to different upper layer protocol entities for example PDCP entities within the same node.

Support for QoS requirements may include the following: Multiplexing of bearers into RLC channels e.g., determining upper layer protocol entities for e.g. PDCP entities whose traffics are to be mapped to the same SL RLC channel, e.g., determination of upper layer protocol identity for e.g. PDCP entity identity for packet multiplexing and including such an identity into the RaLAP header. In the remaining in the remaining disclosure, this identity will be denoted bearer identity or bearer ID for short, or an identity of a tunnel associated with a bearer, or an identity of a tunnel associated with an upper layer protocol above the RaLAP protocol, or an identity of an upper layer protocol above the RaLAP protocol; or determination of egress SideLink (SL) RLC channels for packets routed to next hop.

End-to-End Protocol Stack and L2 Structures

In this section, various alternatives of end-to-end protocols that integrates the RaLAP into the data link layer e.g., Layer-2 (L2) protocols are disclosed.

End-to-End Protocol Stack

Option 1a

In option 1a, the protocol stack in the remote UE 201 doesn't include the RaLAP protocol. Instead the RaLAP protocol resides in the Relay UE 202, the UE-to-Network relay 203, or in the base station 204.

Figure 7:
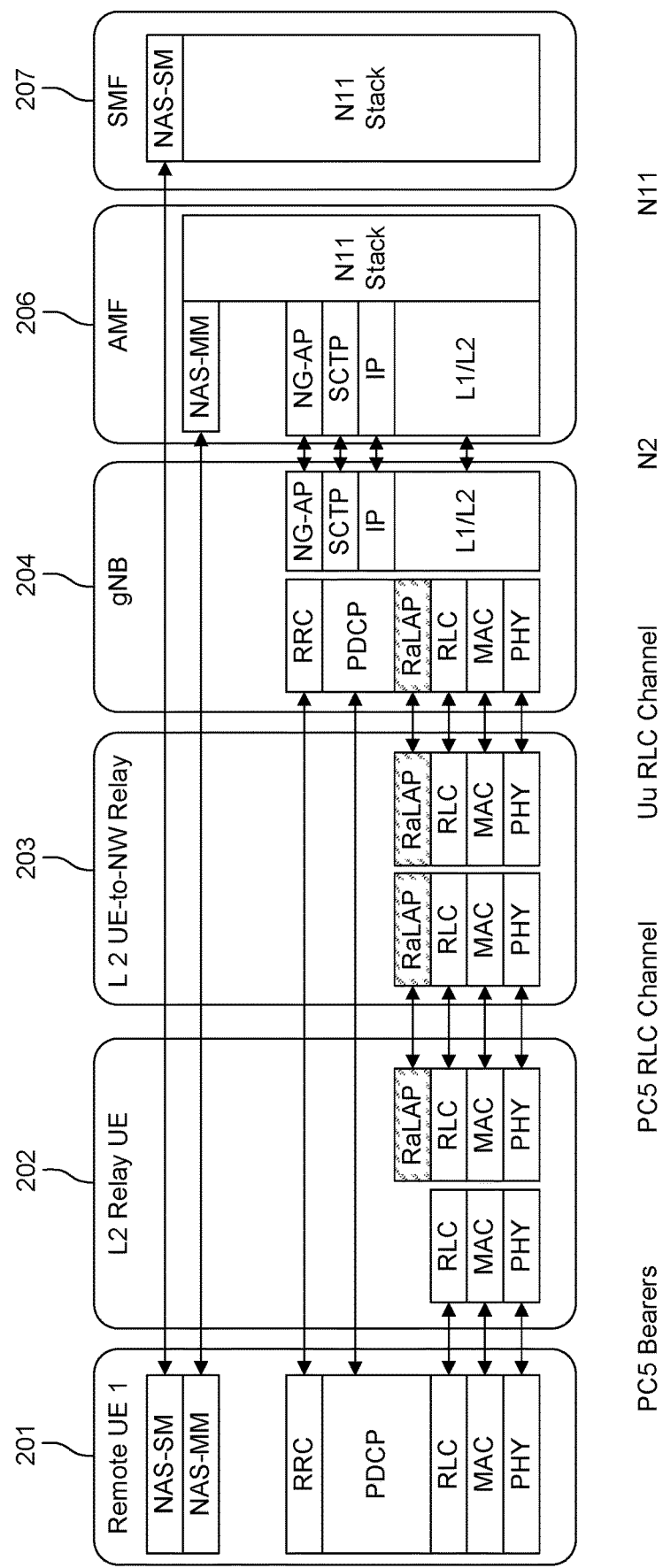
FIG. 7 illustrates an exemplary RaLAP based E2E CP PS—Option 1a, Use Case 1 with Communication Through NW.
Figure 8:
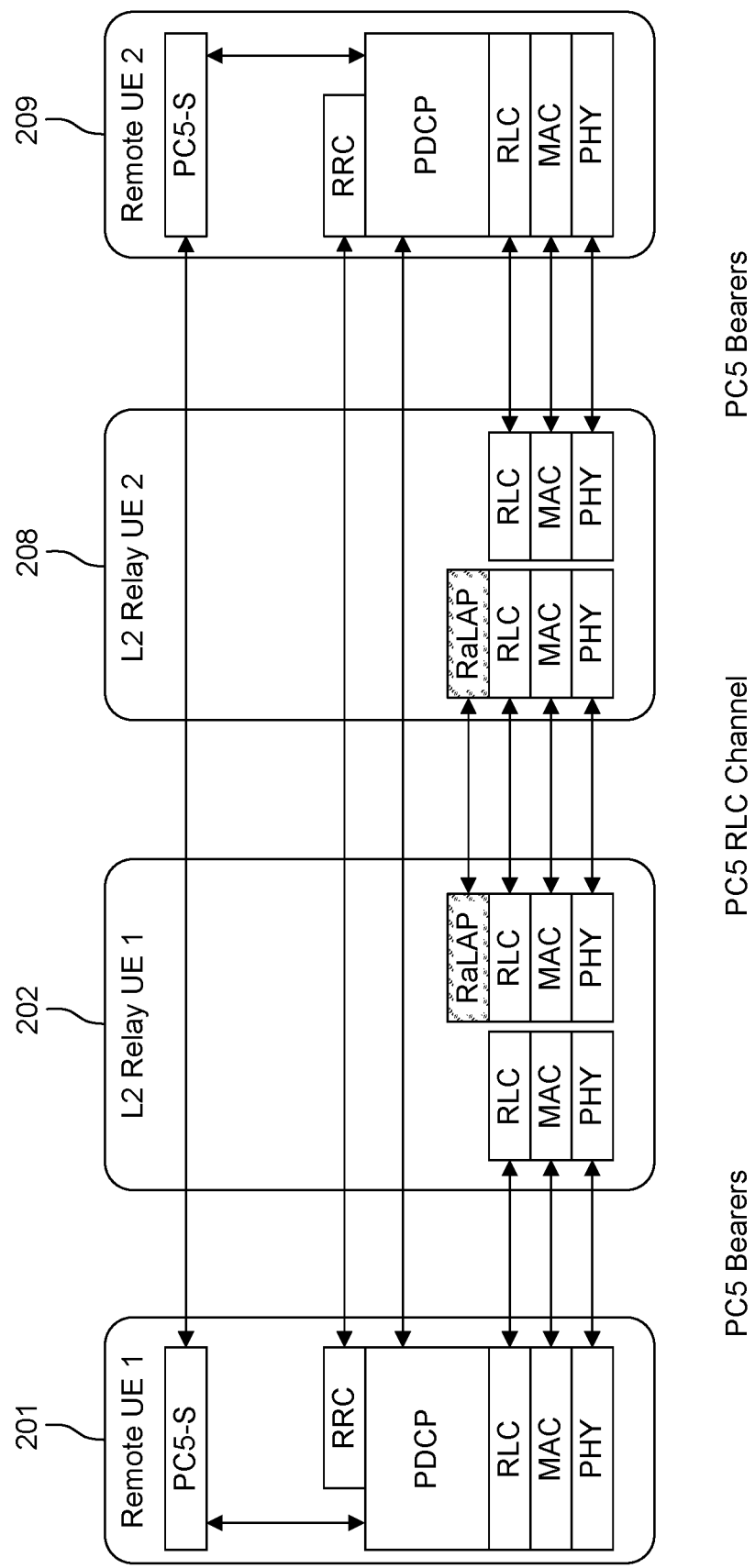
FIG. 8 illustrates an exemplary RaLAP based E2E CP PS—Option 1a, Use Case 2 with Sidelink Only Communication.
Figure 9:
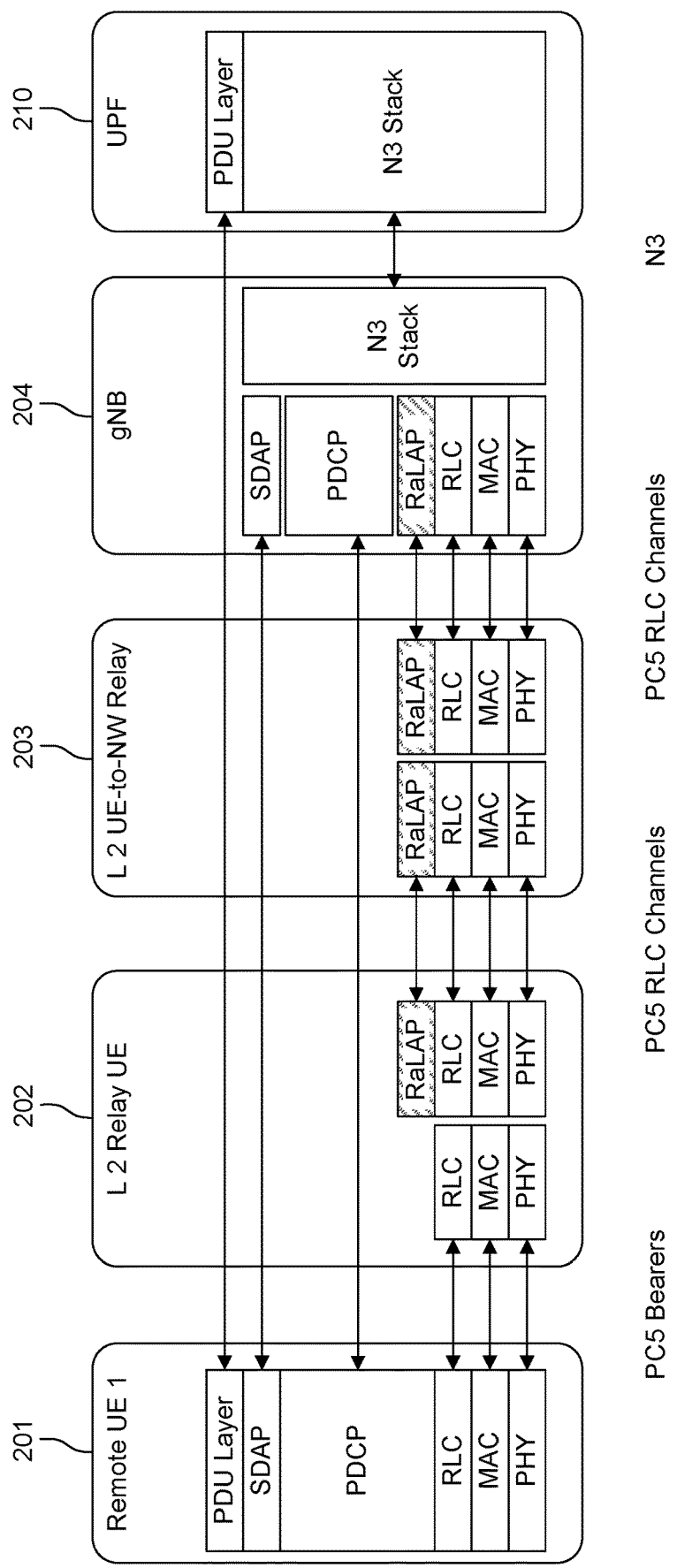
FIG. 9 illustrates an exemplary RaLAP based E2E UP PS—Option 1a, Use Case 1 with Communication Through NW.
Figure 10:
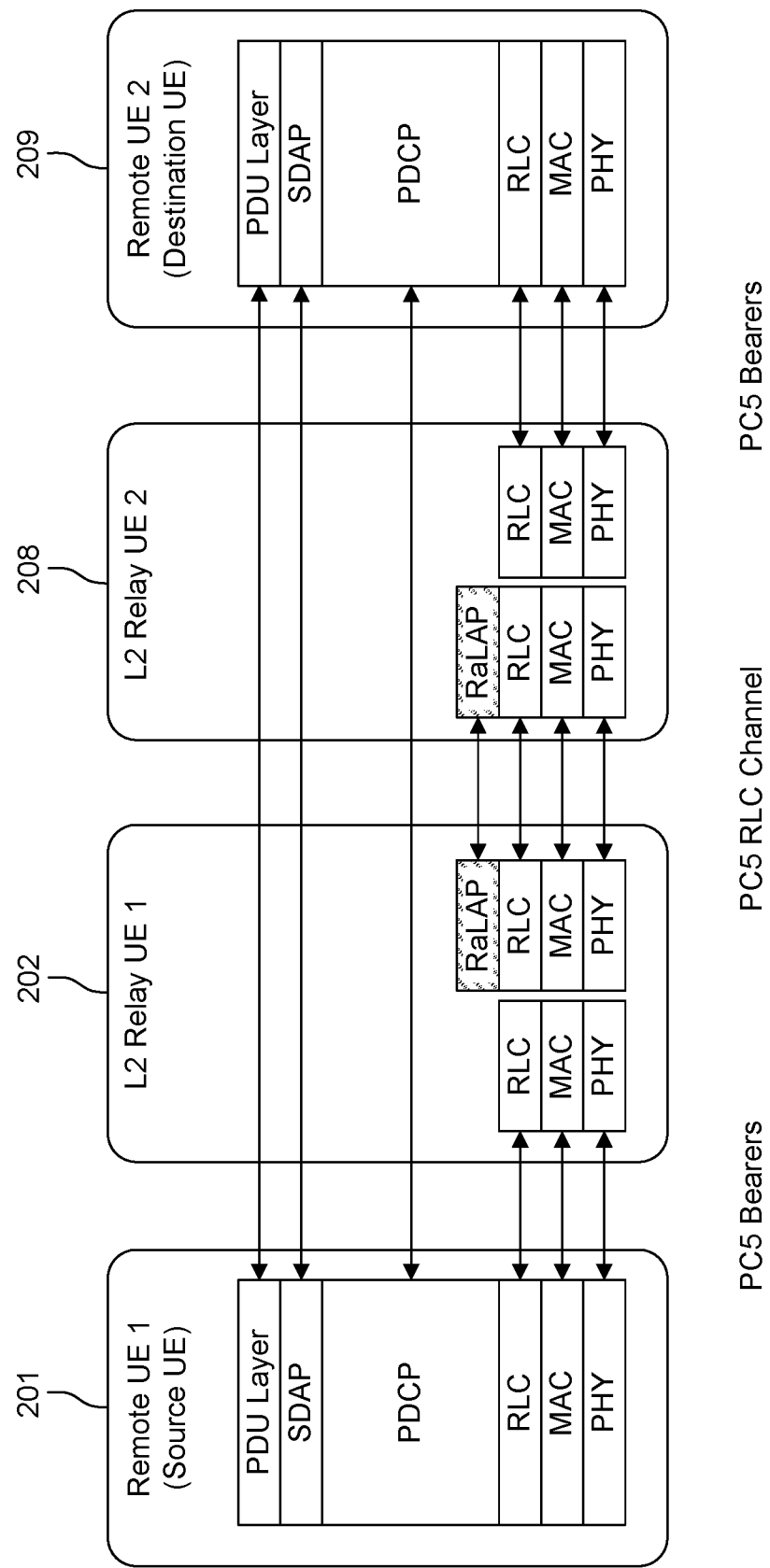
FIG. 10 illustrates an exemplary RaLAP based E2E UP PS—Option 1a, Use Case 2 with Sidelink Only Communication.

This protocol architecture option may be used for connection-oriented communication or connectionless communication wherein the nodes that implements the RaLAP such as the Relay UE 202 or the UE-to-Network relay 203 may be configured with RaLAP configuration information as described herein. The base station 204 (e.g., FIG. 7) may configure into various nodes in the communication path (e.g., FIG. 7 or FIG. 9) to the remote UE 201, the necessary configuration parameters for RaLAP operation. The configuration signaling may use RRC dedicated signaling, RRC common signaling, or a combination thereof. Similarly, a remote UE 201 (e.g., FIG. 8) or a third entity such as an RSU may configure into various nodes in the communication path (e.g., FIG. 8 or FIG. 10) to the remote UE 201, the necessary configuration parameters for RaLAP operation. The configuration signaling may use RRC dedicated signaling, or RRC common signaling or a combination thereof. Additionally, the adjacent nodes e.g., nodes connected with a non-multi-hop link may maintain local peer-to-peer control plane connection or communication, for example at the RRC sublayer or the PC5-S sublayer, in support for example of local configuration information exchange between adjacent nodes. For example, in the example of FIG. 8, an RRC or PC5-S communication or connection could exist between Remote UE 201 and L2 Relay UE 201. Similarly, an RRC or PC5-S communication or connection could exist between the Remote UE 202 and the L2 Relay UE 208, wherein these RRC communication or connections may be used for local peer-to-peer information exchange in support of operation of RaLAP protocol through the intermediary hops in the communication path between the two remotes UEs, as illustrated in FIG. 8 or FIG. 10. Such communication arrangement could be used for connectionless RaLAP communication on the paths between L2 Relay UE 202 and UE-to-Network relay 203 which might include multiple hops.

Option 1b

Figure 11:
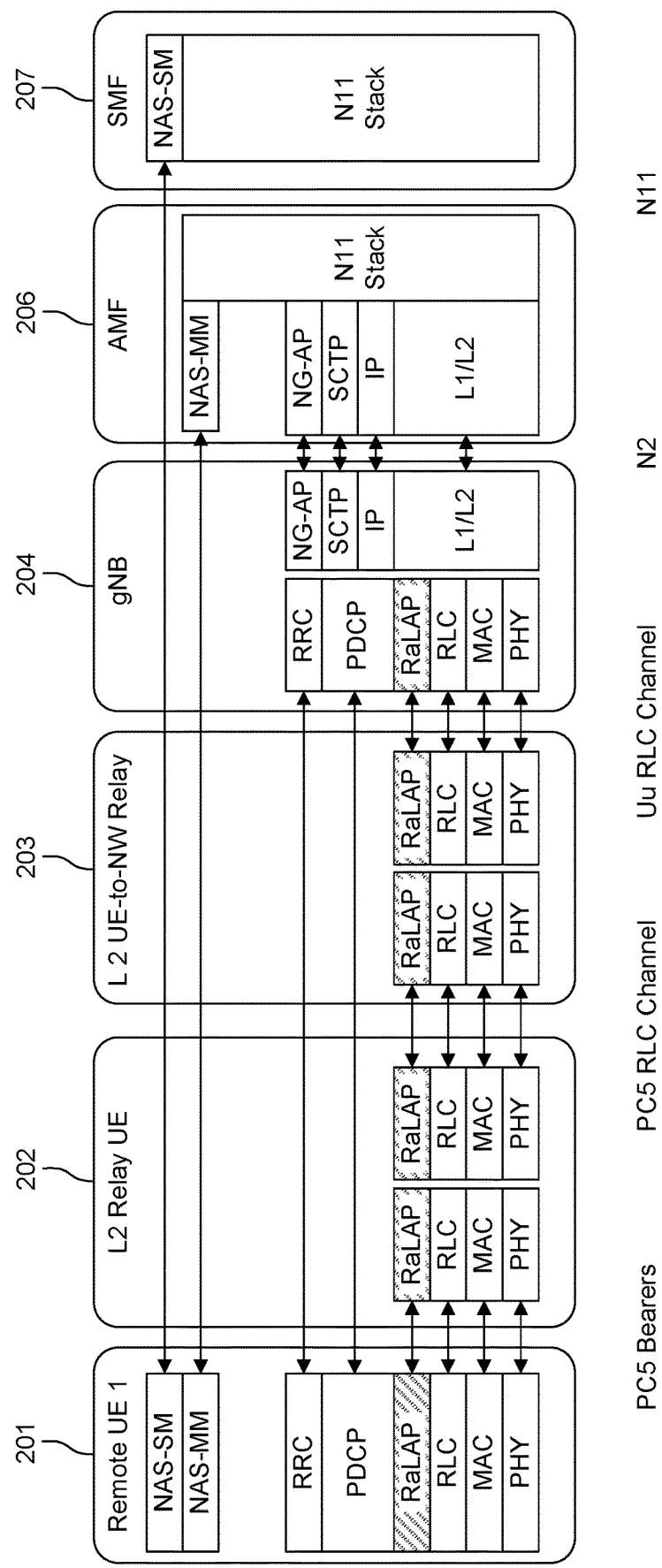
FIG. 11 illustrates an exemplary RaLAP based E2E CP PS—Option 1b, Use Case 1 with Communication Through NW.
Figure 12:
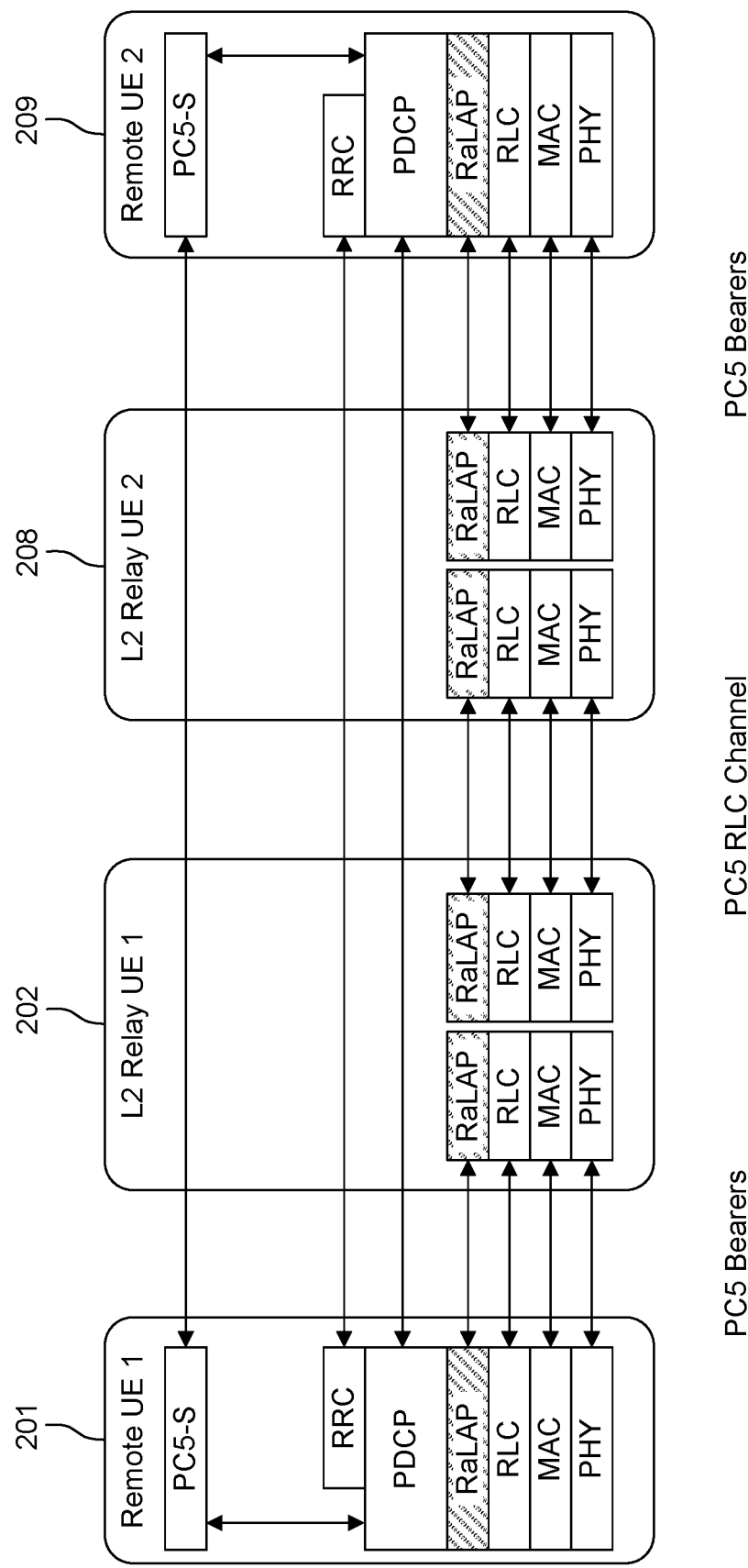
FIG. 12 illustrates an exemplary RaLAP based E2E CP PS—Option 1b, Use Case 2 with Sidelink Only Communication.
Figure 13:
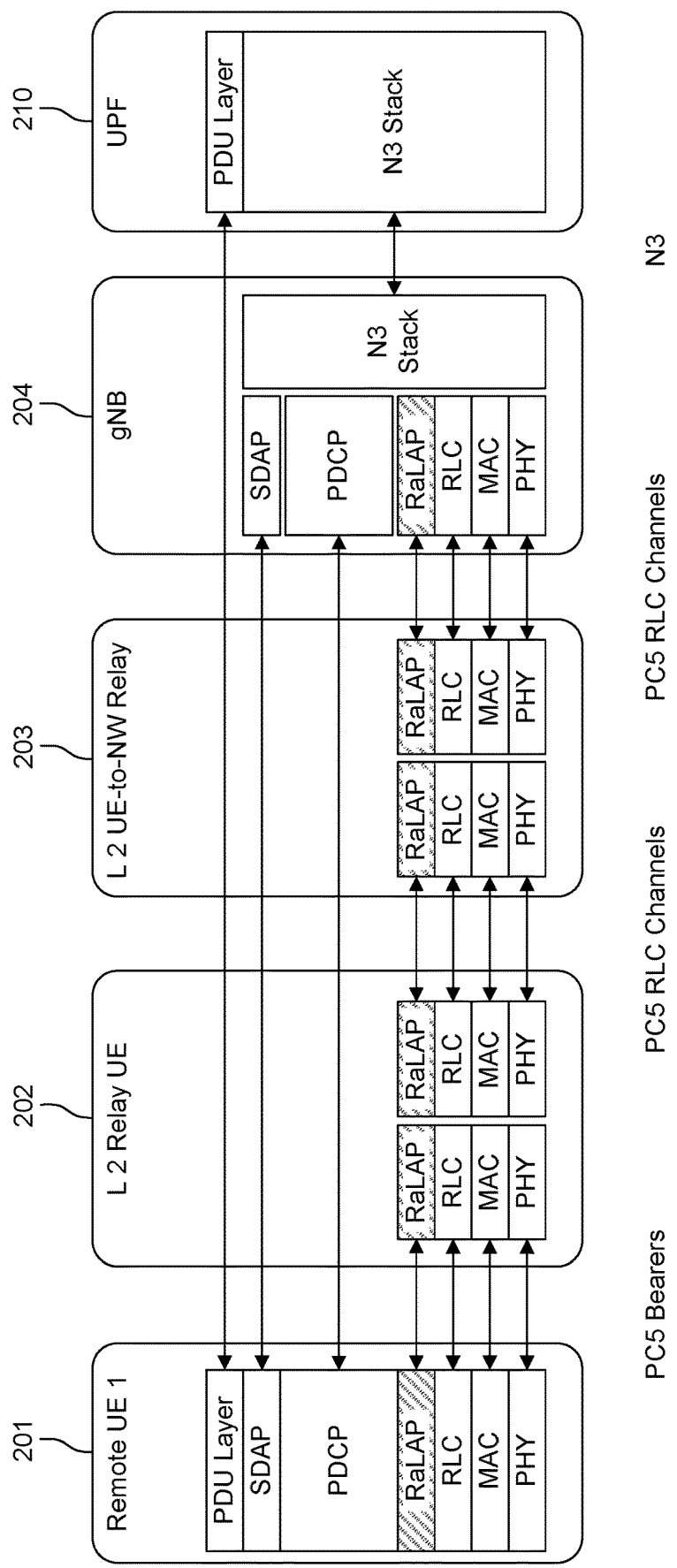
FIG. 13 illustrates an exemplary RaLAP based E2E UP PS—Option 1b, Use Case 1 with Communication Through NW.
Figure 14:
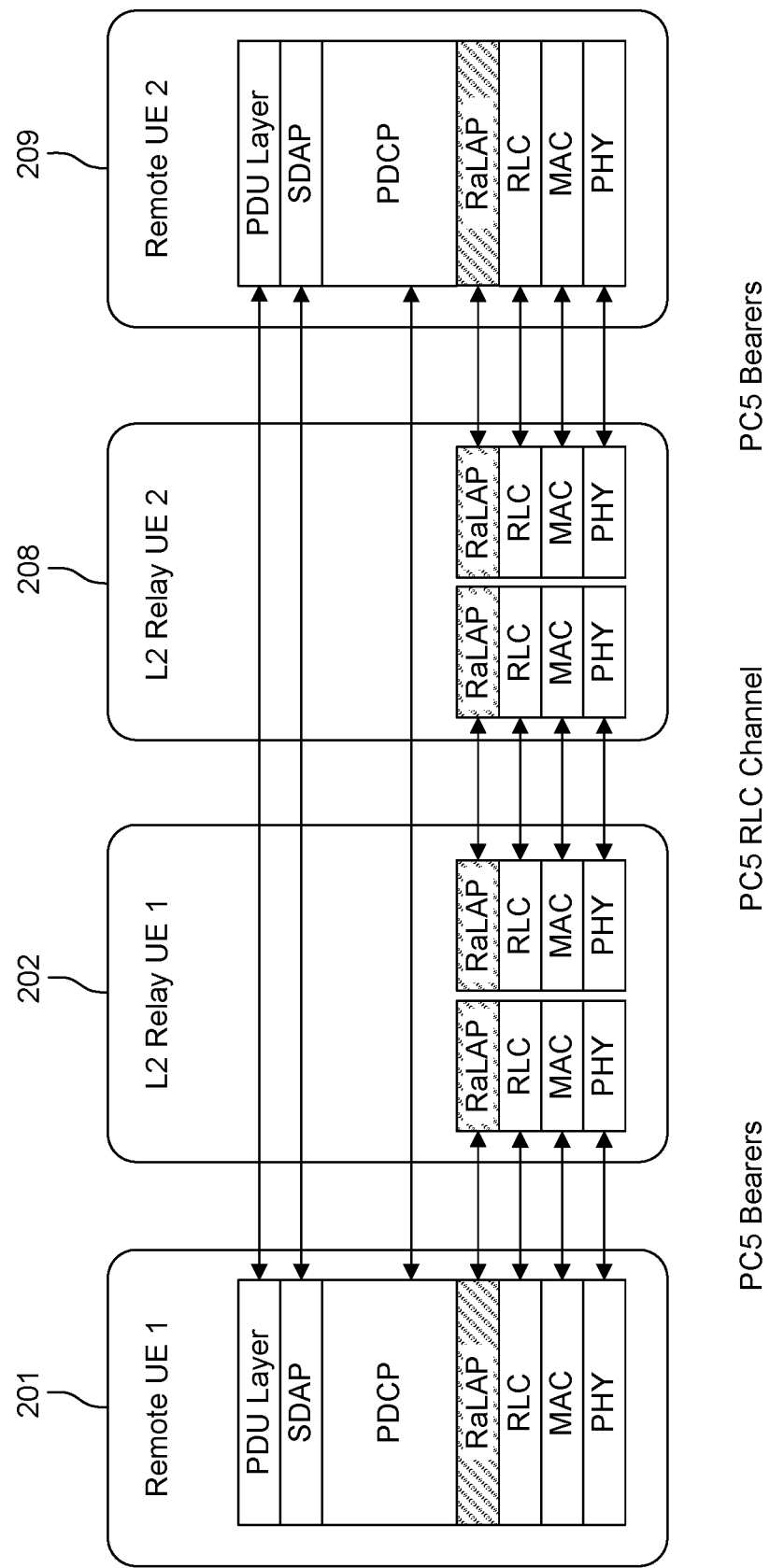
FIG. 14 illustrates an exemplary RaLAP based E2E UP PS—Option 1b, Use Case 2 with Sidelink Only Communication.

In option 1b, the protocol stack in the remote UE 201 also includes the RaLAP protocol. This protocol architecture option may also be used for connection-oriented communication or connectionless communication wherein the nodes that implements the RaLAP such as the UE 201, the Relay UE 202, or the UE-to-Network relay 203 may be configured with RaLAP configuration information as described herein. The base station 204 (FIG. 11) may configure into the various node in the communication path (FIG. 11 or FIG. 13) to the remote UE 201 including the remote UE 201, the necessary configuration parameters for RaLAP operation. The configuration signaling may use RRC dedicated signaling, RRC common signaling, or a combination thereof. Similarly, a remote UE 201 (FIG. 12) or a third entity such as an RSU may configure into the various nodes in the communication path (FIG. 12 or FIG. 14) to the remote UE 201, the necessary configuration parameters for RaLAP operation. The configuration signaling may use RRC dedicated signaling, or RRC common signaling or a combination thereof. Additionally, the adjacent nodes e.g., nodes connected with a non-multi hop link may maintain local peer-to-peer control plane connection or communication, for example at the RRC sublayer or the PC5-S sublayer, in support for example of local configuration information exchange between adjacent nodes. For example, in the example of FIG. 12, an RRC or PC5-S communication or connection could exist between Remote UE 201 and L2 Relay UE 201. Similarly, an RRC or PC5-S communication or connection could exist between the Remote UE 209 and the L2 Relay UE 202, wherein these RRC communication or connections may be used for local peer-to-peer information exchange in support of operation of RaLAP protocol through the intermediary hops in the communication path between the two remotes UEs as illustrated in FIG. 12 or FIG. 14. Such communication arrangement could be used for connectionless RaLAP communication on the paths between L2 Relay UE 202 and UE-to-Network relay 203 which might include multiple hops.

L2 Structure

Figure 15:
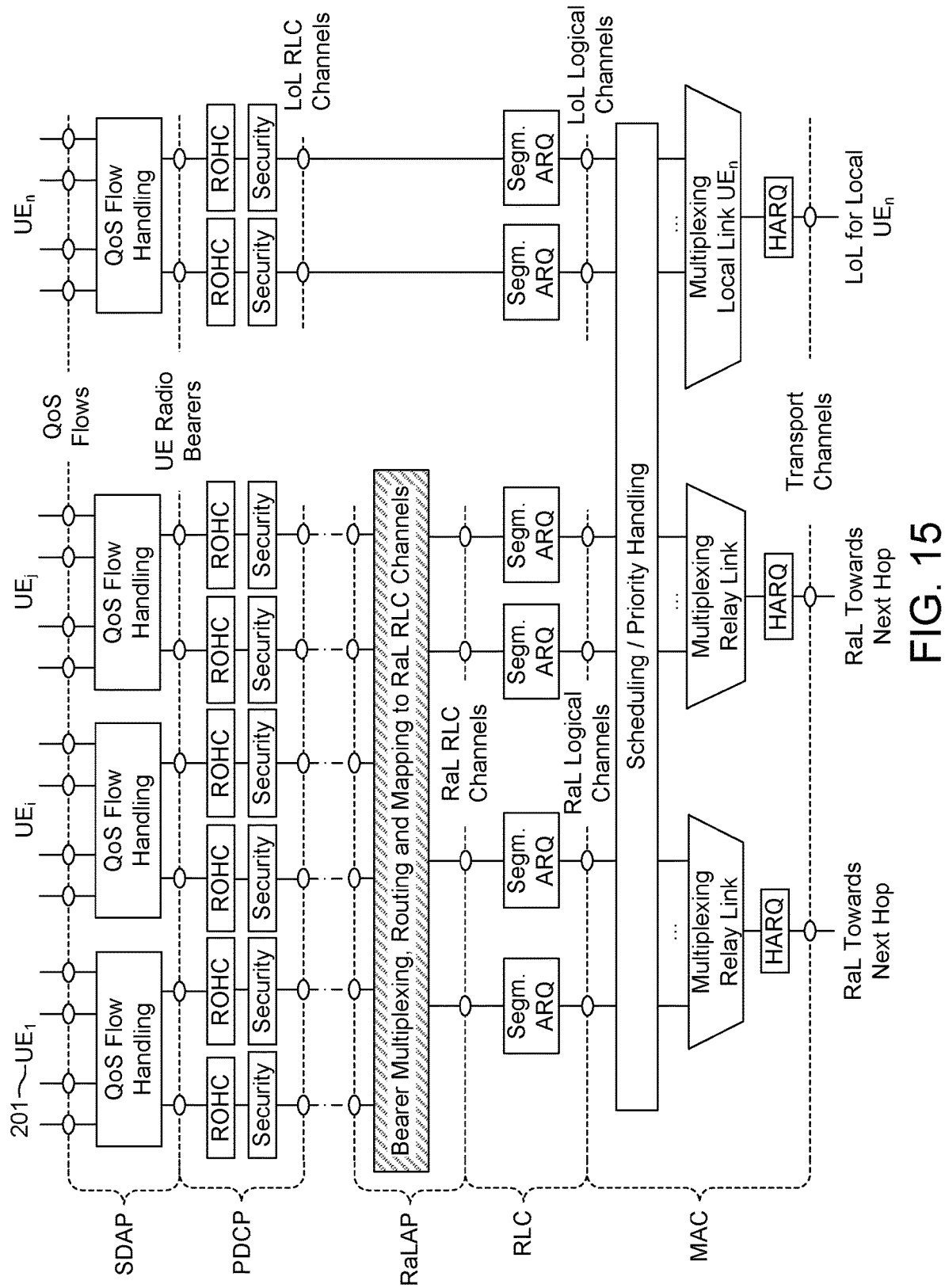
FIG. 15 illustrates an exemplary DL L2-structure for user plane at gNB.
Figure 16:
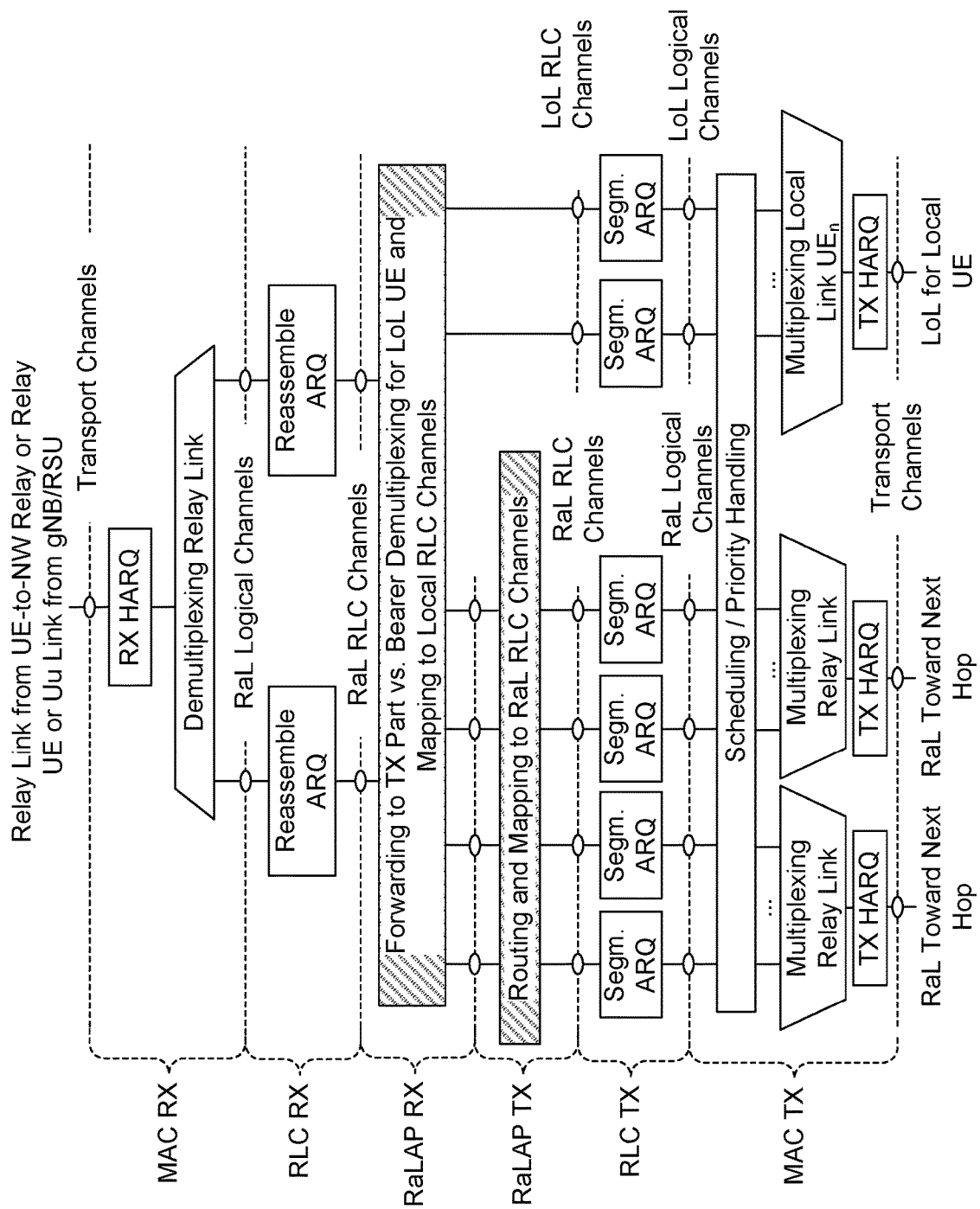
FIG. 16 illustrates an exemplary DL L2 Structure at Relay UE or UE-to-NW Relay.
Figure 17:
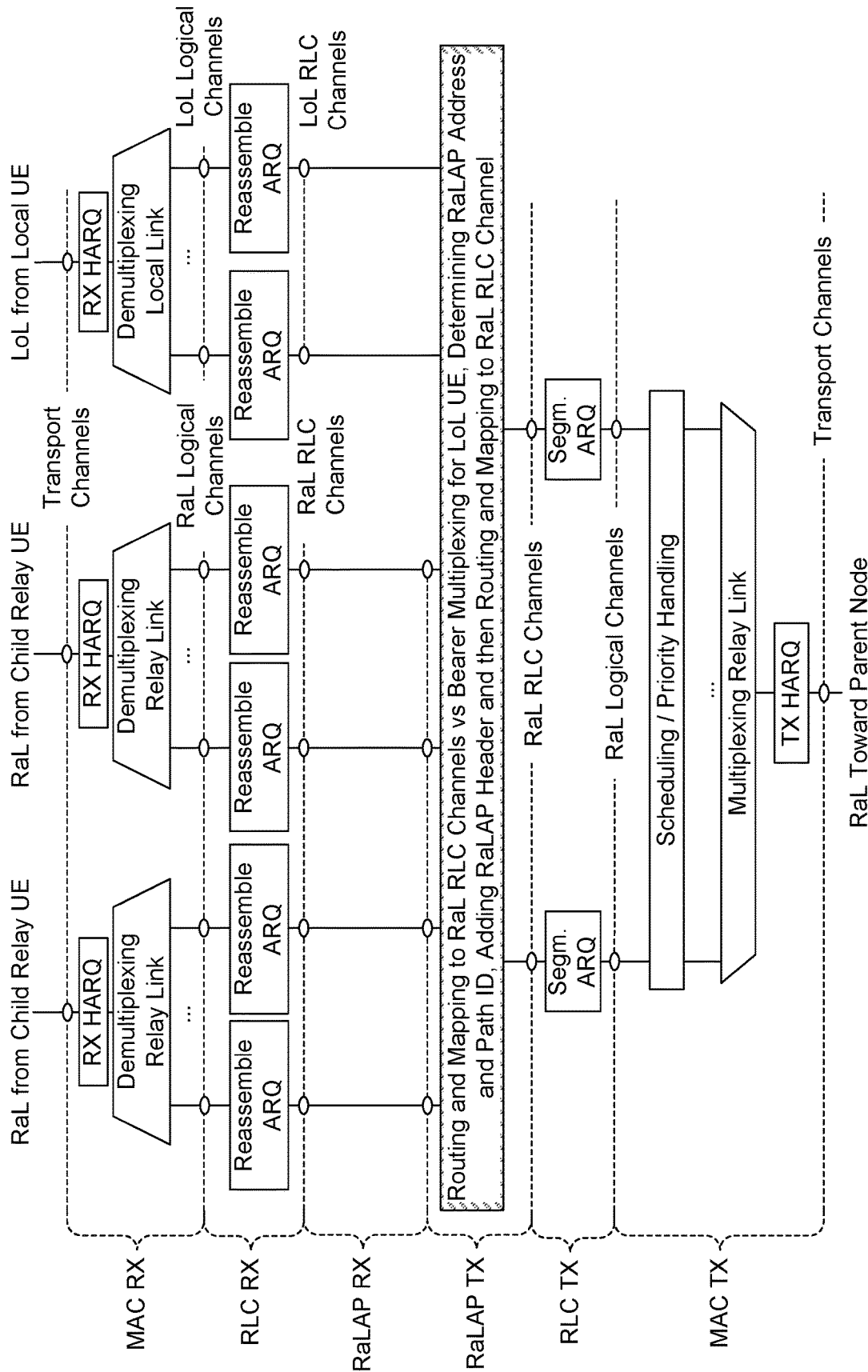
FIG. 17 illustrates an exemplary UL L2 Structure at Relay UE or UE-to-NW Relay.
Figure 18:
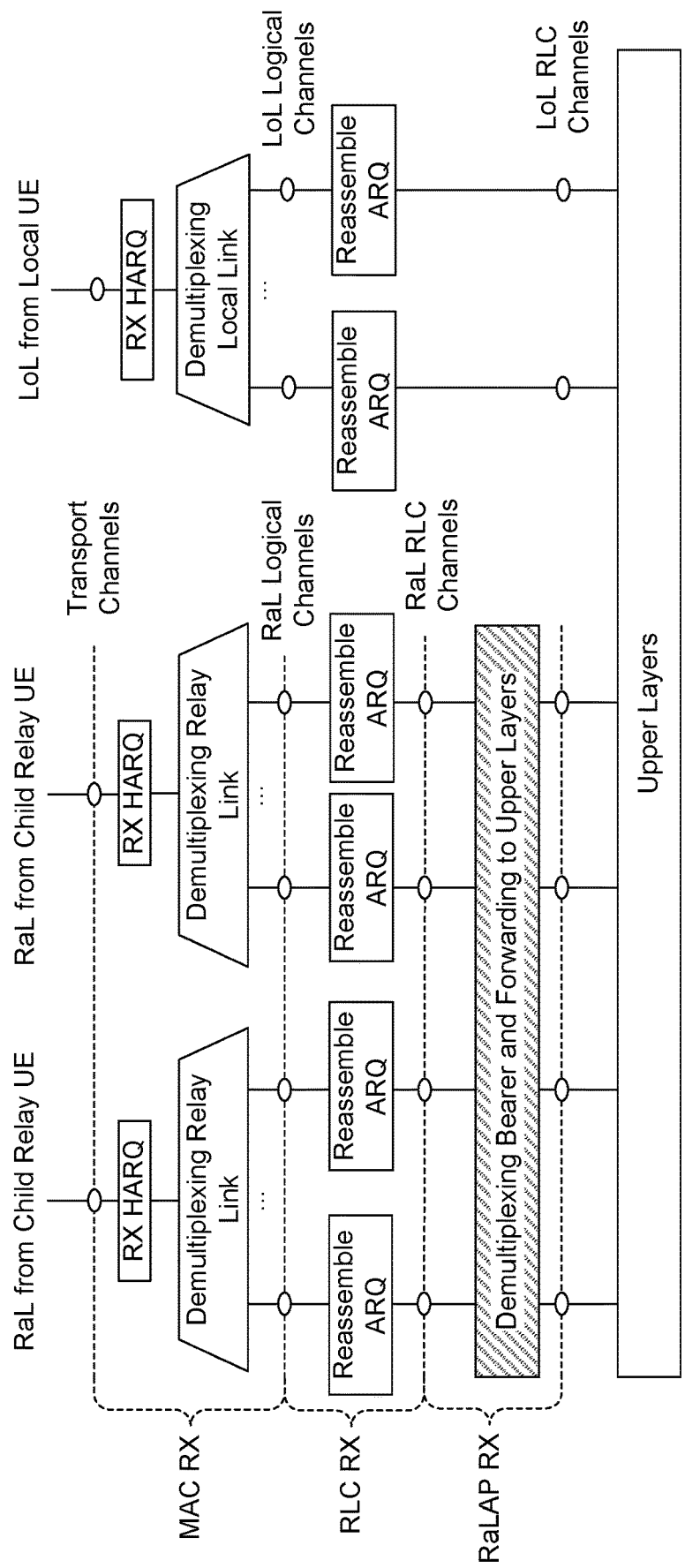
FIG. 18 illustrates an exemplary UL L2 Structure at gNB.

The FIG. 15 illustrates the downlink Layer-2 (L2) data structure including the RaLAP protocol, for the user plane at a gNB. The FIG. 16 illustrates the downlink L2 data structure including the RaLAP protocol, for the user plane at a Relay UE node 202 or a UE-to-Network relay node 203. The FIG. 17 illustrates the uplink L2 data structure including the RaLAP protocol, for the user plane at a Relay UE node 202 or a UE-to-Network relay node 203. The FIG. 18 illustrates the uplink L2 data structure including the RaLAP protocol, for the user plane at a gNB 204. It should be noted that while the terms downlink or uplink are used to describe the direction of the traffic, the design concepts captured by these figures may not be limited this characterization. For example, for use cases involving communication between two peer remote UEs, e.g., UE 201 and UE 209, downlink direction versus uplink direction may be arbitrarily decided. The term downstream might also be used instead of downlink. Similarly, the term upstream might be used instead of uplink.

Architecture Option 2
Sidelink Adaption Protocol Structure and Entities

Figure 19:
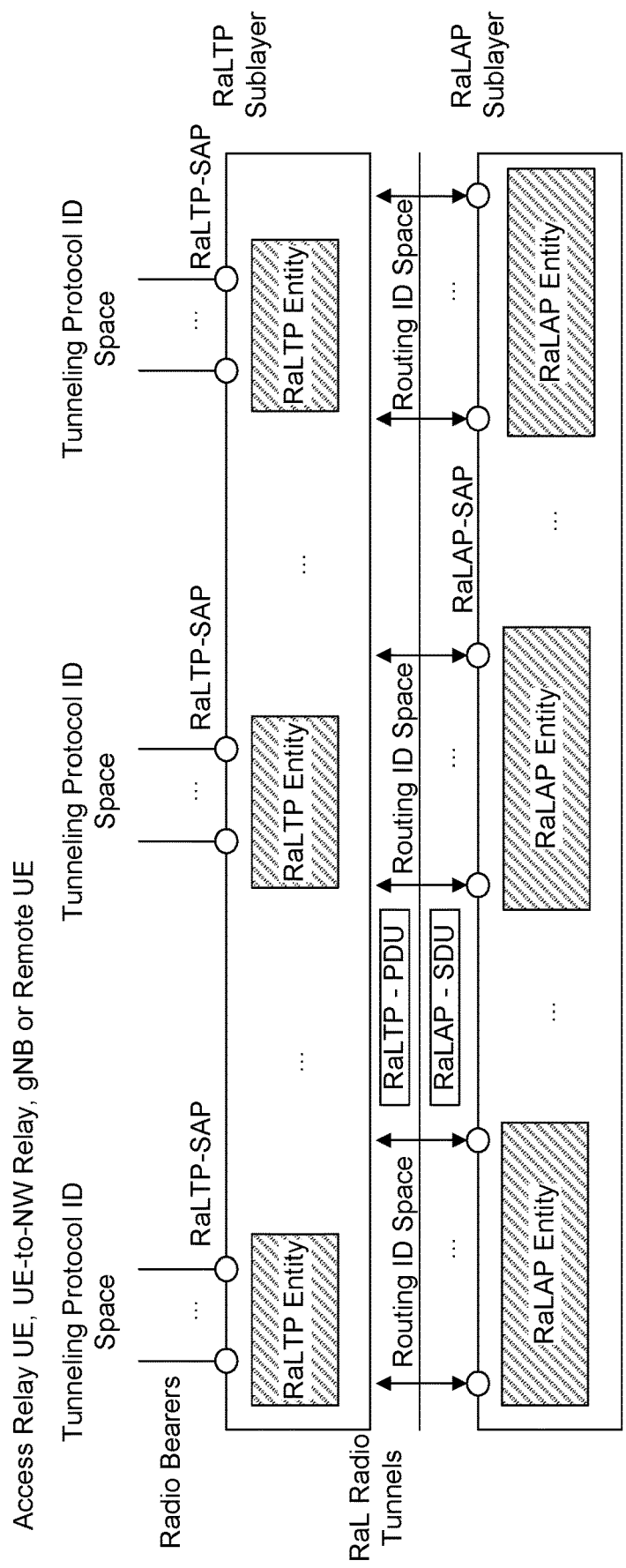
FIG. 19 illustrates an exemplary RaLAP & RaLTP layer, structure view.

To address the issues described herein, a second option of a link adaptation protocol denoted herein Architecture Option 2 is disclosed. This architecture option assumes the use of two new protocols, the Relay Link Adaptation Protocol (RaLAP) protocol and the Relay Link Tunneling Protocol (RaLTP). The RaLAP protocol is an inter-device packet routing data link layer (DLL) protocol like the BAP, which provide in addition to inter-node packet routing function, data aggregation and support for QoS requirements through proper mapping of data packets onto RLC channels, wherein the RLC channels provide QoS differentiation for data transfer over one or more hops. In one embodiment, the current BAP may be used as an RaLAP protocol. The RaLTP protocol is an intra-device packet routing data link layer protocol that runs over the RaLAP protocol on the sidelink or the Uu link. The RaLTP protocol supports bearer multiplexing over RLC channel or demultiplexing of bearers from RLC channel and provides intra-node routing of packets to upper layer protocols, such as PDCP. The FIG. 19 represents one possible structure for RaLTP and RaLAP at a node. As described in Architecture Option 1, the following embodiments in relation with the number of RaLAP entities in a node also applies to the RaLAP protocol as defined in the architecture option 2. In the RaLAP sublayer, in one embodiment it is disclosed one RaLAP entity be instantiated per routing identity space per node. In another embodiment, it is disclosed that the RaLAP layer includes two RaLAP entities per routing identity space per node wherein there is one RaLAP entity that communicates with one sub-network or node for e.g. upstream node and, there is a second RaLAP entity that communicate with a second subnetwork or node for e.g. downstream node, wherein the network node including the RaLAP sublayer serves as a communication hop between the two subnetworks served by the two RaLAP entities. In yet another alternative, it is disclosed one RaLAP entity be instantiated per routing address space per node. In another embodiment, it is disclosed that the RaLAP layer includes two RaLAP entities per routing address space per node, wherein there is one RaLAP entity that communicates with one sub-network or node for e.g. upstream node and, there is a second RaLAP entity that communicate with a second subnetwork or node for e.g. downstream node, wherein the network node including the RaLAP sublayer serves as a communication hop between the two subnetworks served by the two RaLAP entities.

In yet another embodiment, it is disclosed one RaLAP entity per routing ID space per sidelink L2 destination ID or per routing address space per sidelink L2 destination ID, wherein there is one RaLAP entity that communicates with one L2 Destination ID, and a second RaLAP entity that communicate with a second L2 Destination ID, wherein the network node including the RaLAP sublayer serves as a communication hop between the two sidelink L2 Destination IDs.

In another embodiment, it is disclosed one RaLAP entity per routing ID space per sidelink L2 link for e.g. unicast link ID or per routing address space per sidelink L2 link for e.g. unicast link ID, wherein there is one RaLAP entity that communicates with one L2 link ID, and a second RaLAP entity that communicate with a second L2 link ID, wherein the network node including the RaLAP sublayer serves as a communication hop between the two sidelink L2 links.

One or more routing identity space or routing address space may be configured into a node for example a relay UE node 202, a UE-to-Network Relay node 203, a remote UE 201, an RSU, a gNB 204, a gNB DU, or a gNB CU. A routing identity space or a routing address space may be defined on the basis of one routing identity space or one routing address space per serving gNB, or on the basis of one routing identity space or one routing address space per a peer destination remote UE, or on the basis of one routing identity space or one routing address space per source UE, or on the basis of one routing identity space or one routing address space per layer-2 destination ID, or on the basis of one routing identity space or one routing address space per routing tree or on the basis of one per routing network.

It should be note that when there is only one RaLAP routing identity space or routing address space per node, then the qualifying terms used herein, wherein references are made to "per routing ID space" or "per routing address space" can be omitted. For example, the term "per routing address space per L2 Destination ID" becomes "per L2 Destination ID".

Each RaLAP entity has a transmitting part and a receiving part on the node that implements the RaLAP entity. Furthermore, the transmitting part has a corresponding receiving entity of an RaLAP entity at the communicating peer node across a sidelink or across a Uu link.

In the RaLTP sublayer, in one embodiment it is disclosed one RaLTP entity be instantiated per tunneling protocol identity space per node. In another embodiment, it is disclosed that the RaLTP layer includes two RaLTP entities per tunneling protocol identity space per node wherein there is one RaLTP entity that communicates with one sub-network or node for e.g. upstream node and, there is a second RaLTP entity that communicates with a second subnetwork or node for e.g. downstream node, wherein the network node including the RaLTP sublayer serves as a communication hop between the two subnetworks served by the two RaLTP entities.

In yet another embodiment, it is disclosed one RaLTP entity per tunneling protocol ID space per sidelink L2 destination ID, wherein there is one RaLTP entity that communicates with one L2 Destination ID, and a second RaLTP entity that communicates with a second L2 Destination ID, wherein the network node including the RaLTP sublayer serves as a communication hop between the two sidelink L2 Destination IDs.

In another embodiment, it is disclosed one RaLTP entity per tunneling protocol ID space per sidelink L2 link for e.g. unicast link ID, wherein there is one RaLTP entity that communicates with one L2 link ID, and a second RaLTP entity that communicate with a second L2 link ID, wherein the network node including the RaLTP sublayer serves as a communication hop between the two sidelink L2 links.

One or more tunneling protocol identity space may be configured into a node for example a relay UE node 202, a UE-to-Network Relay node 203, a remote UE 201, an RSU, a gNB 204, a gNB DU or a gNB CU. A tunneling protocol identity may be defined on the basis of one tunneling protocol identity space per serving gNB, or on the basis of one tunneling protocol identity space per a peer destination remote UE, or on the basis of one tunneling protocol identity space per source UE, or on the basis of one tunneling protocol identity space per layer-2 destination ID, or on the basis of one tunneling identity space per routing tree or on the basis of one tunneling protocol identity space per routing network.

It should be noted that when there is only one RaLAP routing identity space or routing address space per node, then the qualifying terms used herein, wherein references are made to "per routing ID space" or "per routing address space", or "per tunneling identity space" can be omitted. For example, the term "per routing address space per L2 Destination ID" becomes "per L2 Destination ID".

Figure 20:
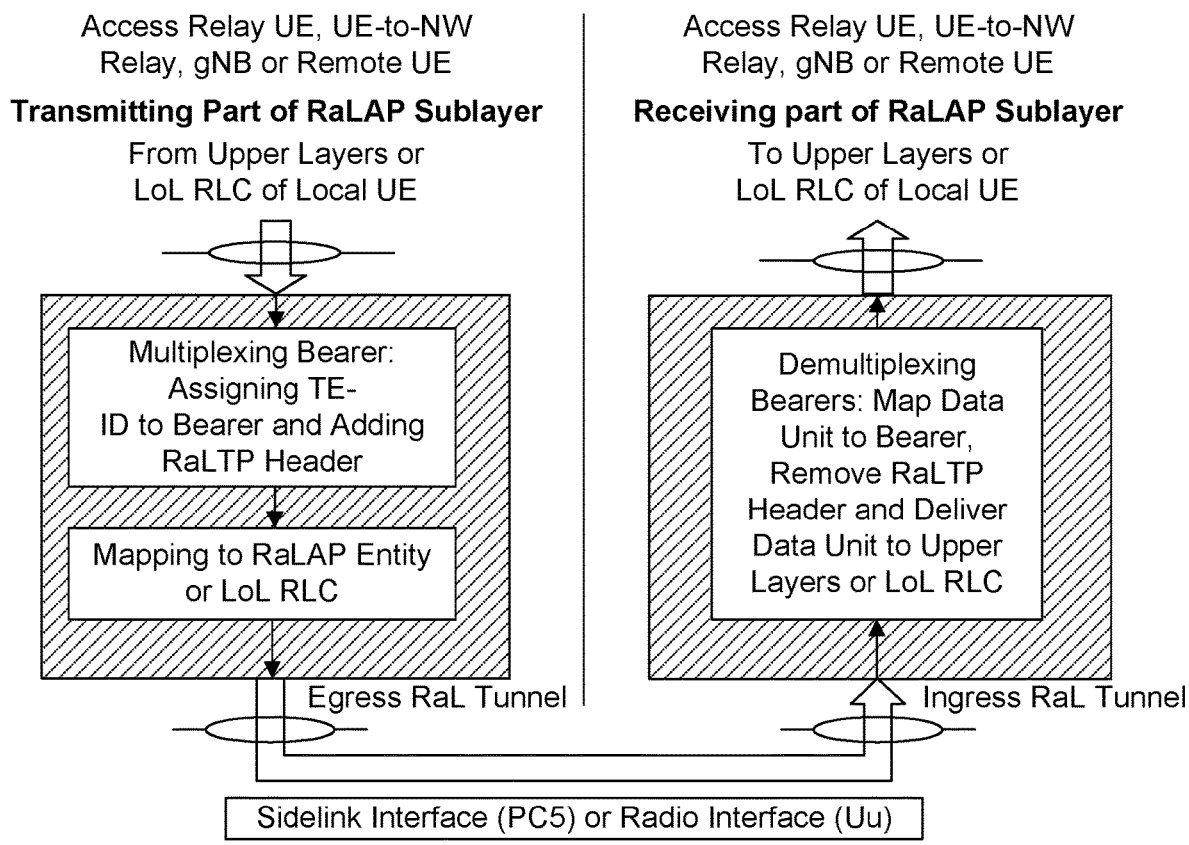
FIG. 20 illustrates an exemplary Functional View of RaLTP sublayer.

Each RaLAP entity may have a transmitting part and a receiving part on the node that implements the RaLAP entity. Furthermore, the transmitting part has a corresponding receiving entity of an RaLAP entity at the communicating peer node across a sidelink or across a Uu link. Similarly, each RaLTP entity has a transmitting part and a receiving part on the node that implements the RaLTP entity. Furthermore, the transmitting part has a corresponding receiving entity of an RaLTP entity at the communicating peer node across a sidelink or across a Uu link as illustrated on FIG. 20.

Service
Service Provided to Upper Layers

The following services are provided by the RaLTP sublayer to upper layers: transfer of user plane data; transfer of control plane data; or bearer identification (e.g., intra-node packet routing).

The following services are provided by the RaLAP sublayer to upper layers: transfer of user plane data; transfer of control plane data; or inter-node routing and packet mapping to RLC channel.

Service Expected from Lower Layers

An RaLTP sublayer expects the following services from lower layers: Acknowledged data transfer service; or Unacknowledged data transfer service.

An RaLAP sublayer may expect the following services from lower layers: Acknowledged data transfer service; or Unacknowledged data transfer service.

Functions

The RaLTP support the following functions: data transfer; Intra-node routing; End-to-end flow control feedback signaling; End-to-end RLF indication, or End-to-end keep alive indication. Intra-node routing may include the following: demultiplexing of bearers e.g., demultiplexing of traffic mapped to the same SL RLC channel, but designated to different upper layer protocol entities for example PDCP entities within the same node or Bearer identification in support of bearer multiplexing into RLC channels; Herein, the identity for bearer identification in the RaLTP sublayer will be denoted the RaLTP identity, that may be an identity of a bearer or an identity of a tunnel associated with a bearer, or an identity of a tunnel associated with an upper layer protocol above the RaLTP, or an identity of an upper layer protocol above the RaLTP.

The RaLAP support the following functions: data transfer; Inter-node routing; support for QoS requirements; hop-by-hop flow control feedback signaling, Hop-by-hop RLF indication, or Hop-by-hop keep alive indication. Inter-node routing may include determination of RaLAP destination and path for packets from upper layers; determination of transmitting part of the RaLAP sublayer on the same node for routing to next hop of packets from receiving part of the RaLAP sublayer on the same node; In other words, the RaLAP sublayer must determine the RaLAP entity to use on a node for routing to next hop of packets received from another RaLAP entity on the same node; routing of packets to next hop; differentiating traffic to be delivered to upper layers from traffic to be delivered to egress link; or differentiating traffic to be delivered over SL egress link versus traffic to be delivered over Uu egress link. Support for QoS requirements may include multiplexing of bearers into RLC channels e.g., determining upper layer protocol entities for e.g. PDCP entities whose traffics are to be mapped to the same SL RLC channel, e.g., determination of upper layer protocol identity for e.g. PDCP entity identity for packet multiplexing and including such an identity into the RaLAP header. In the remaining disclosure, this identity will be denoted bearer identity or bearer ID for short. In addition support for QoS requirements may include determination of egress SideLink (SL) RLC channels for packets routed to next hop.

End-to-End Protocol Stack and L2 Structures

In this section, various alternatives of end-to-end protocols that integrates the RaLTP and RaLAP into the data link layer e.g., Layer-2 (L2) protocols are disclosed.

End-to-End Protocol Stack

Option 2a

In option 2a, the protocol stack in the remote UE 201 doesn't include the RaLTP protocol or the RaLAP protocol. The RaLTP protocol resides in the gNB 204 and the access Relay UE e.g., the Relay UE 202 that provides direct access link to the remote UE 201 over the sidelink. In other words, the RaLTP is an end-to-end protocol between an access relay UE and a base station 204 or between two peer access relay UEs. The RaLAP protocol resides in the gNB 204, the UE-to-Network relay 203 or in a Relay.

Figure 21:
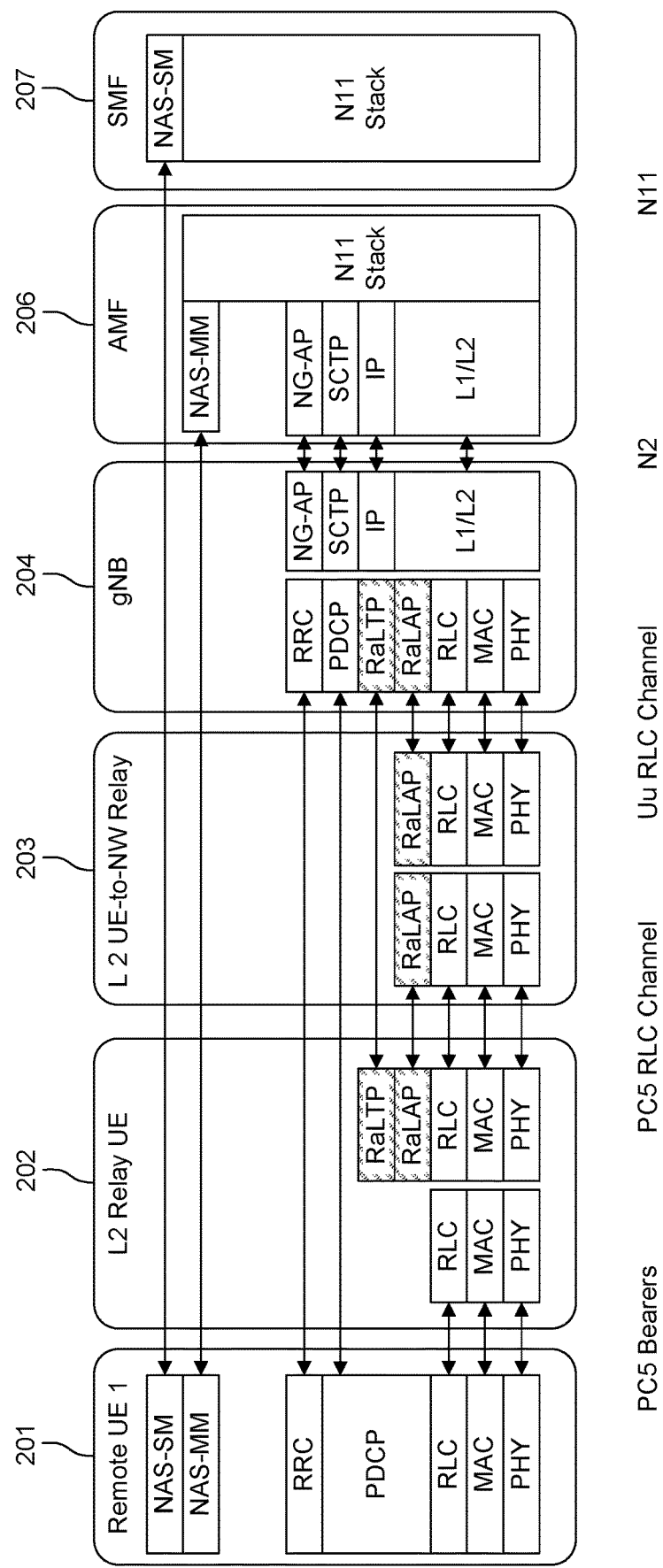
FIG. 21 illustrates an exemplary RaLAP/RaLTP based E2E CP PS—Option 2a, Use Case for Communication Through NW.
Figure 22:
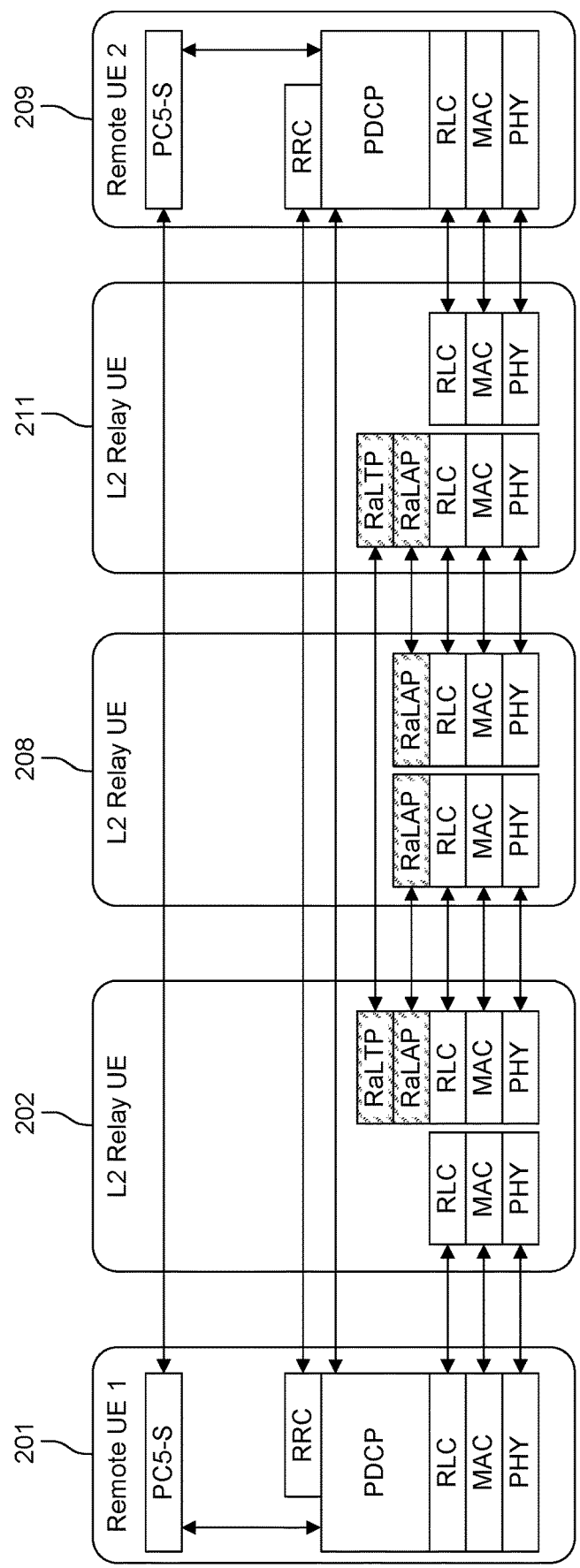
FIG. 22 illustrates an exemplary RaLAP/RaLTP based E2E CP PS—Option 2a, Use Case for Sidelink Only Communication.
Figure 23:
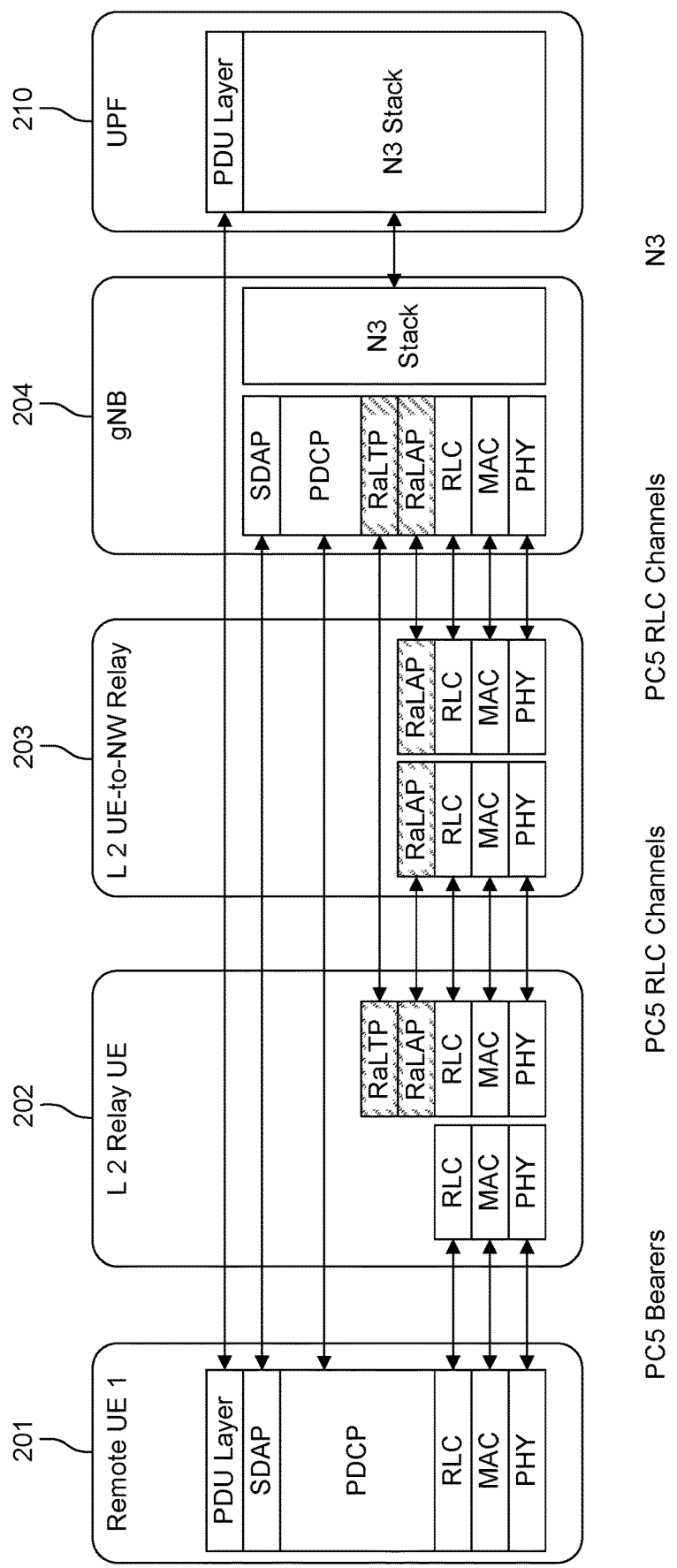
FIG. 23 illustrates an exemplary RaLAP/RaLTP based E2E UP PS—Option 2a, Use Case for Communication Through NW.
Figure 24:
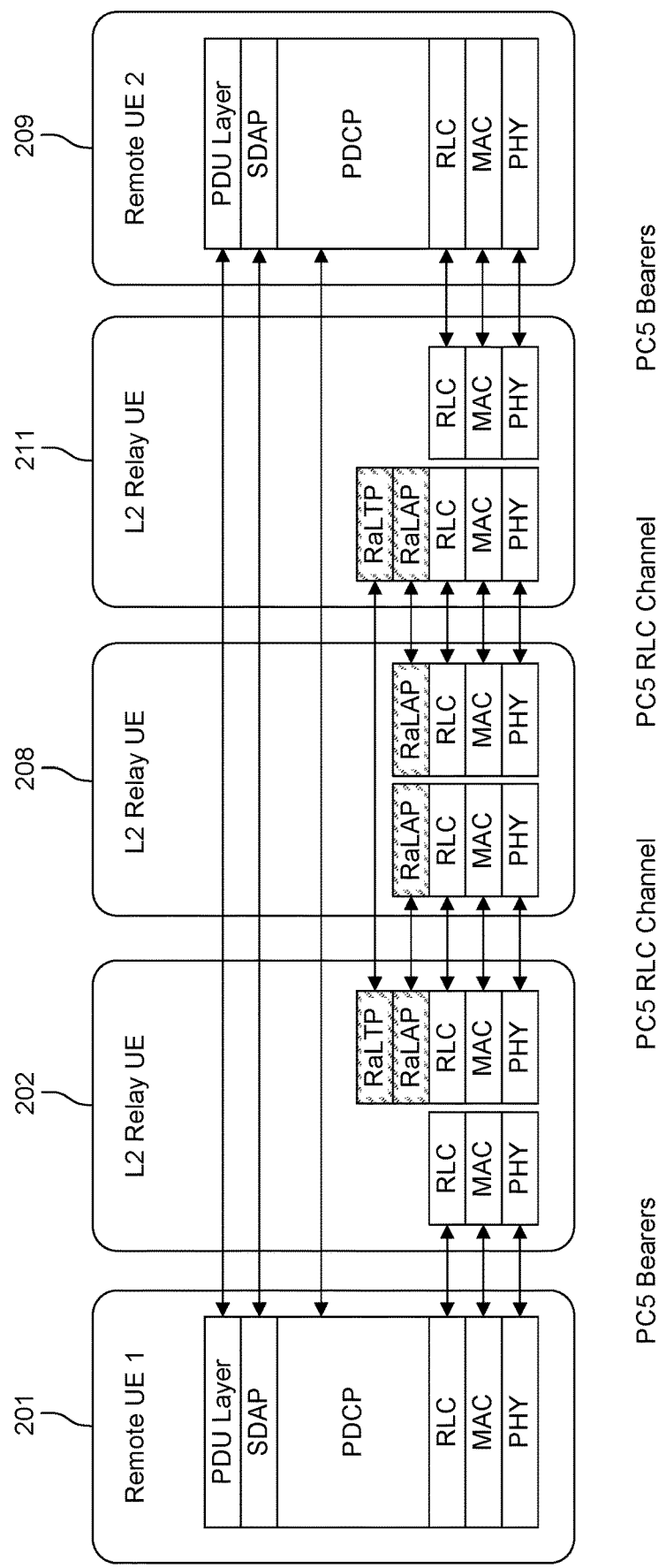
FIG. 24 illustrates an exemplary RaLAP/RALTP based E2E UP PS—Option 2a, Use Case for Sidelink Only Communication.
Figure 25:
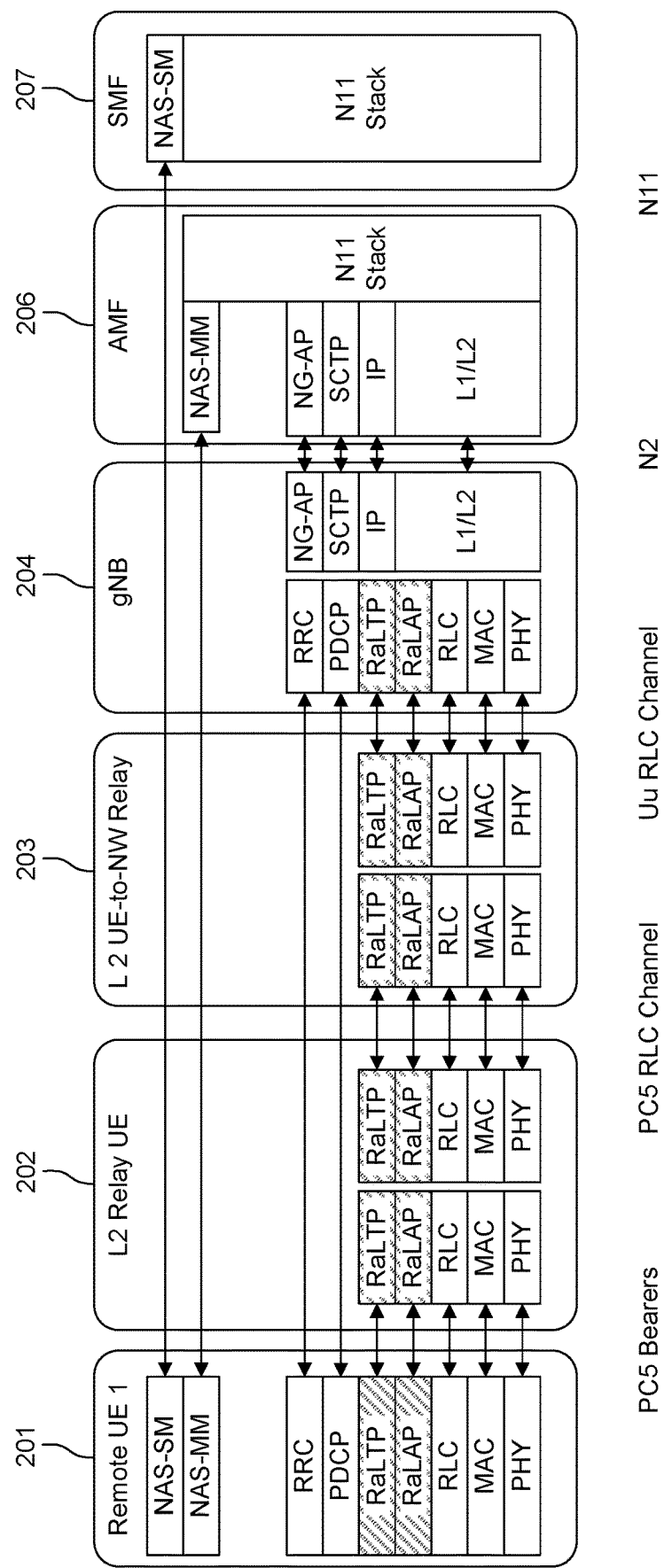
FIG. 25 illustrates an exemplary RaLAP/RaLTP based E2E CP PS—Option 2b, Use Case for Communication Through NW.

This protocol architecture option may be used for connection-oriented communication or connectionless communication wherein the nodes that implements the RaLTP and RaLAP, such as the Relay UE 202 or the UE-to-Network relay 203 may be configured with RaLTP and RaLAP configuration information as described herein. The base station 204 (FIG. 21) may configure into the various node in the communication path (FIG. 21 or FIG. 23) to the remote UE 201, the necessary configuration parameters for RaLTP and RaLAP operation. The configuration signaling may use RRC dedicated signaling, or RRC common signaling or a combination thereof. Similarly, a remote UE 201 (FIG. 22) or a third entity such as an RSU may configure into the various nodes in the communication path (FIG. 22 or FIG. 24) to the remote UE 201, the necessary configuration parameters for RaLTP or RaLAP operation. The configuration signaling may use RRC dedicated signaling, or RRC common signaling or a combination thereof. Additionally, the adjacent nodes e.g., nodes connected with a non-multi hop link may maintain local peer-to-peer control plane connection or communication, for example at the RRC sublayer or the PC5-S sublayer, in support for example of local configuration information exchange between adjacent nodes. For example, in the example of FIG. 22, an RRC or PC5-S communication or connection could exist between Remote UE 201 and L2 Relay UE 202. Similarly, an RRC or PC5-S communication or connection could exist between the Remote UE 209 and the UE-to-Network relay 203, wherein these RRC communication or connections may be used for local peer-to-peer information exchange in support of operation of RaLTP protocol or RaLAP protocol through the intermediary hops in the communication path between the two remotes UEs as illustrated in FIG. 22 or FIG. 24. Such communication arrangement could be used for connectionless RaLTP and RaLAP communication on the paths between L2 Relay UE 202 and UE-to-Network relay 203 which might include multiple hops.

Option 2b

In option 2b, the protocol stack in the remote UE 201 may also include the RaLTP protocol, or the RaLAP protocol, or both. For example in one embodiment, the RaLTP protocol might be only part of the data link layer protocol in a remote UE 201 and a base station 204, or only in both peer remote UEs in the case of sidelink only communication, providing end to end communication between the end peer-to-peer nodes while the RaLAP is part of the data link layer protocol in each node on the transmission part including remote UE 201, Relay UE node 202, UE-to-Network Relay node 203, and the base station 204. In another embodiment, the RaLTP protocol might be only part of the data link layer protocol in the UE 201 and the base station 204, or in both peer remote UEs in the case of sidelink only communication, providing end to end communication between the end peer-to-peer nodes while the RaLAP is part of the data link layer protocol only in the intermediary nodes on the path between the remote UE 201 and the base station or peer remote UE. In yet another embodiment, both the RaLTP and the RaLAP protocols are part of the data link layer protocol in the UE 201, the base station 204 or the peer remote UE as well as all the other nodes in the communication path between the UE 201 and a base station 204 or a peer remote UE as illustrated in FIG. 25, FIG. 26, FIG. 27, or FIG. 28.

Figure 26:
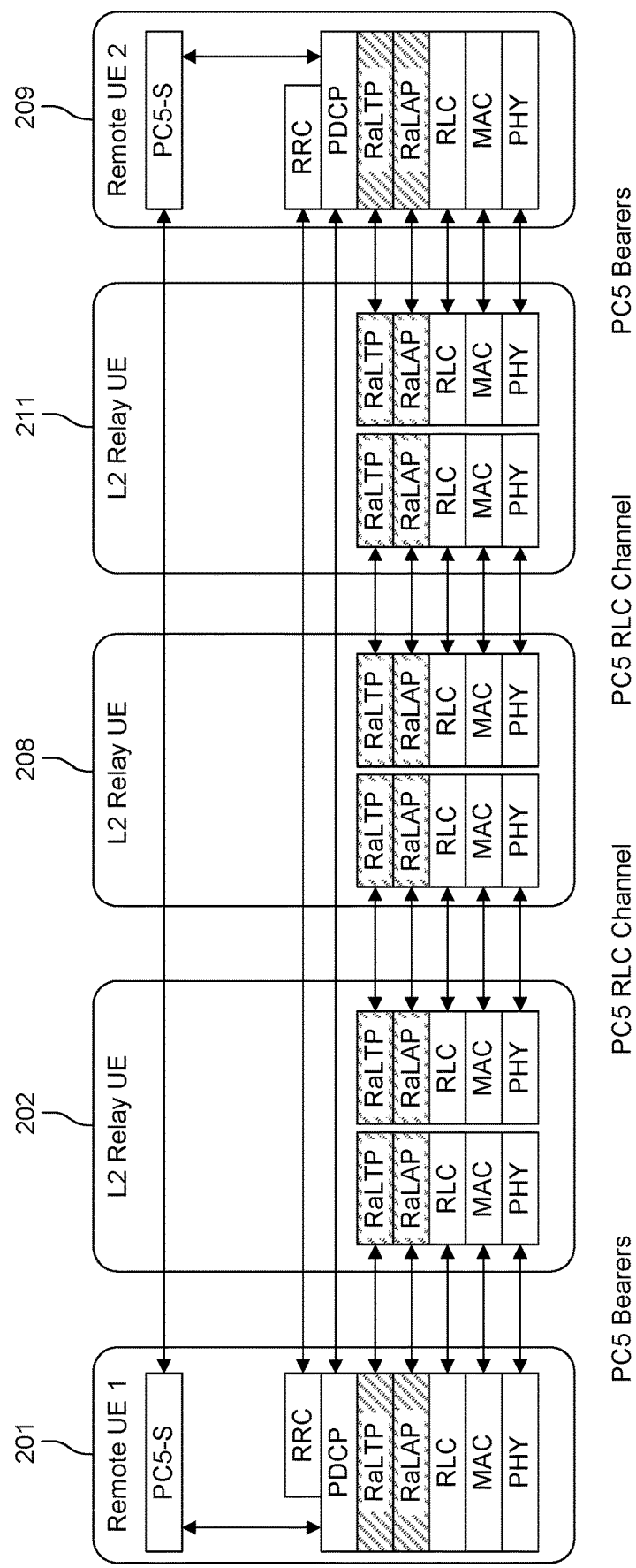
FIG. 26 illustrates an exemplary RaLAP/RaLTP based E2E CP PS—Option 2b, Use Case for Sidelink Only Communication.
Figure 27:
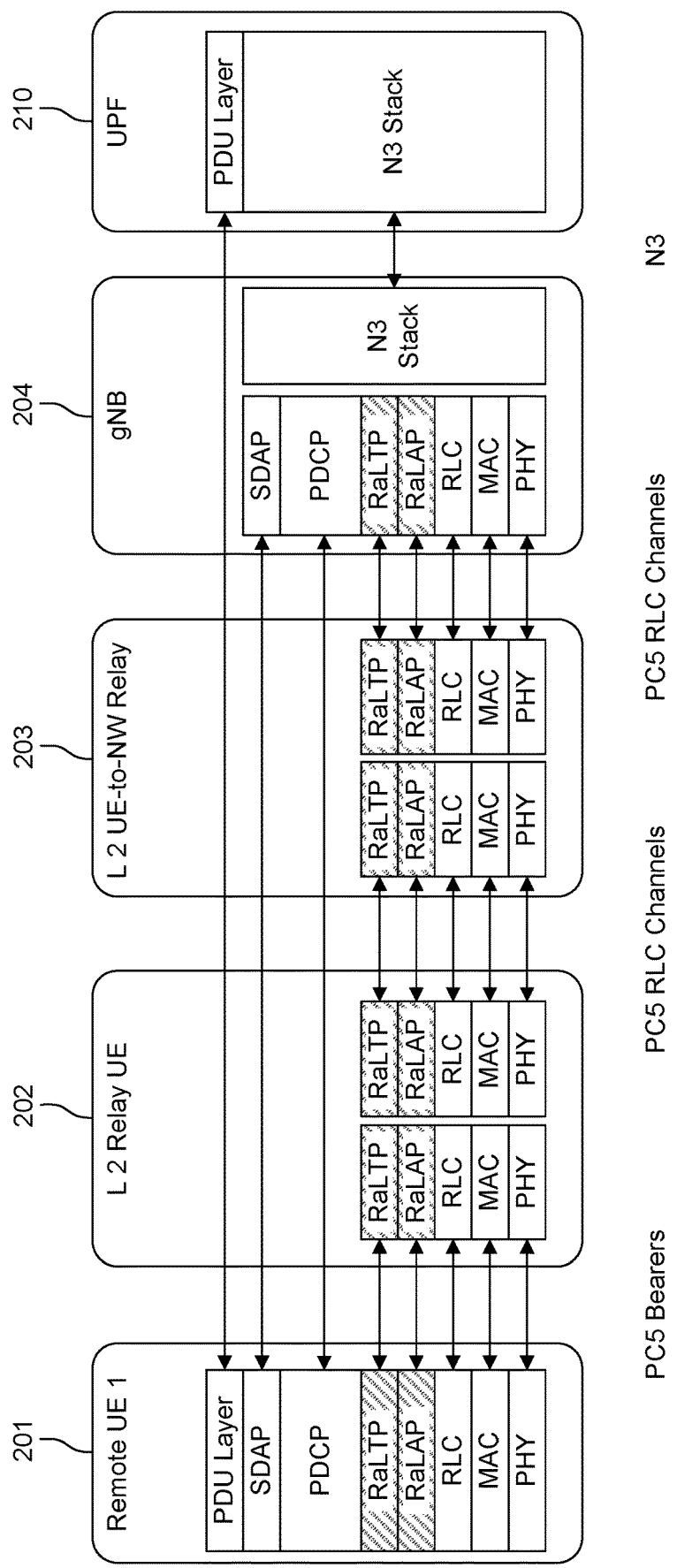
FIG. 27 illustrates an exemplary RaLAP/RaLTP based E2E UP PS—Option 2b, Use Case for Communication Through NW.
Figure 28:
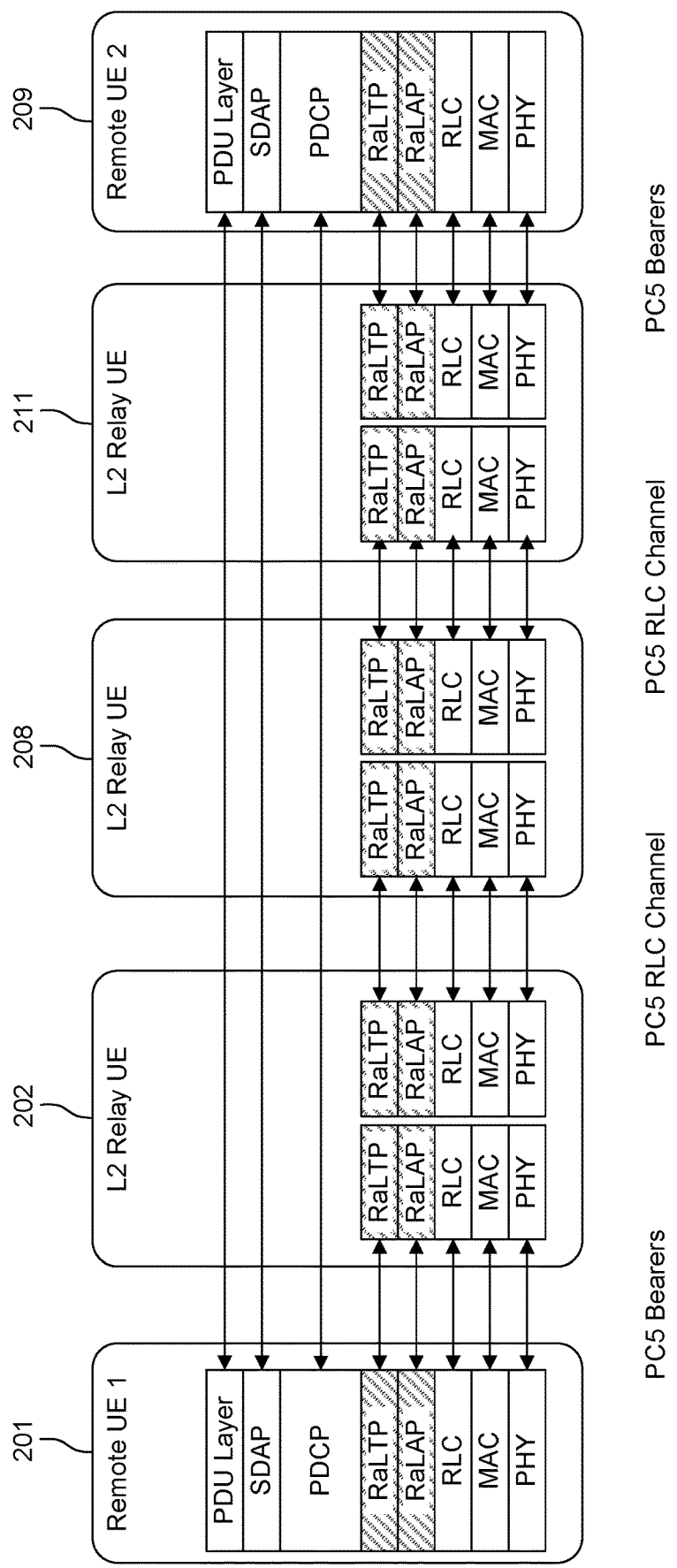
FIG. 28 illustrates an exemplary RaLAP/RaLTP based E2E UP PS—Option 2b, Use Case for Sidelink Only Communication.

Similar to Architecture option 1, this protocol architecture option may also be used for connection-oriented communication or connectionless communication wherein the nodes that implements the RaLAP such as the remote UE 201, the Relay UE 202, the UE-to-Network relay 203, or the base station 204 may be configured with RaLTP and RaLAP configuration information as described herein. The base station 204 (FIG. 25) may configure into the various nodes in the communication path (FIG. 25 or FIG. 27) to the remote UE 201 including the remote UE 201, the necessary configuration parameters for RaLTP and RaLAP operation. The configuration signaling may use RRC dedicated signaling, or RRC common signaling or a combination thereof. Similarly, a remote UE 201 (FIG. 26) or a third entity such as an RSU may configure into the various nodes in the communication path (FIG. 26 or FIG. 28) to the remote UE 201, the necessary configuration parameters for RaLTP or RaLAP operation. The configuration signaling may use RRC dedicated signaling, RRC common signaling, a combination thereof. Additionally, the adjacent nodes e.g., nodes connected with a non-multi hop link may maintain local peer-to-peer control plane connection or communication, for example at the RRC sublayer or the PC5-S sublayer, in support for example of local configuration information exchange between adjacent nodes. For example, in the example of FIG. 26, an RRC or PC5-S communication or connection could exist between Remote UE 201 and L2 Relay UE 202. Similarly, an RRC or PC5-S communication or connection could exist between the Remote UE 201 and the UE-to-Network relay 203, wherein these RRC communication or connections may be used for local peer-to-peer information exchange in support of operation of RaLTP protocol and RaLAP protocol through the intermediary hops in the communication path between the two remotes UEs as illustrated in FIG. 26 or FIG. 28. Such communication arrangement could be used for connectionless RaLTP and RaLAP communication on the paths between L2 Relay UE 202 and UE-to-Network relay 203, which might include multiple hops.

L2 Structure

Figure 29:
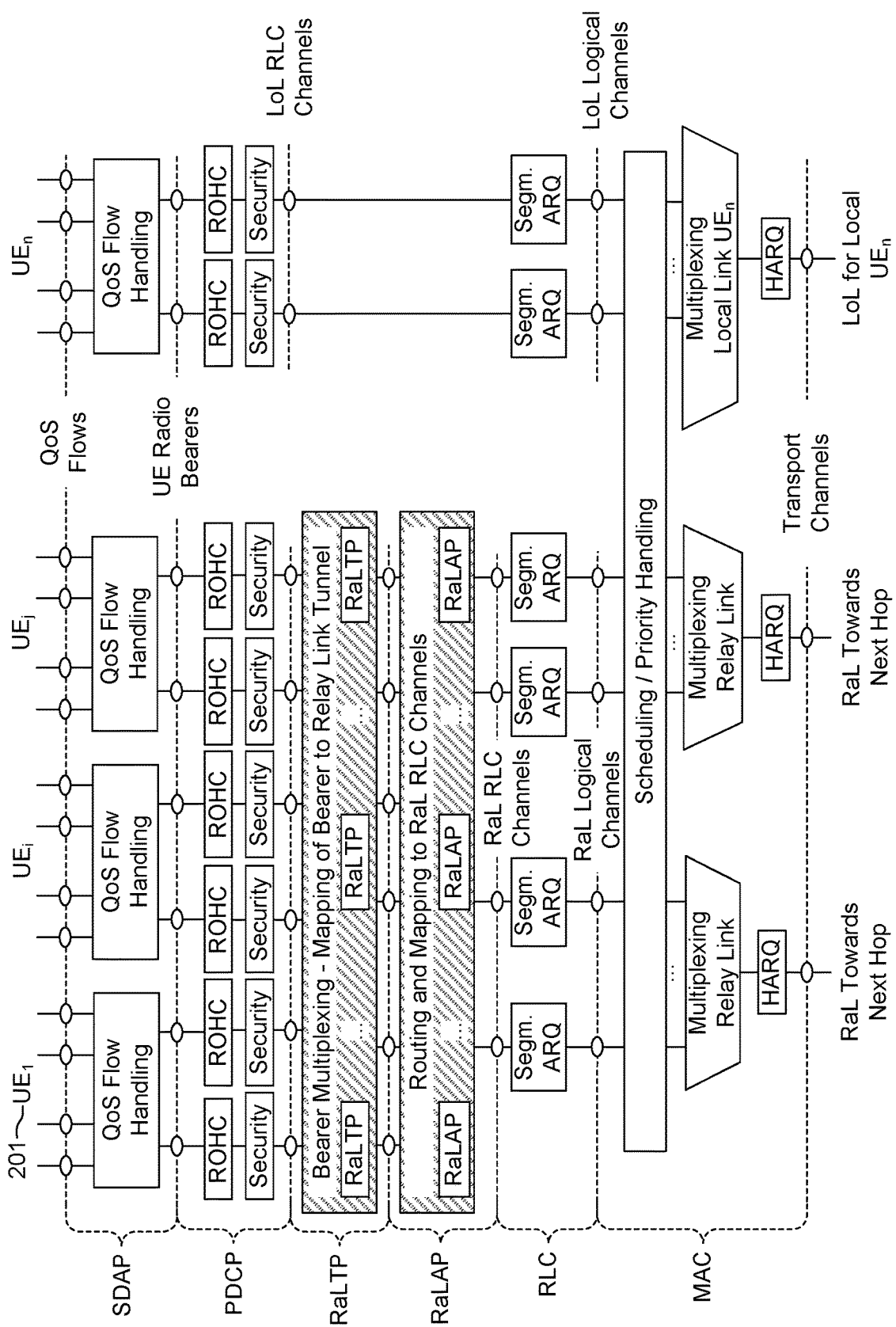
FIG. 29 illustrates an exemplary DL L2-structure for user plane at gNB.
Figure 30:
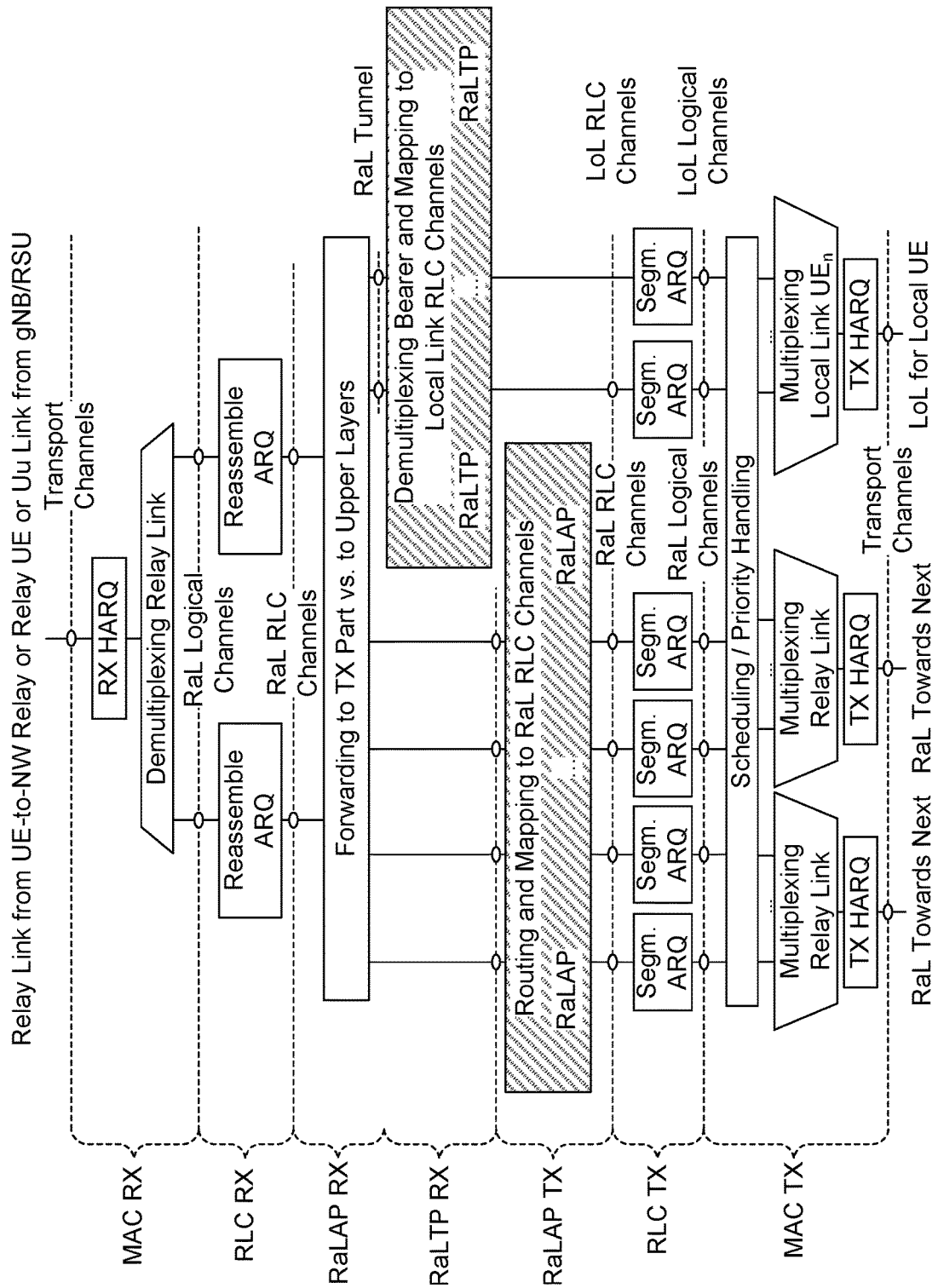
FIG. 30 illustrates an exemplary DL L2 structure at Relay UE or UE-to-NW Relay.
Figure 31:
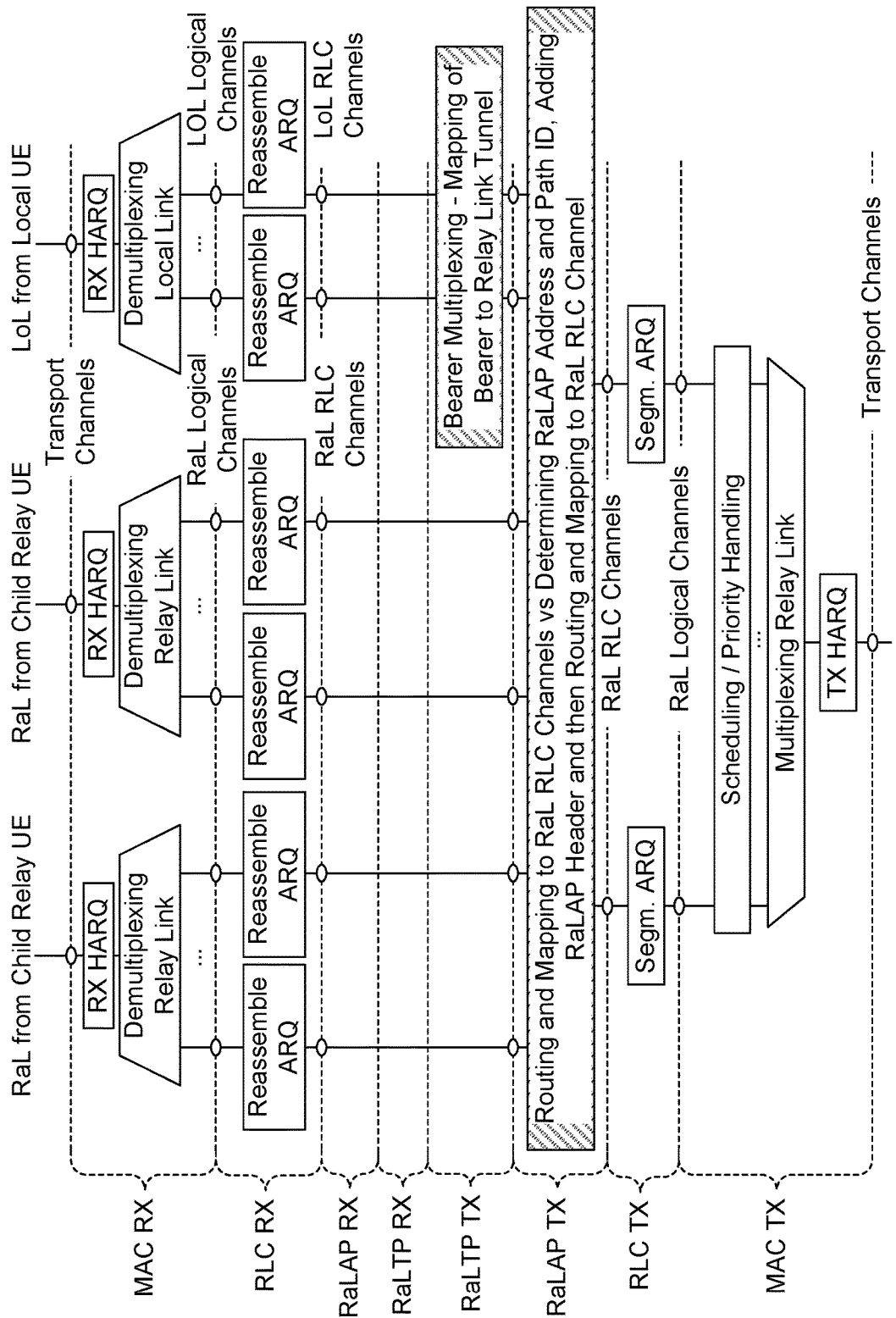
FIG. 31 illustrates an exemplary UL L2 structure at Relay UE or UE-to-NW Relay.
Figure 32:
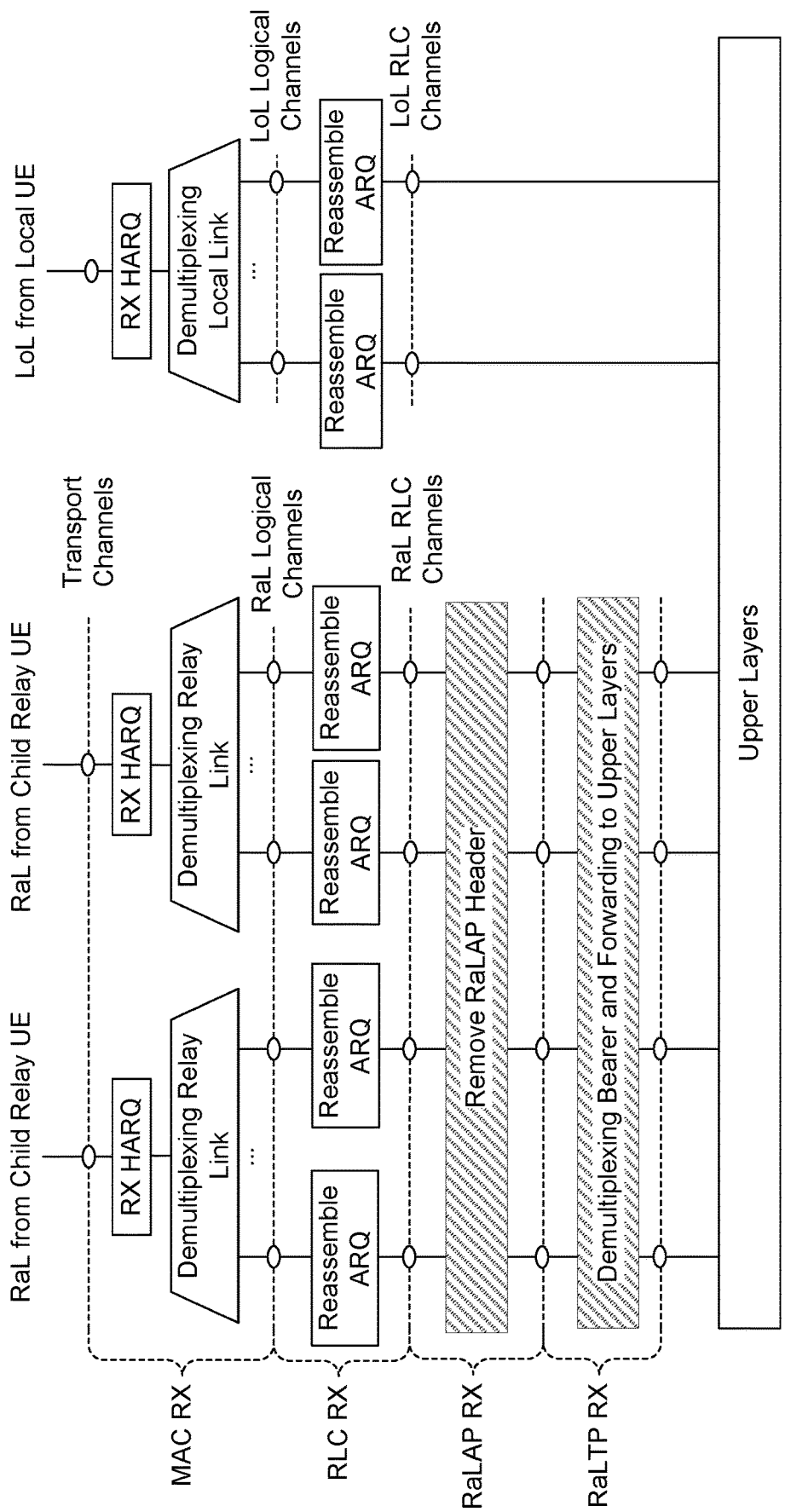
FIG. 32 illustrates an exemplary UL L2 structure at gNB.

The FIG. 29 illustrates the downlink Layer-2 (L2) data structure including the RaLTP protocol and the RaLAP protocol, for the user plane at a gNB 204. The FIG. 30 illustrates the downlink L2 data structure including the RaLTP protocol and the RaLAP protocol, for the user plane at a Relay UE node 202 or a UE-to-Network relay node 203. The FIG. 31 illustrates the uplink L2 data structure including the RaLTP protocol and the RaLAP protocol, for the user plane at a Relay UE node 202 or a UE-to-Network relay node 203. The FIG. 32 illustrates the uplink L2 data structure including the RaLTP protocol and the RaLAP protocol, for the user plane at a gNB. It should be noted that while the terms "downlink" or "uplink" are used to describe the direction of the traffic, the design concepts captured by these figures may not be limited this characterization. For example, for use cases involving communication between two peer remote UEs, e.g. UE 201 and UE 209, downlink direction versus uplink direction may be arbitrarily decided. The term downstream might also be used instead of downlink. Similarly, the term upstream might be used instead of uplink.

Configurations

Example configuration of RaLAP and RaLTP in support of routing and fulfillment of QoS requirements are captured in Table 1, Table 2, Table 3 and Table 4 below. The configuration may be configured into the various nodes for example the remote UE 201, the Relay UE 202, or the UE-to-Network Relay 203 through RRC dedicated signaling using dedicated resources or a common resources, or RRC common signaling for e.g. broadcast signaling or signaling through common resources, or a combination thereof.

The parameters in Table 1, Table 2, Table 3 and Table 4 might also be preconfigured into the UE. Furthermore some of the values of code points might be specified by the standards and with assigned specific meanings. For example, a specific value of an RLC channel might be reserved or specific to certain QoS Profile. Similarly, a specific value for Upper layer protocol ID might be reserved or be specific to a certain upper layer protocol instance for example to a PDCP instance for given signaling radio bearer or data radio bearer. It should be noted that while the routing configuration parameters and QoS mapping parameters are jointly presented in the same table for illustration purposes, these parameters may be configured into a node separately, for example routing configuration parameters may be configured separately from the QoS routing mapping parameters.

TABLE 1

Control of Routing and QoS for Traffic from Upper layers of RaLAP/RaLTP to next hop

| | | RaLAP | Translated RaLAP | | Translated RaLTP | | QoS entries | |
|---|---|---|---|---|---|---|---|---|
| Entries | Upper layer Protocol Identity | Routing ID (RaLAP address, Path ID) | Routing ID (RaLAP address, Path ID) | RaLTP Identity or tunnel identity | identity or translated tunnel identity | Next hop RaLAP address | Egress link ID | Egress RLC Channel ID |
| 1 | | | | | | | | |
| 2 | | | | | | | | |
| ... | | | | | | | | |
| n | | | | | | | | |

TABLE 2

Control of Routing and QoS for Traffic from Ingress Link RaLAP/RaLTP to Next Hop

| | RaLAP | Translated RaLAP | | Translated RaLTP | | QoS entries | | |
|---|---|---|---|---|---|---|---|---|
| Entries | Routing ID (RaLAP address, Path ID) | Routing ID (RaLAP address, Path ID) | RaLTP Identity or tunnel identity | identity or translated tunnel identity | Next hop RaLAP address | Ingress link ID | Ingress RLC Channel ID | Egress link ID | Egress RLC Channel ID |
| 1 | | | | | | | | | |
| 2 | | | | | | | | | |
| ... | | | | | | | | | |
| n | | | | | | | | | |

TABLE 3

Control of Routing for Traffic from Ingress Link RaLAP/RaLTP to Upper layer Protocols or Local Link UE

| | Routing entries RaLAP Routing ID (RaLAP address, Path ID) | RaLTP Identity or tunnel identity | Upper Layer Protocol Identity |
|---|---|---|---|
| Entries | | | |
| 1 | | | |
| 2 | | | |
| ... | | | |
| n | | | |

TABLE 4

Control of Routing and QoS for Traffic from Ingress Link RaLAP/RaLTP to Next Hop with Paired RaLAP entity.

| | Routing entries | | | | | QoS entries | | | |
|---|---|---|---|---|---|---|---|---|---|
| Entries | RaLAP Routing ID (RaLAP address Path ID) | Translated RaLAP Routing ID (RaLAP address, Path ID) | RaLTP Identity | Translated RaLTP identity or tunnel identity | Paired RaLAP address or translated tunnel identity | Next hop RaLAP address | Ingress link ID | Ingress RLC Channel ID | Egress link ID | Egress RLC Channel ID |
| 1 | | | | | | | | | | |
| 2 | | | | | | | | | | |
| ... | | | | | | | | | | |
| n | | | | | | | | | | |

Procedures
RaLAP/RaLTP Entity Handling

When upper layers request establishment of an RaLAP entity, the node may: establish an RaLAP entity as per the request; or follow the procedures described with regard to draft transfer.

The establishment request from upper layer may include additional context information such as one or more of the configuration parameters as captured in the configuration tables (Table 1, Table 2, Table 3 or Table 4), and in accordance with the protocol architecture principles captured in sidelink adaptation protocol structure and entity options disclosed herein.

When upper layers request release of a RaLAP entity, the node may release RaLAP entity as per the request. When an RaLAP entity is released, the RaLTP entities mapped to that RaLAP entity may also be released.

When upper layers request establishment of an RaLTP entity, the node may: establish an RaLTP entity as per the request; or follow the procedures with regard to data transfer.

The establishment request from upper layer may include additional context information such as one or more of the configuration parameters as captured in the configuration tables Table 1, Table 2, Table 3, or Table 4, and in accordance with the protocol architecture principles captured with regard to option 1 and option 2 for sidelink adaption protocol structure and entities.

When upper layers request release of a RaLTP entity, the node may release RaLAP entity as per the request.

Data Transfer
Transmitting Operation

The transmitting part of an RaLAP entity can receive RaLAP SDUs from upper layers and RaLAP Data Units from the receiving part of the same RaLAP entity of the same node or from the receiving part of the paired RaLAP entity of the same node, and construct RaLAP Data PDUs as needed.

Figure 33:
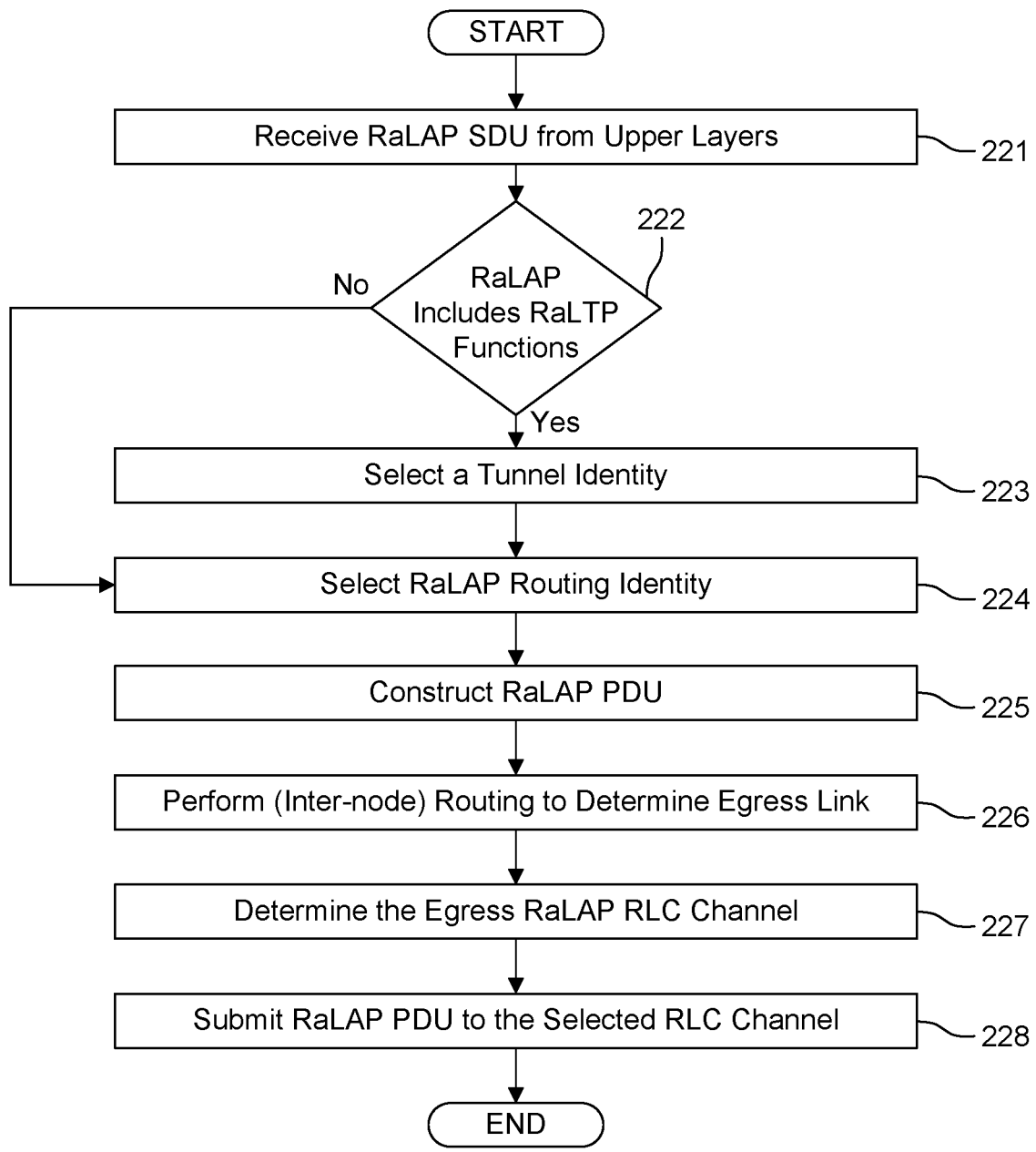
FIG. 33 illustrates an exemplary RaLAP transmitter part operation high level view.
Figure 34:
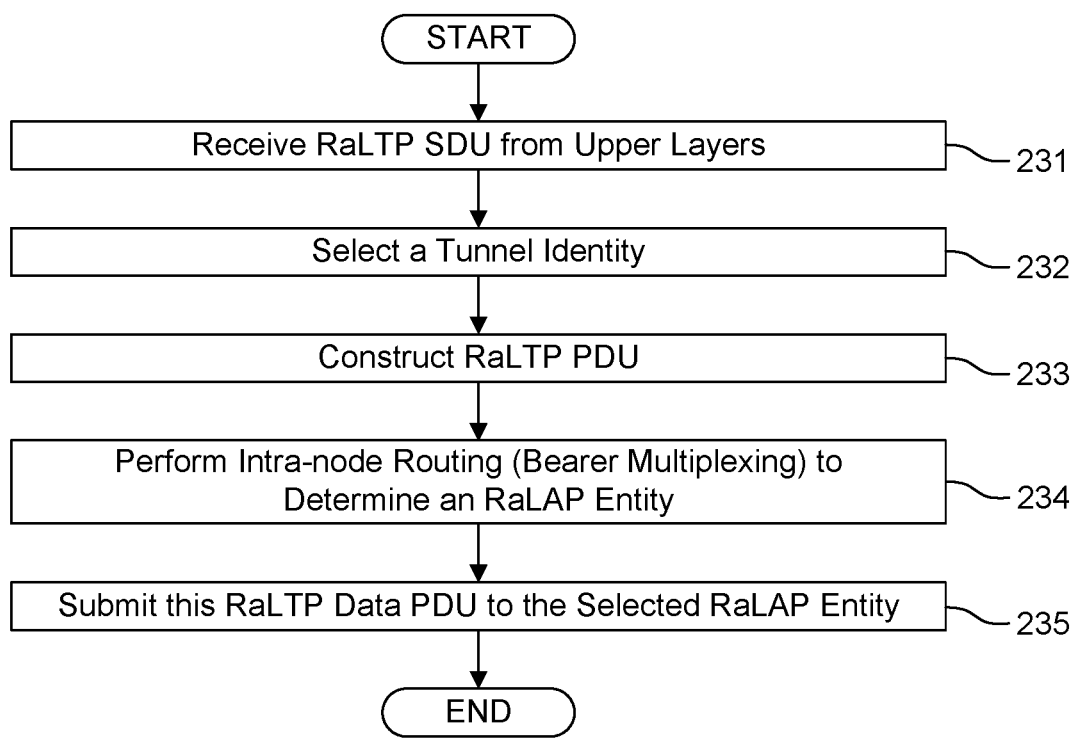
FIG. 34 illustrates an exemplary RaLTP transmitter part operation high level view.

A high-level view of the transmitter part operation of the RaLAP protocol is illustrated in FIG. 33. Similarly, a high-level view of the transmitter part operation of the RaLAP protocol is illustrated in FIG. 34.

In should be noted that all the descriptive text below in support of data transmission operation is described some time herein in terms of RaLAP data PDU transmission, or RaLTP data PDU transmission, the same steps in terms of routing identity selection, tunnel identity selection, inter-node routing, intra-node routing and Mapping to RLC channel are equally applicable to the transmission of RaLAP control PDU transmission or RaLTP control PDU transmission.

With reference to FIG. 33, at step 221, receive RaLAP SDU from upper layers. At step 222, determining that RaLAP include RaLTP functions. may Based on step 222, at step 223 select a tunneling identity address in accordance with regard to the Tunnel Identity (RaLTP identity) Selection for RaLTP Operation disclosed herein if the RaLAP also support intra-node routing function. At step 224, select RaLAP routing identity. Selection of an RaLAP address, an RaLAP path identity if required for this RaLAP SDU in accordance with regard to routing identity selection for RaLAP operation as disclosed herein. At step 225, construct an RaLAP Data PDU by adding an RaLAP header to the RaLAP SDU, where the DESTINATION field is set to the selected RaLAP address, the PATH field if required is set to the selected RaLAP path identity, and the TEID field is set to the selected tunnelling identity if the RaLAP also support intra-node routing function, in accordance with the Data PDU formats disclosed herein. It should be noted that the inclusion of path identity into the RaLAP header might not be required when performing connectionless data routing.

When the RaLAP entity has an RaLAP Data PDU to transmit, the transmitting part of the RaLAP entity may, at step 226, perform inter-node routing to determine the egress link in accordance with regard to routing (inter-node routing) as disclosed herein. At step 227, determine the egress Relay Link (RaL) RLC channel in accordance with Mapping to RaL RLC channel as disclosed herein. At step 228, submit this RaLAP Data PDU to the selected egress RaL RLC channel of the selected egress link.

The node may perform data buffering on the transmitting part of the RaLAP entity, e.g., until RLC-AM entity has received an acknowledgement. In case of RaL RLF, the transmitting part of RaLAP entity may reroute the RaLAP Data PDUs, which have not been acknowledged by lower layer before the RaL RLF, to an alternative path.

With reference FIG. 34, at step 231, the transmitting part of an RaLTP entity can receive RaLAP SDUs from upper layers and construct RaLTP Data PDUs as needed.

At step 232, upon receiving an RaLTP SDU from upper layers, the transmitting part of the RaLTP entity may select an RaLTP identity in accordance with data procedures disclosed herein. At step 233, construct an RaLTP Data PDU by adding an RaLTP header to the RaLTP SDU, where the TEID field is set to the selected RaLTP identity, in accordance with Data PDU formats disclosed herein.

At step 234, when the RaLTP entity has an RaLTP Data PDU to transmit, the transmitting part of the RaLTP entity may perform intra-node routing to determine the RaLAP entity in accordance with regard to bearer multiplexing (Intra-node routing). At step 235, submit this RaLTP Data PDU to the selected RaLAP entity.

Routing Identity Selection for RaLAP Operation

An RaLAP at a remote UE 201, a peer Remote UE, an RSU UE, a gNB 204, a gNB RSU, a UE-to-NW relay 203 for example when offering an access link to a remote UE 201, or a relay UE 202 for example when offering an access UE to a remote UE 201 may perform a routing identity selection.

Case of RaLAP that Includes RaLTP Functions

At a node, for an RaLAP SDU received from upper layers for transmission, the RaLAP entity performs mapping to a RaLAP address and if applicable to a RaLAP path ID based on Traffic to Routing ID Mapping Configuration as illustrated in Table 1.

Each entry of the Traffic to Routing ID Mapping Configuration includes at least one or more of the following: an upper layer protocol identity or an RaLAP routing ID.

An upper layer protocol identity: The upper layer protocol identity may be for example a PDCP identity, a bearer identity or any other identity configured for upper layer protocol instances differentiation or bearer differentiation, or an identity of a tunnel associated with an upper layer protocol above the RaLAP protocol, or an identity assigned to an upper layer protocol above the RaLAP protocol. The upper layer protocol identity may also be a traffic type specifier; and An RaLAP routing ID may include a RaLAP address and if applicable a path ID as illustrated in Table 1.

At a node, for a RaLAP SDU received from upper layers for transmission, the RaLAP entity maymay, if the Traffic to Routing ID Mapping Configuration is not configured as illustrated in Table 1, select the RaLAP address and if applicable the RaLAP path identity from a default control routing and QoS mapping table which is pre-provisioned or pre-configured into the UE, or which is specified with default parameters to be used for control of routing and data transfer according to QoS requirements;

Else: select an entry from the traffic to routing ID mapping configuration with its upper layer protocol identity corresponds to the upper layer protocol identity of this RaLAP SDU.

Next, select the RaLAP address and if applicable the path ID from the routing ID in the entry selected above.

Case of RaLAP that Relies on an RaLTP as a Separate Protocol

At an RaLAP node, for an RaLAP SDU received from RaLTP protocol for transmission, the RaLAP entity performs mapping to a RaLAP address and if applicable to a RaLAP path ID based on Tunnel identity to Routing ID Mapping Configuration, as illustrated in Table 1.

Each entry of the Tunnel identity to Routing ID Mapping Configuration may include one or more of the following: a tunnel identity or an RaLAP routing ID. a tunnel identity. The tunnel identity may be the RaLTP identity, or a PDCP identity, a bearer identity, or any other identity configured for upper layer protocol instances differentiation or bearer differentiation, or an identity of a tunnel associated with an upper layer protocol above the RaLAP protocol or RaLTP protocol, or an identity assigned to an upper layer protocol above the RaLAP protocol or RaLTP protocol. The tunnel identity may also be a traffic type specifier.

A RaLAP routing ID may include a RaLAP address and if applicable a path ID as illustrated in Table 1.

At the RaLAP node, for a RaLAP SDU received from RaLTP protocol for transmission, the RaLAP entity may, if the Tunnel identity to Routing ID Mapping Configuration is not configured as illustrated in Table 1, select the RaLAP address and if applicable the RaLAP path identity from a default control routing and QoS mapping table which is pre-provisioned or pre-configured into the UE, or which is specified with default parameters to be used for control of routing and data transfer according to QoS requirements.

Else: select an entry from the tunnel identity to routing ID mapping configuration with its tunnel identity corresponds to the value of the TEID field of this RaLAP SDU.

Next, select the RaLAP address and if applicable the path ID from the routing ID in the entry selected above.

Tunnel Identity (RaLTP Identity) Selection for RaLTP Operation

An RaLTP at a remote UE 201, a peer Remote UE, an RSU UE, a gNB 204, a gNB RSU, may perform a routing identity selection. It should be noted as discussed herein, when RaLTP is used in combination with RaLAP, the terms tunnel identity and RaLTP identity are used interchangeably.

At an RaLTP node, for an RaLTP SDU received from upper layers for transmission, the RaLTP entity performs mapping to an RaLTP identity based on Traffic to Tunnel identity Mapping Configuration as illustrated in Table 1.

Each entry of the Traffic to Tunnel Identity Mapping Configuration includes at least one or more of the following: an upper layer protocol identity or an RaLTP identity. The upper layer protocol identity may be for example a PDCP identity, a bearer identity or any other identity configured for upper layer protocol instances differentiation or bearer differentiation, or an identity of a tunnel associated with an upper layer protocol above RaLTP, or an identity assigned to an upper layer protocol above the RaLTP protocol. The upper layer protocol identity may also be a traffic type specifier. An RaLTP identity is illustrated in Table 1.

At the RaLTP node, for a RaLTP SDU received from upper layers for transmission, the RaLTP entity may, if the Traffic to Tunnel identity Mapping Configuration is not configured as illustrated in Table 1, select the RaLTP identity from a default control routing and QoS mapping table which is pre-provisioned or pre-configured into the UE, or which is specified with default parameters to be used for control of routing and data transfer according to QoS requirements.

Else: select an entry from the Traffic to Tunnel identity mapping configuration with its upper layer protocol identity corresponds to the upper layer protocol identity of this RaLTP SDU.

Next, select the RaLTP identity (tunnel identity) in the entry selected above.

Routing (Inter-Node Routing)

The RaLAP entity may perform routing based on RaL routing configuration parameters described in Table 1, Table 2, Table 3, or Table 4.

Each entry of the RaL Routing Configuration may include one or more of the following: a RaLAP Routing ID consisting of a RaLAP address and a RaLAP path identity, or a Next Hop RaLAP Address.

For a RaLAP Data PDU to be transmitted, RaLAP entity may: if the RaLAP Data PDU corresponds to a RaLAP SDU received from the upper layer and if there are no configuration parameters configured into the UE as illustration in the configuration disclosed herein, select any egress link. For example, the UE may selected an egress link from a default control routing and QoS mapping table which is pre-provisioned or pre-configured into the UE, or which is specified with default parameters to be used for control of routing and data transfer according to QoS requirements. Else if there is an entry in the RaL Routing Configuration whose RaLAP address matches the DESTINATION field, whose path identity is the same as the PATH field, and whose egress link corresponding to the Next Hop RaLAP Address is available, then select the egress link corresponding to the Next Hop RaLAP Address of the entry.

NOTE 1: An egress link is not considered to be available if the link is in RLF. NOTE 2: It is assumed the control of routing and QoS tables described herein are configured into the UE on per routing identity space basis, or on per routing address basis, or on per tunnel identity space basis or a combination thereof.

Else if there is at least one entry in the RaL Routing Configuration (Table 2 or Table 4) whose RaLAP address is the same as the DESTINATION field, and whose egress link corresponding to the Next Hop RaLAP Address is available: select an entry from the RaL Routing Configuration whose RaLAP address is the same as the DESTINATION field, and whose egress link corresponding to the Next Hop RaLAP Address is available; and select the egress link corresponding to the Next Hop RaLAP Address of the entry selected above.

Bearer Multiplexing (Intra-Node Routing)

An RaLTP entity may perform intra-node routing (bearer multiplexing) based on the selected RaLTP identity as described herein with regard to tunnel identity (RaLTP identity) selection for RaLTP operation.

For an RaLTP Data PDU to be transmitted, the RaLTP entity may: select an entry from the traffic to Tunnel identity Mapping Configuration (as illustrated in Table 1) whose RaLTP identity matches the selected RaLTP identity; select the RaLAP routing identity (or the RaLAP address) of the selected entry above; and select the RaLAP entity corresponding to the selected RaLAP routing identity (or routing address).

Mapping to RaL RLC Channel
Mapping to RaL RLC Channel for Traffic from Upper Layer to Next Hop
Case of RaLAP that Includes RaLTP Functions For an RaLAP SDU received from upper layers at an RaLAP node, the RaLAP entity performs mapping to an egress RaL RLC channel based on Traffic to RaL RLC Channel Mapping Configuration as illustrated in Table 1.

Each entry of the Traffic to RaL RLC Channel Mapping Configuration includes: an upper layer protocol identity, an egress link ID, or an egress RaL RLC channel ID. An upper layer protocol identity. For example, the upper layer protocol identity may be a PDCP identity, a bearer identity or any other identity configured for upper layer protocol instances differentiation or bearer differentiation, or an identity of a tunnel associated with an upper layer protocol above the RaLAP protocol, or an identity assigned to an upper layer protocol above the RaLAP protocol. The upper layer protocol identity may also be a traffic type specifier.

An egress link ID may be indicated by the egress link that corresponds to the Next-Hop RaLAP address as captured in the Traffic to Routing ID Mapping Configuration as illustrated in Table 1.

An egress RaL RLC channel ID may be indicated by the egress RLC channel ID as captured in the Traffic to RaL RLC channel Mapping Configuration as illustrated in Table 1.

For an RaLAP SDU received from upper layers at an RaLAP node for transmission, whose egress link has been selected as specified with regard to routing (inter-node routing), the RaLAP entity may, if the Traffic to RaL RLC channel Mapping Configuration is not configured as illustrated in Table 1, select the egress RaL RLC channel from a default control routing and QoS mapping table which is pre-provisioned or pre-configured into the UE, or which is specified with default parameters to be used for control of routing and data transfer according to QoS requirements.

Else: select an entry from the traffic to RaL RLC channel mapping configuration with its upper layer protocol identity corresponds to the upper layer protocol identity of this RaLAP SDU and its egress link ID corresponding to the selected egress link; and select the egress RaL RLC channel of the entry selected above.

Case of RaLAP that Relies on an RaLTP as a Separate Protocol

For an RaLAP SDU received from upper layers at an RaLTP node, the RaLAP entity performs mapping to an egress RaL RLC channel based on tunnel identity to RaL RLC channel Mapping Configuration as illustrated in Table 1.

Each entry of the Tunnel identity to RaL RLC Channel Mapping Configuration may include: a tunnel identity, an egress link ID, or an egress RaL RLC channel ID. The tunnel identity may be for example a PDCP identity, a bearer identity, or any other identity configured for upper layer protocol instances differentiation or bearer differentiation, or an identity of a tunnel associated with an upper layer protocol above the RaLTP protocol, or an identity assigned to an upper layer protocol above the RaLTP protocol. The upper layer protocol identity may also be a traffic type specifier.

An egress link ID may be indicated by the egress link that corresponds to the Next-Hop RaLAP address as captured in the Tunnel identity to RaL RLC channel Mapping Configuration as illustrated in Table 1.

An egress RaL RLC channel ID may be indicated by the egress RLC channel ID as captured in the Tunnel identity to RaL RLC channel Mapping Configuration as illustrated in Table 1.

For an RaLAP SDU received from an RaLTP protocol for transmission, whose egress link has been selected as specified with regard to routing (inter-node routing), the RaLAP entity may, if the Traffic to RaL RLC channel Mapping Configuration is not configured as illustrated in Table 1, select the egress RaL RLC channel from a default control routing and QoS mapping table which is pre-provisioned or pre-configured into the UE, or which is specified with default parameters to be used for control of routing and data transfer according to QoS requirements.

Else: select an entry from the tunnel identity to RLC channel mapping configuration with its tunnel identity corresponds to the value of the TEID filed of this RaLAP SDU and its egress link ID corresponding to the selected egress link; and select the egress RaL RLC channel of the entry selected above.

Mapping to RaL RLC Channel for Traffic from Ingress Link to Next Hop

For a RaLAP Data PDU received from a peer RaLAP entity or from a collocated RaLAP entity, the transmitting part of the RaLAP entity performs mapping to an egress BH RLC channel based on RaL ingress to egress RLC Channel Mapping Configuration, as illustrated in Table 2 or Table 4.

Each entry of the RaL ingress to egress RLC Channel Mapping Configuration may include: an ingress link ID; an egress link ID; an ingress RaL RLC channel ID; or an egress RaL RLC channel ID.

For a RaLAP Data PDU received from an ingress RaL RLC channel of an ingress link and for which the egress link has been selected: select an entry from the RaL ingress to egress RLC Channel Mapping Configuration, whose ingress RLC channel ID matches the RaLAP Data PDU's ingress RaL RLC channel, whose ingress link ID corresponds to the RaLAP Data PDU's ingress link, and whose egress link ID corresponds to the selected egress link; and select the egress RaLAP RLC channel corresponding to egress RLC channel ID of the entry selected above.

Receiving Operation

Receiving Operation at RaLAP Protocol

Figure 35:
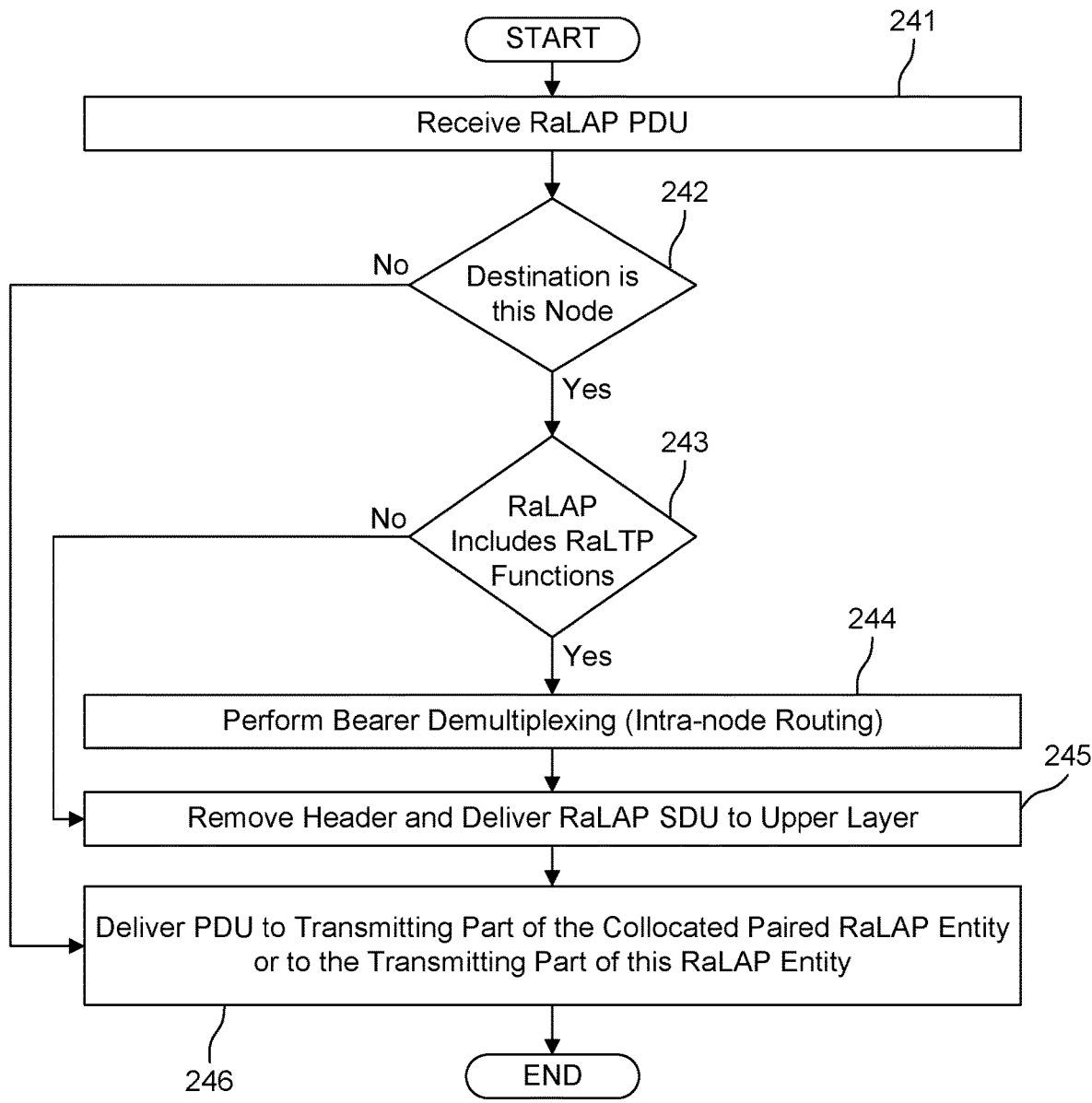
FIG. 35 illustrates an exemplary RaLAP Receiver Operation High level view.

A high-level view of the receiver part operation of the RaLAP protocol is illustrated in FIG. 35.

Case of RaLAP that Includes RaLTP Function

With reference to FIG. 35, at step 241, receive RaLAP PDU. At step 242, then determining whether destination field of the RaLAP PDU matches the RaLAP address of the node upon receiving the RaLAP Data PDU from lower layer (e.g., ingress RaL RLC channel). may At step 243, determining that RaLAP includes RaLTP functions. At step 244, perform bearer demultiplexing (intra-node routing) according to demultiplexing (intra-node routing) disclosed herein, to select the upper layer protocol entity the RaLAP SDU should be delivered to. At step 245, remove the RaLAP header of the RaLAP PDU. At step 246, deliver the RaLAP SDU to the selected upper layer protocol entity.

Else, from step 242, skip steps 243-step 245, and go to step 246 to deliver the RaLAP Data Unit to the transmitting part of the collocated paired RaLAP entity if the RaLAP entity has a paired RaLAP entity collocated on the node. Note: As described in option 1 and option 2 for sidelink adaptation protocol structure and entities; an RaLAP entity may be paired with a another RaLAP entity on the same node, wherein the two RaLAP entities worked in tandem as a hop, relaying traffic from one part of the network or from one node of the network or from one data link to another part of the network or to another node of the network or to another data link.

Else deliver the RaLAP Data Unit to the transmitting part of this RaLAP entity.

Case of RaLAP that Relies on an RaLTP as a Separate Protocol

Upon receiving an RaLAP Data PDU from lower layer (e.g., ingress RaL RLC channel), the receiving part of the RaLAP entity may if DESTINATION field of this RaLAP PDU matches the RaLAP address of this node: remove the RaLAP header of this RaLAP PDU and deliver the RaLAP SDU to upper layers.

Else: deliver the RaLAP Data Unit to the transmitting part of the collocated paired RaLAP entity if the RaLAP entity has a paired RaLAP entity collocated on the node. Note: As described in option 1 and option 2 for sidelink adaptation protocol structure and entities; an RaLAP entity may be paired with a another RaLAP entity on the same node, wherein the two RaLAP entities worked in tandem as a hop, relaying traffic from one part of the network or from one node of the network or from one data link to another part of the network or to another node of the network or to another data link.

Else deliver the RaLAP Data Unit to the transmitting part of this RaLAP entity.

Receiving Operation at RaLTP Protocol

Figure 36:
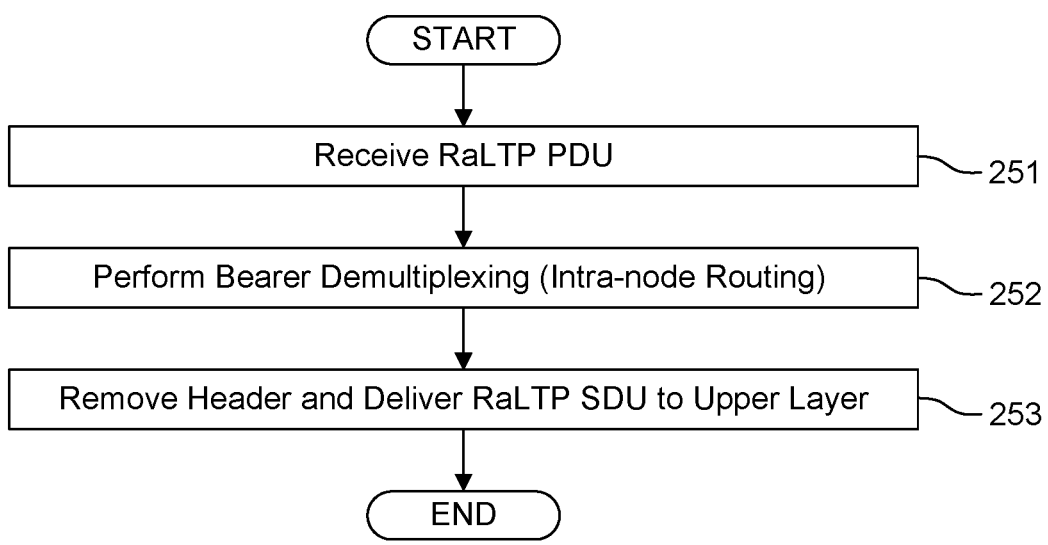
FIG. 36 illustrates an exemplary RaLTP Receiver Part Operation High level view.

A high-level view of the receiver part operation of the RaLAP protocol is illustrated in FIG. 36.

With reference to FIG. 36, at step 251 receive RaLTP PDU. At step 252, upon receiving an RaLTP Data PDU from lower layer (e.g., RaLAP), the receiving part of the RaLTP entity maymay perform bearer demultiplexing according to demultiplexing (intra-node routing) as disclosed herein. At step 253, remove or deliver the RaLAP SDU to the selected upper layer protocol entity.

Bearer Demultiplexing (Intra-Node Routing)

The bearer demultiplexing may be performed based on RaL intra-node routing (bearer demultiplexing) configuration as illustrated in Table 3.

Each entry of the RaL bearer demultiplexing configuration includes one or more of the following: an RaLAP Routing ID consisting of an RaLAP address and if applicable, an RaLAP path identity; a tunnel identity; or an upper layer protocol identity.

Case of RaLAP Performing Bearer Demultiplexing:

For an RaLAP SDU to be transmitted to upper layers, the RaLAP entity may, if there is RaL bearer demultiplexing configuration as illustrated in Table 3, select any upper layer protocol identity or in an alternative embodiment, select a default upper layer protocol identity as pre-configured or pre-provisioned into the RaLAP node or in yet another embodiment, or select a default upper layer protocol identity that is specified for, e.g. by standards.

Else if there is an entry in the RaL bearer demultiplexing configuration whose RaLAP address matches the DESTINATION field in the corresponding RaLAP PDU, and whose tunnel identity is the same as the TEID field, select the upper layer protocol identity of the entry.

Case of RaLTP Performing Bearer Demultiplexing:

For an RaLTP SDU to be transmitted to upper layers, the RaLAP entity may, if there is RaL bearer demultiplexing configuration as illustrated in Table 3, select any upper layer protocol identity or in an alternative embodiment, select a default upper layer protocol identity as pre-configured or pre-provisioned into the RaLTP node or in yet another embodiment, or select a default upper layer protocol identity that is specified for, e.g. by standards.

Else if there is an entry in the RaL bearer demultiplexing configuration whose RaLAP address matches the RaLAP address for this RaLTP SDU, and whose tunnel identity is same as the TEID field, select the upper layer protocol identity of the entry.

Flow Control Feedback

For a link, when a flow control feedback is triggered when the buffer load exceeds a certain level or when a RaLAP control PDU for flow control polling is received at the receiving part, the transmitting part of this RaLAP entity, the receiving part of the RaLAP entity receiving the traffic subject to flow control may: construct a RaLAP Control PDU for flow control feedback in accordance with control PDU formats disclosed herein; and if the egress RaL RLC channel for the RaLAP control PDU is configured as described herein, submit this RaLAP Control PDU to the configured egress RaL RLC channel of the egress link.

Else submit this RaLAP Control PDU to any egress RaL RLC channel of the egress link.

The flow control feedback mechanism described above is a flow control for a specific link, the flow control feedback is between two adjacent nodes.

Herein, it is also disclosed to enhance the feedback scheme above to allow end-to-end flow control feedback between peer RaLAP entities. Such flow control feedback scheme may be beneficial for example for use cases where RaLAP entity provides RaLTP functions such as bearer multiplexing or bearer demultiplexing.

The quantity reported in the flow control feedback may be available buffer size, or preferred data rate, etc. In order to limit flow control feedback reporting overhead, the quantity reported in the flow control feedback may be quantized over a number of levels, wherein a level may correspond to a range of the quantity being reported. For example, if the quantity reported in a flow control feedback is expressed in kilobyte, a quantized level could represent for example a range from 0 to 100 kilobytes, the next level could represent a range from above 100 kilobytes to 200 kilobytes and so on.

The flow control feedback mechanism described herein may also be used by RaLTP protocol. For example, the RaLTP protocol may be used for an end-to-end flow control feedback mechanism wherein the link, tunnel or bearer subject to flow control is between two peers RaLTP protocols. The following is an exemplary embodiment.

For a link, the receiving part of the RaLTP entity receiving the traffic subject to flow control: when a flow control feedback is triggered when the buffer load exceeds a certain level or when a RaLTP control PDU for flow control polling is received at the receiving part, the transmitting part of this RaLTP entity may: construct a RaLTP Control PDU for flow control feedback in accordance with control PDU formats disclosed herein or transmit this RaLTP Control PDU following RaLTP PDU transmission procedure as described herein with regard to transmitting operation.

The procedure above may also be used by an RaLAP protocol to perform an end-to-end flow control. The following is an exemplary text:

For a link, when a flow control feedback is triggered when the buffer load exceeds a certain level or when a RaLAP control PDU for flow control polling is received at the receiving part, the transmitting part of this RaLAP entity, the receiving part of the RaLAP entity receiving the traffic subject to flow control may: construct a RaLAP Control PDU for flow control feedback in accordance with control PDU disclosed herein; or transmit this RaLAP Control PDU following RaLAP PDU transmission procedure as described herein with regard to transmitting operation.

The granularity of a flow control feedback may be per RLC channel feedback, or per bearer or per tunnel feedback, or per sidelink L2 destination feedback, or per RLC channel per sidelink L2 destination feedback or per RaLAP entity feedback or per RaLAP address feedback or per routing ID feedback or per node feedback.

Flow Control Polling

When a flow control poll is to be transmitted over an egress link, the transmitting part of the RaLAP entity at a node, constructs a RaLAP Control PDU for flow control polling in accordance with control PDU disclosed herein.

If the egress RaL RLC channel for the RaLAP control PDU is configured as specified herein, submit this RaLAP Control PDU to the configured egress RaL RLC channel of the egress link. Else: submit this RaLAP Control PDU to any egress RaL RLC channel of the egress link.

In an additional embodiment, an RaLAP protocol may use the flow control polling to request the peer RaLAP protocol to increase data rate or to decrease data rate.

The flow control polling mechanism described herein may also be used by RaLTP protocol. For example, the RaLTP protocol may be used for an end-to-end flow control polling mechanism wherein the link, tunnel or bearer subject to flow control polling is between two peer RaLTP protocols. The following is an exemplary embodiment:

For a link, the RaLTP entity at the RaLTP may when a flow control polling is triggered, the transmitting part of this RaLTP entity may: construct a RaLTP Control PDU for flow control polling in accordance with control PDU format disclosed herein; or transmit this RaLTP Control PDU following RaLTP PDU transmission procedure as described herein with regard to transmitting operation.

The procedure above may also be used by an RaLAP protocol to perform an end-to-end flow control polling. The following is an exemplary text.

For a link, the RaLAP entity at a node may when a flow control polling is triggered, the transmitting part of this RaLAP entity may: construct a RaLAP Control PDU for flow control polling in accordance with control PDU format disclosed herein; or transmit this RaLAP Control PDU following RaLAP PDU transmission procedure as described herein with regard to transmitting operation.

The granularity of a flow control polling may be per RLC channel, per bearer or per tunnel, per sidelink L2 destination, or per RLC channel per sidelink L2 destination, or per RaLAP entity, per RaLAP address, or per routing ID or per node.

Relay Link RLF Indication

Transmitting Part

When a RaL RLF recovery failure is detected, for each egress link associated with the detected RLF, the transmitting part of the RaLAP entity may construct an RaLAP Control PDU for RaL RLF indication in accordance with control PDU formats disclosed herein. if the egress RaL RLC channel for the RaLAP control PDU is configured as specified herein, submit this RaLAP Control PDU to the configured egress RaL RLC channel of the egress link; else submit this RaLAP Control PDU to any egress RaL RLC channel of the egress link.

The granularity of a RLF indication may be per link, per RLC channel, per bearer or per tunnel, per sidelink L2 destination, per RLC channel per sidelink L2 destination, per RaLAP entity, per RaLAP address, per routing ID, or per node.

Receiving Part

Upon receiving a RaLAP Control PDU for backhaul RLF indication from lower layer (e.g., ingress RaL RLC channel), the receiving part of the RaLAP entity may:

indicate to upper layers that the backhaul RLF indication has been received for the ingress link where this RaLAP Control PDU is received.

End-to-End Keep Alive

When a keep alive poll is to be transmitted over an egress link, the transmitting part of the RaLAP entity may constructs a RaLAP Control PDU for keep alive polling in accordance with control PDU format disclosed herein. If the egress RaL RLC channel for the RaLAP control PDU is configured as specified herein, submit this RaLAP Control PDU to the configured egress RaL RLC channel of the egress link. Else: submit this RaLAP Control PDU to any egress RaL RLC channel of the egress link.

The keep alive polling mechanism described herein may also be used by RaLTP protocol. For example, the RaLTP protocol may be used for an end-to-end keep alive polling mechanism wherein the link, tunnel or bearer subject to keep alive polling is between two peer RaLTP protocols. The following is an exemplary embodiment.

For a link, the RaLTP entity at the RaLTP, may when a keep alive polling is triggered, the transmitting part of this RaLTP entity may: construct a RaLTP Control PDU for keep alive polling in accordance with control PDU formats disclosed herein; or transmit this RaLTP Control PDU following RaLTP PDU transmission procedure as described herein with regard to transmitting operation.

The procedure above may also be used by an RaLAP protocol to perform an end-to-end keep alive polling. The following is exemplary text.

For a link, the RaLAP entity at the RaLAP may: when a keep alive polling is triggered, the transmitting part of this RaLAP entity may: construct a RaLAP Control PDU for keep alive polling in accordance with control PDU formats disclosed herein; or transmit this RaLAP Control PDU following RaLAP PDU transmission procedure as described herein with regard to transmitting operation.

The granularity of a keep alive polling may be per link, per RLC channel, per bearer, per tunnel, per sidelink L2 destination, per RLC channel per sidelink L2 destination, per RaLAP entity, per RaLAP address, per routing ID, or per node.

Tunnel Endpoint Identity (TEID) Structure

As described herein, one of the functions of the adaptation layer (i.e. RaLAP or RaLTP) is the multiplexing of bearers into RLC channels i.e. the determination of one or more upper layer protocol entities for, e.g. PDCP entities whose traffics are to be mapped to the same SL RLC channel or Uu RLC channel. As such, the multiplexing function may require the identification of the upper layer protocol instance associated with a data packet, i.e. an upper layer protocol identity for, e.g. PDCP entity identity that will be used for packet multiplexing, and included into the adaptation layer header. Denoted herein is such an identity (e.g., a bearer identity or bearer ID for short, the PDCP entity identity, an identity of a tunnel associated with a bearer, an identity of a tunnel associated with an upper layer protocol above the RaLAP protocol or the RaLTP protocol, an identity of an upper layer protocol above the RaLAP protocol or the RaLTP protocol, or the identity of the RaLTP protocol. Another function of the adaptation layer (e.g., RaLAP or RALTP) is the demultiplexing of bearers, e.g., demultiplexing of traffic mapped to the same SL RLC channel, but designated to different upper layer protocol entities for example PDCP entities within the same node. This function is also referred to in this disclosure as intra-node routing.

In one embodiment, the intra-node routing identity or bearer identity generically denoted in this disclosure TEID, may only have local significance within the node performing multiplexing function (for e.g. a source remote UE 201, or base station 204), or demultiplexing function (for example a destination remote UE 209, or a base station 204). In another embodiment, the TEID may have broader significance for example across more than one node, for example in both source remote UE 201 and destination remote UE 209, or in both base station and destination remote UE 209 or in source remote UE 201 and base station 204, etc.

In one embodiment, the TEID structure may comprise of the identity of the source node and a local TEID value, wherein the local TEID has only local significance. In another embodiment, the TEID structure may comprise of the identity of the destination node and a local TEID value, wherein the local TEID has only local significance. In yet another embodiment, the TEID may be a single component identity, wherein the TEID has either only local significance or a broader significance as defined herein.

The source node (for e.g. source remote UE 201 or base station 204) and destination node (for e.g. destination remote UE 209 or base station 204) may exchange signaling, for example in the control plane, to configure each other with their respective TEID(s). The source node (for e.g. source remote UE 201 or base station 204) may configure the destination node (for e.g. destination remote UE 209 or base station 204) with one or more TEIDs of the source node, or one or more TEIDs of the destination nodes or both. Similarly, the destination node (for e.g. destination remote UE 209 or base station 204) may configure the source node (for e.g. source remote UE 201 or base station 204), with one or more TEIDs of the destination node, or one or more TEIDs of the source node TEID or both. Alternatively, a third entity for example a base station 204 may configure the source remote UE 201 or into the destination remote UE 209, with one or more TEIDs, wherein the one or more TEIDs may have significance in both the source node and the destination node.

As discussed herein, one or more tunneling protocol identity space may be configured into a node for example a relay UE node 202, a UE-to-Network Relay node 203, a source remote UE 201, a remote destination UE 209, a UE, an RSU, a gNB 204, a gNB DU, or a gNB CU. A tunneling protocol identity may be defined on the basis of one tunneling protocol identity space per serving gNB, or on the basis of one tunneling protocol identity space per destination remote UE 209, or on the basis of one tunneling protocol identity space per source remote UE 201, or on the basis of one tunneling protocol identity space per layer-2 destination ID, or on the basis of one tunneling identity space per routing tree or on the basis of one tunneling protocol identity space per routing network, etc. In this case, the structure of the TEID may additionally include the TEID space identity. Similarly, if a node (for e.g. a source remote UE 201, a destination remote UE 209, a U2U relay or U2N relay) is configured with more than one node address space for that node (for e.g. a source UE is configured with more than one source node address space), then the node address structure may comprise of a node address space identity and the address of the node within that address space. For example, a source node address may comprise of the address space identity and the address of the source within that address space.

Protocol Data Units, Formats and Parameters

Protocol Data Units

Data PDU

The RaLAP Data PDU or the RaLTP Data PDU may be used to convey one of the following in addition to the PDU header upper layer data.

Control PDU

The RaLAP Control PDU or the RaLTP control PDU is used to convey one of the following [in addition to the PDU header]: flow control feedback with various level of granularity as described herein with regard to flow control feedback disclosed herein; flow control polling with various level of granularity as described herein with regard to flow control polling disclosed herein; RaL RLF indication with various level of granularity as described herein with regard to relay link RLF indication disclosed herein; or keep alive polling with various level of granularity as described herein with regard to end-to-end keep alive disclosed herein.

Format

An RaLAP PDU or an RaLTP PDU is a bit string that is byte aligned (e.g., multiple of 8 bits) in length. The formats of RaLAP PDUs and RaLTP PDUs are described in later section below.

Data PDU

RaLAP

Figure 37:
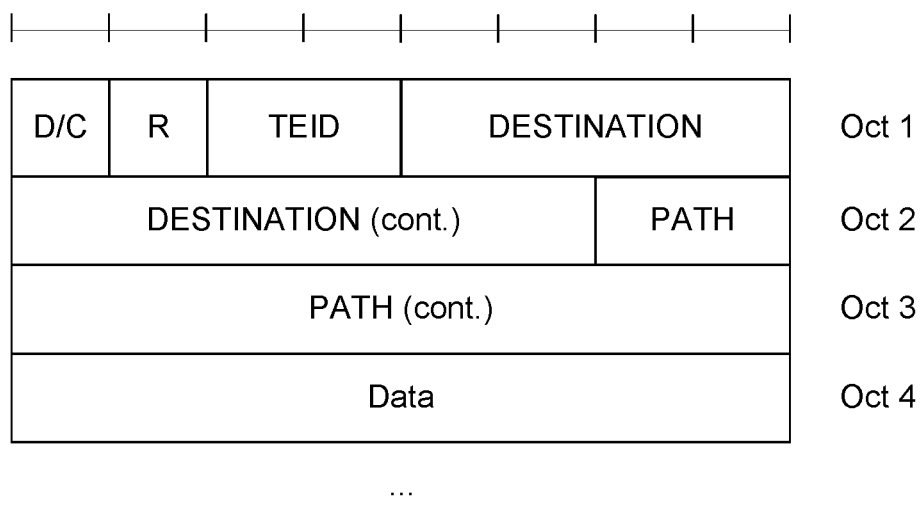
FIG. 37 illustrates an exemplary RaLAP Data PDU format—Example 1.

The FIG. 37 illustrates an exemplary embodiment of an RaLAP data PDU. In this example, the TEID field (tunnel identity) is coded on 2 bits, the destination field is coded on 10 bits and the PATH field (or path identity) is coded on 10 bits. The D/C (Data or Control) field is coded on 1 bit and there is only one reserved (R) bit. The Data field start from the fourth octet and can be multiple octets long.

Figure 38:
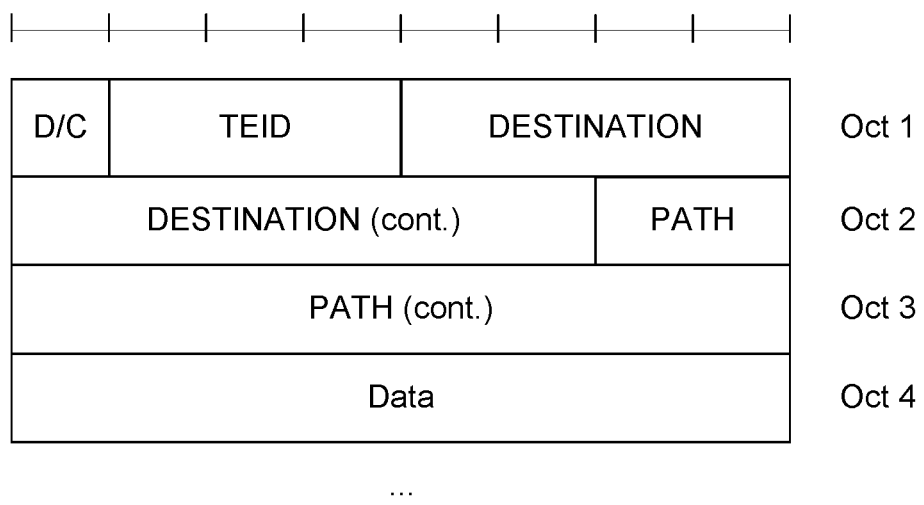
FIG. 38 illustrates an exemplary RaLAP Data PDU format—Example 2.

The FIG. 38 illustrates another exemplary embodiment of an RaLAP data PDU. In this example, the TEID field (tunnel identity) is coded on 3 bits, the destination field is coded on 10 bits and the PATH field (or path identity) is coded on 10 bits. The D/C (Data or Control) field is coded on 1 bit and there is no reserved (R) bit. The Data field start from the fourth octet and can be multiple octets long.

Figure 39:
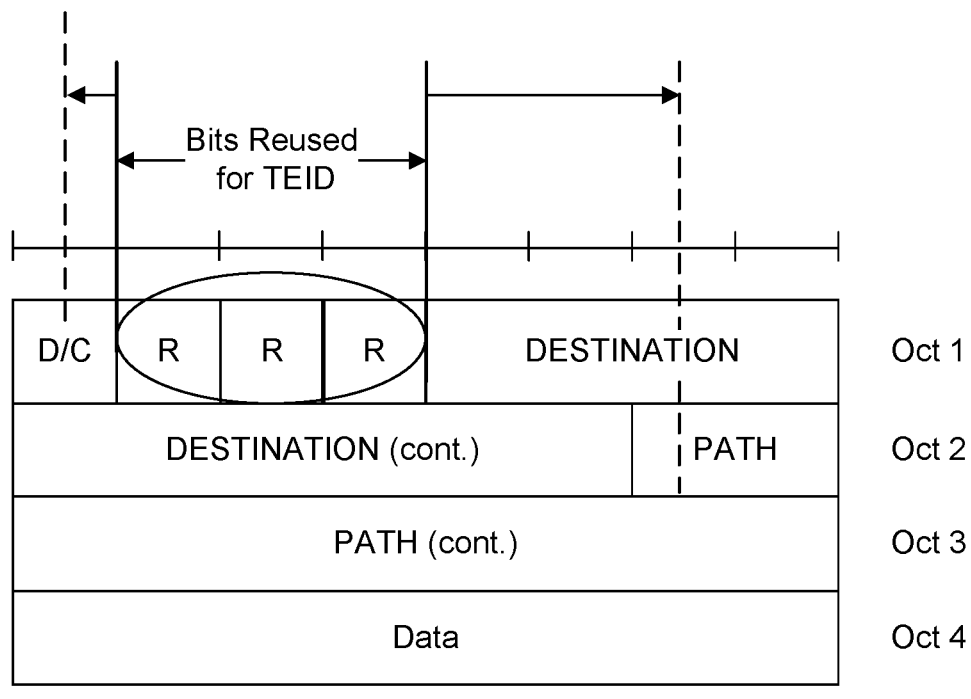
FIG. 39 illustrates an exemplary RaLAP Data PDU format—Example 3.

FIG. 39 illustrates yet another exemplary embodiment of an RaLAP data PDU. In this example, the R bits may be re-used to signal the TEID. In a first embodiment, the TEID filed may be coded over 3 bits, wherein all the reserved bits are used to represents the TEID. In a second embodiment, as represented by the circle around the R bits and the arrow pointing away from the solid line to the dash line, the TEID (tunnel identity) field may be coded over more than 3 bits, the destination field may be coded on less than 10 bits or the PATH field (or path identity) may be coded on less than 10 bits. In this embodiment, the D/C (Data or Control) field if it exists may be code coded on 1 bit, otherwise there is no DC filed. Yet in a third embodiment, the R field may be coded in less than 3 bits e.g., the TEID field may use up to all three R bits. In this embodiment, there might not be an R bit. The Data field start from the fourth octet and can be multiple octets long.

RaLTP

Figure 40:
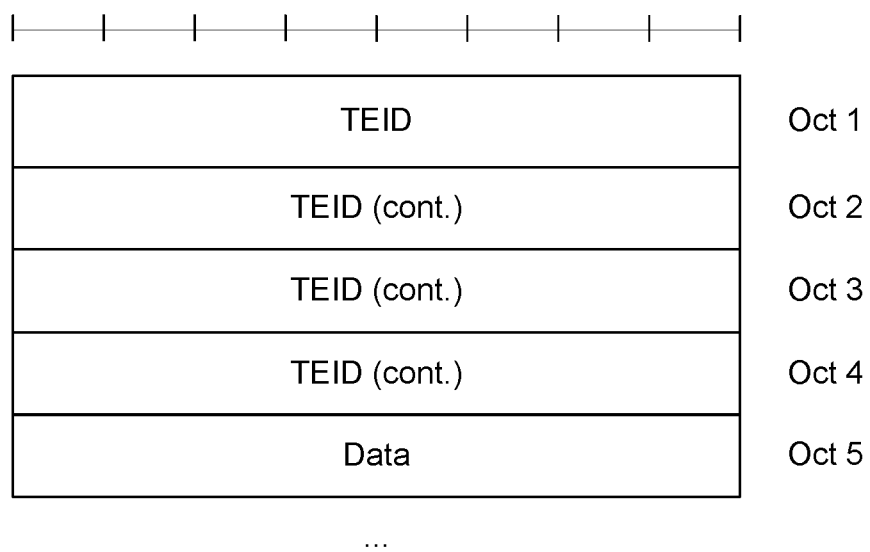
FIG. 40 illustrates an exemplary RaLTP Data PDU format—Example 1.

The FIG. 40 illustrates an exemplary embodiment of an RaLTP data PDU. In this example, the TEID (tunnel identity) field is coded on 4 bytes (.e.g., 4 octets). The Data field start from the fifth octet and can be multiple octets long.

Figure 41:
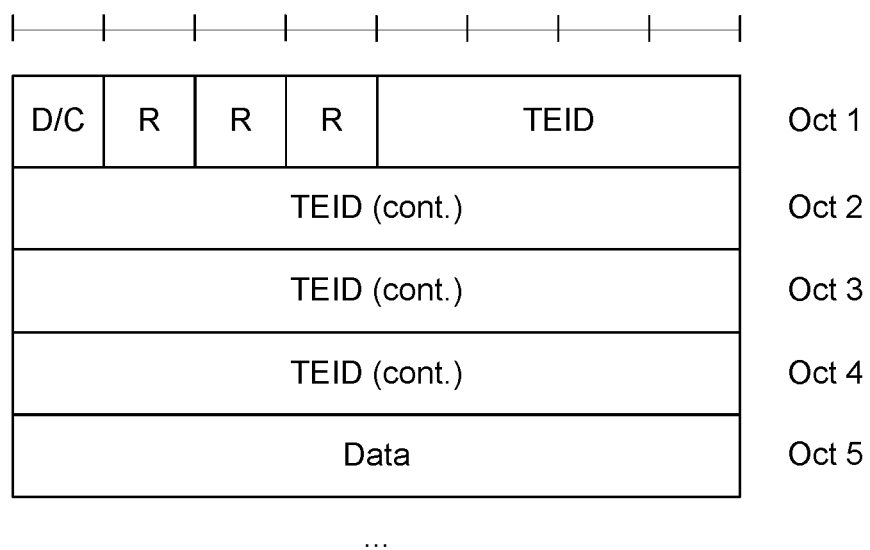
FIG. 41 illustrates an exemplary RaLTP Data PDU format—Example 2.

The FIG. 41 illustrates another exemplary embodiment of an RaLTP data PDU. In this example, the TEID field (tunnel identity) is coded on 4 octets. The D/C (Data or Control) field is coded on 1 bit and there are three reserved (R) bits. The Data field start from the fifth octet and can be multiple octets long.

Control PDU

The following are examples of a control PDU for RaLAP or RaLTP.

Figure 42:
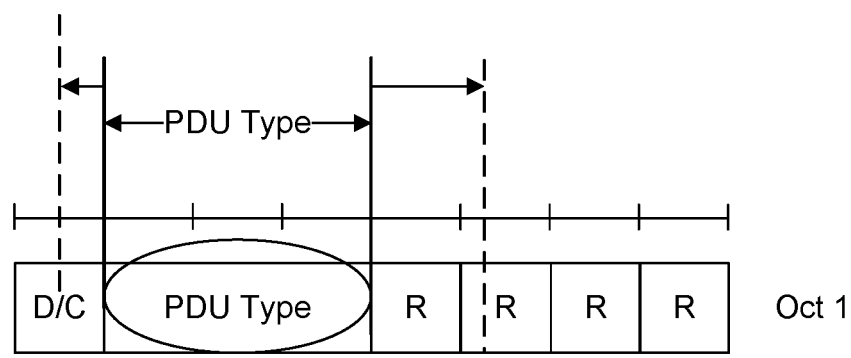
FIG. 42 illustrates an exemplary RaLAP or RaLTP control PDU format—Example 1.

The FIG. 42 illustrates an exemplary embodiment of an RaLAP or an RaLTP control PDU. In a first embodiment, the PDU type might be coded on 3 bits. In a second embodiment, as represented by the circle around the R bits and the arrow pointing away from the solid line to the dash line, the PDU Type may be coded over more than 3 bits. The D/C (Data or Control) field if it exists may be code coded on 1 bit, otherwise there is no DC filed. Similarly, the PDU type coding may re-used some of the R bits. In this second embodiment, the R bit may be coded in less than 4 bits, and possibly depending on the size of the PDU Type field there might not be an R bit. In a third embodiment, the PDU Type may be coded in less than 3 bits. In this third embodiment, there might be more than 4 reserved bits. In this example there is no TEID field. One possible specification direction is to define a standardized TEID value that is used for the exchange of control PDU between peer RaLAP or RaLTP protocols. Alternatively, the TEID used for control PDU may be configured into the nodes or exchanges between nodes. It should be noted that in an alternative to this embodiment, a TEID filed may be included in the control PDU wherein is the TEID field may be 1 to 4 bits long. In the case the TEID field is 4 bits long, there is no R bit.

Figure 43:
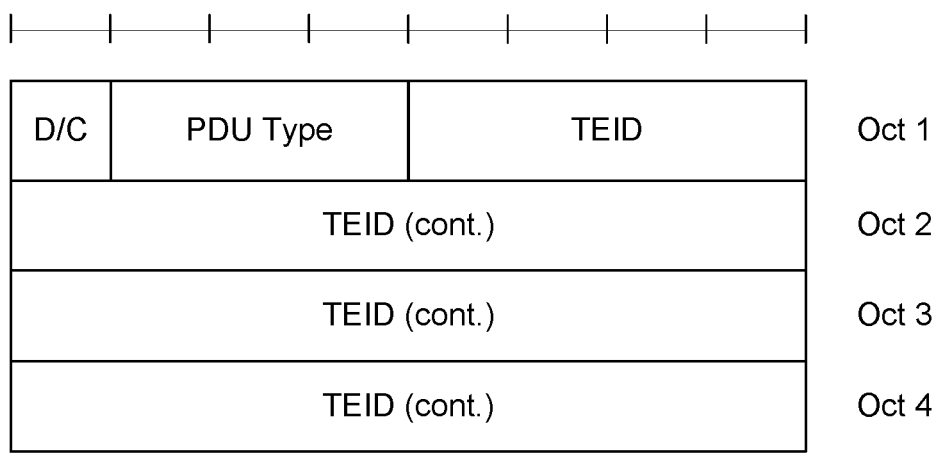
FIG. 43 illustrates an exemplary RaLAP or RaLTP control PDU format—Example 2.

The FIG. 43 illustrates another exemplary embodiment of an RaLAP or an RaLTP control PDU. In this example, the PDU Type field is coded over 3 bits. The D/C (Data or Control) field is coded on 1 bit. The TEID field is coded over 4 octets.

Figure 44:
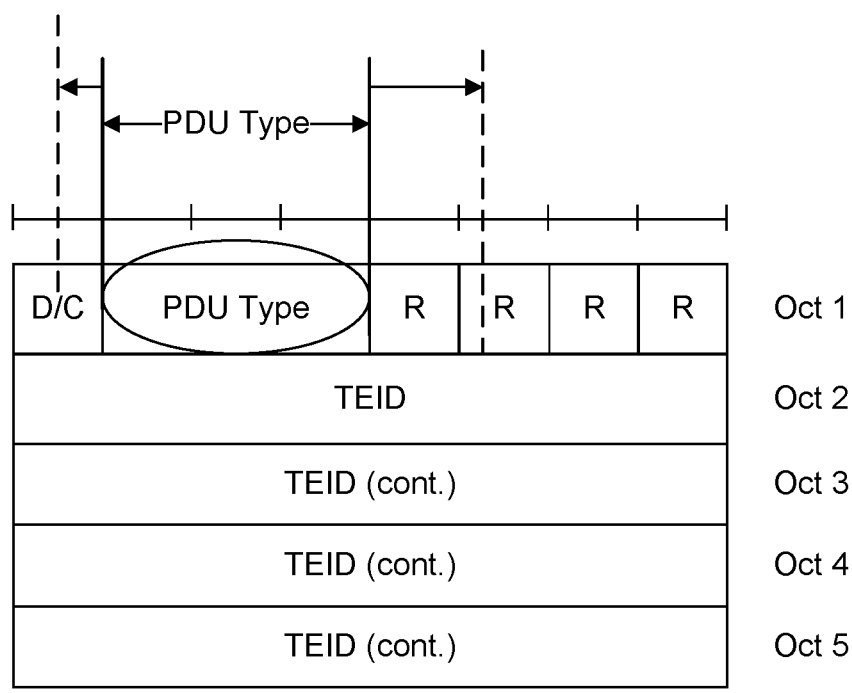
FIG. 44 illustrates an exemplary RaLAP or RaLTP control PDU format—Example 3.

The FIG. 44 illustrates an exemplary embodiment of an RaLAP or an RaLTP control PDU. In a first embodiment, the PDU type might be coded on 3 bits. In a second embodiment, as represented by the circle around the R bits and the arrow pointing away from the solid line to the dash line, the PDU Type may be coded over more than 3 bits. The D/C (Data or Control) field if it exists may be code coded on 1 bit, otherwise there is no DC filed. Similarly, the PDU type coding may re-used some of the R bits. In this second embodiment, the R bit may be coded in less than 4 bits, and possibly depending on the size of the PDU Type field there might not be an R bit. In a third embodiment, the PDU Type may be coded in less than 3 bits. In this third embodiment, there might be more than 4 reserved bits. In this example the TEID field is 4 octet long. It should be noted that in a fourth embodiment, a TEID filed may be included in the control PDU wherein is the TEID field may be 1 to 4 bits long. In the case the TEID field is 4 bits long, there is no R bit.

Example of TEID Structure

Figure 45:
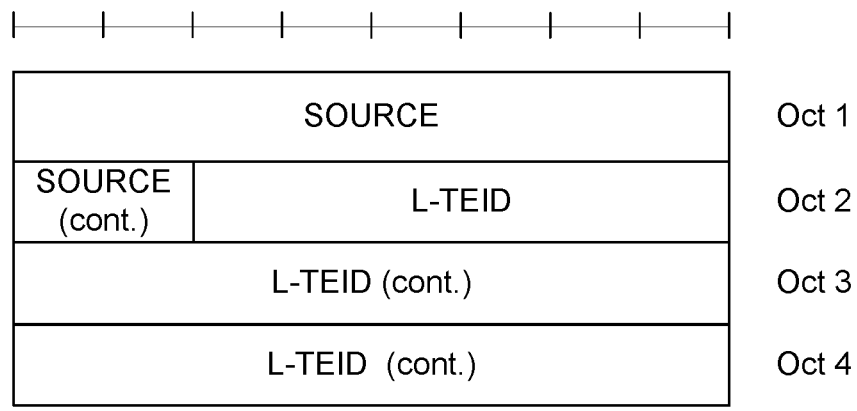
FIG. 45 illustrates an exemplary TEID Structure—Example 1.
Figure 46:
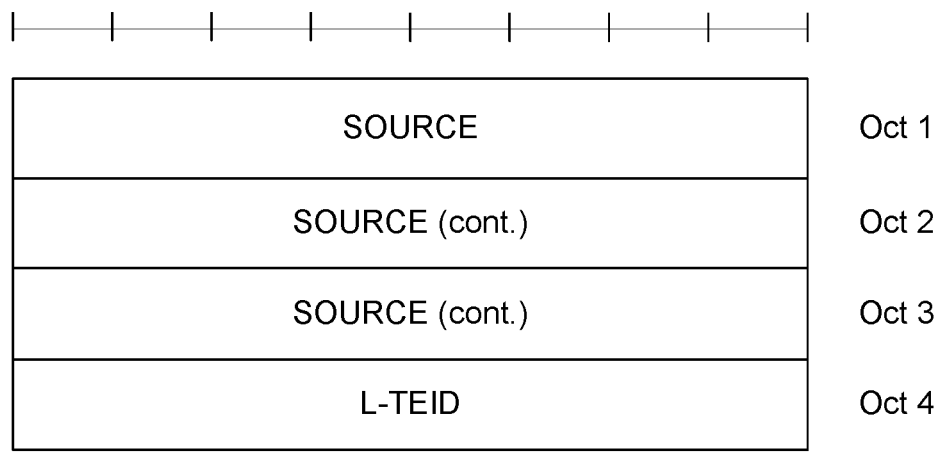
FIG. 46 illustrates an exemplary TEID Structure—Example 2.
Figure 47:
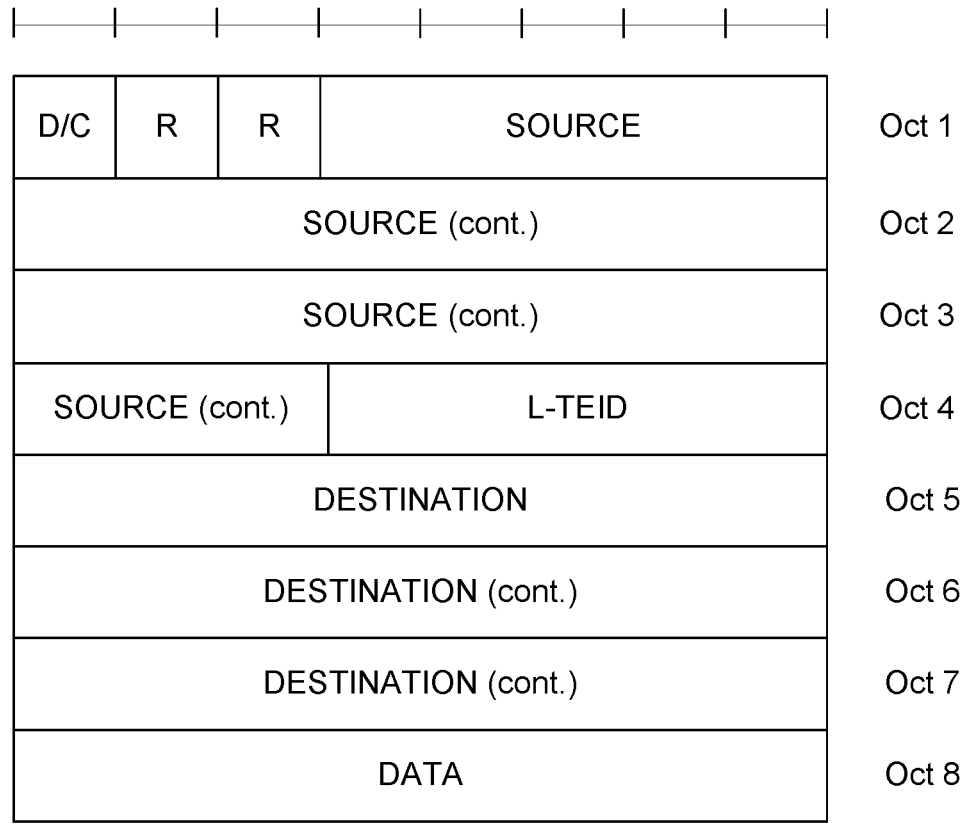
FIG. 47 illustrates an exemplary Local TEID based RaLAP Data PDU format—Example 1.
Figure 48:
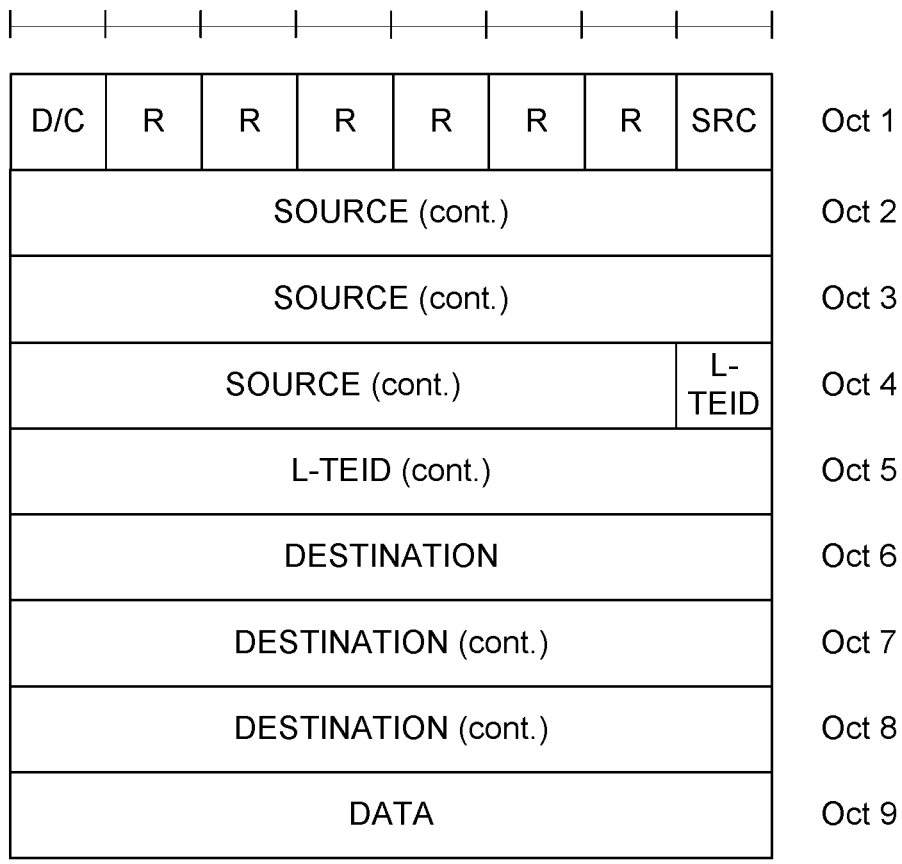
FIG. 48 illustrates an exemplary Local TEID based RaLAP Data PDU format—Example 2.

Herein are exemplary illustrations of tunnel endpoint identity structure, and example of tunnel endpoint identity structure inside sidelink adaptation layer protocol header. It is understood the exemplary illustrations of TEID provided herein may be used inside any PDU header (control or data) of sidelink adaptation layer protocol (RaLAP or RaLTP) proposed in this disclosure. In FIG. 45. The TEID is coded on 4 bytes (e.g., 4 octets) with the SOURCE field coded on 10 bits and the local TEID (L-TEID) coded on 22 bits. In FIG. 46. TEID is also coded on 4 bytes with the SOURCE field coded on 24 bits and the local TEID may be coded on 8 bits or less for e.g. 5 bits. In should be noted that in FIG. 45 and FIG. 46, the SOURCE and the L-TEID may be coded in any combination of bits, For example, the SOURCE field may have been coded on 16 bits for example if the standards decided to use a SOURCE field length that is same as that of C-RNTI. In this case the TEID may be coded on 16 bits or less with the remaining bits used for data or other header information. FIG. 47 and FIG. 48, are illustrations of the use of source remote node (example source remote UE 201) Identity and local TEID in a Data PDU header of the sidelink adaptation protocol. FIG. 47 illustrates a case where the SOURCE field is coded on 24 bits and the local TEID is coded on 5 bits. This example assumed the SOURCE may be coded like a sidelink Source Layer-2 ID, which is coded on 24 bits. The coding of the local TEID on 5 bits assumes the local TEID range is same as the maximum number of 32 bearers for communication per UE currently specified for the Uu interface. FIG. 48 illustrates a case where the SOURCE field is coded on 24 bits and the local TEID is coded on 9 bits for a total of 512 possible bearers per source remote UE 201, or 512 possible bearers per destination remote UE 209, or 512 possible bearers per context of source Remote UE 201 in a base station 204 or the like, or 512 possible bearers per context of destination remote UE 209 in a base station 204. This is example assumed the SOURCE may be coded like a sidelink Source Layer-2 ID, which is coded on 24 bits. The local TEID coded on 5 bits assumes the local TEID range is same as the maximum number of 512 bearers for NR sidelink communication per UE. In both FIG. 47 and FIG. the DESTINATION field is also ode on 24 bites, with the assumption that the DESTINATION field may be coded like a sidelink Destination Layer-2 ID, which is coded on 24 bits. FIG. 49 and FIG. 50 are illustrations of the use of source remote node 201 (e.g., source remote UE) Identity and local TEID in a Control PDU header of the sidelink adaptation protocol, where in the SOURCE field, the local TEID and the DESTINATION field are coded the same way as in the data PDU header.

Parameters

If not otherwise mentioned in the definition of each field, the bits in the parameters may be interpreted as follows: the left most bit string is the first and most significant and the right most bit is the last and least significant bit.

Unless otherwise mentioned, integers are encoded in standard binary encoding for unsigned integers. In all cases the bits appear ordered from MSB to LSB when read in the PDU.

Destination:

This field carries RaLAP address of destination of a base station, a peer remote UE or a relay node for e.g. Relay UE node 202, UE-to-Network Relay node 203. In the context of the adaptation protocol layer, this filed may be interpreted as the identity of the destination remote UE 209, or of the destination base station 204, or of any other destination node.

Source:

This field carries RaLAP address of source of a base station, a remote UE 201 or a relay node for e.g. Relay UE node 202, UE-to-Network Relay node 203. In the context of the adaptation protocol layer, this filed may be interpreted as the identity of the source remote UE 201, or of the source base station 204, or of any other source node.

TEID:

This field identifies, a bearer, or an upper layer protocol above the adaptation layer. The field may only have local significance relative to the context of a node for example a source node or a remote node. Alternatively, this field may have broader significance, for example across more than one contexts, for example across the context of a source remote node (e.g. source remote UE 201) and the context of a destination remote node (e.g. destination remote UE 209).

PATH:

This field carries RaLAP path identity.

Data:

In the case of RaLTP protocol, this field carries the RaLTP SDU (for e.g. PDCP PDU).

Similarly, in the case of RaLAP protocol that also provide RaLTP function, this field carries the RaLAP SDU (for e.g. PDCP PDU). In the case of RaLAP that operates with a separate RaLTP protocol, this field carries the RaLAP SDU (for e.g. RaLTP PDU).

R:

Reserved. In a given version of the protocol, the reserved bits may be set to 0. In yet another version of the protocol, one or more of the reserved bits may be used to carry out additional control message or information between peer RaLAP protocols or between peer RaLTP protocol.

D/C:

In the case of RaLAP protocol, this field indicates whether the corresponding RaLAP PDU is an RaLAP Data PDU or an RaLAP Control PDU. Similarly, in the case of RaLTP protocol, this field indicates whether the corresponding RaLTP PDU is an RaLTP Data PDU or an RaLTP Control PDU.

TABLE 5

D/C field

| Bit | Description |
| --- | --- |
| 0 | RaLAP Control PDU for RaLAP protocol or RaLTP control PDU for RaLTP protocol |
| 1 | RaLAP Data PDU for RaLAP protocol or RaLTP data PDU for RaLTP protocol |

PDU Type:

This field indicates the type of control information included in the corresponding RaLAP Control PDU or RaLTP control PDU.

TABLE 6

PDU Type Example 1

| Bit | Description |
| --- | --- |
| 000 | End-to-end keep-alive polling |
| 001 | End-to-end keep-alive response |
| 010 | End-to-end RLF indication |
| 011 | End-to-end flow control feedback |
| 100 | End-to-end flow control polling |
| 101-111 | Reserved |

TABLE 7

PDU Type Example 2

| Bit | Description |
| --- | --- |
| 0000 | Flow control feedback per BH RLC channel |
| 0001 | Flow control feedback per routing ID |
| 0010 | Flow control feedback polling |
| 0011 | BH RLF indication |
| 0100 | Keep alive poling |
| 0101 | Keep alive poling response |
| 0110-1111 | Reserved |

RaL RLC Channel ID:

The RaL RLC channel ID is the identity of the RAL RLC channel. It may be 16 bits long.

Routing ID:

The routing ID is the identity of a route, that comprises a routing address and a path identity. It may be 20 bits long.

It is understood that the entities performing the steps illustrated herein, such as FIG. 1-FIG. 50, may be logical entities. The steps may be stored in a memory of, and executing on a processor of, a device, server, or computer system such as those illustrated in FIG. 52F or FIG. 52G. Skipping steps, combining steps, or adding steps between exemplary methods disclosed herein (e.g., FIG. 1-FIG. 50) is contemplated.

Table 8 provides exemplary abbreviations and definitions.

TABLE 8

Abbreviations and Definitions

| Abbreviations | Definitions |
| --- | --- |
| 3GPP | 3rd Generation Partnership Project |
| 5G | 5th Generation |
| 5GS | 5G System |
| AMF | Access and Mobility Management Function |
| APP or AP | Application |
| AS | Access Stratum |
| BAP | Backhaul Adaptation Protocol |
| CN | Core Network |
| CU | Central Unit |
| CP | Control Plane |
| D2D | Device to Device Communication |
| DeNB | Donor eNB |
| DLL | Data Link Layer |
| DU | Distributed Unit |
| E2E | End to End |
| eNB | Evolved Node B |
| gNB | NR NodeB |
| GPRS | General Packet Radio Service |
| GTP | GPRS Tunneling Protocol |
| GTP-C | GTP Control |
| GTP-U | GTP User |

TABLE 8-continued

Abbreviations and Definitions

| Abbreviations | Definitions |
|---|---|
| HARQ | Hybrid Automatic Repeat Request |
| IoT | Internet of Things |
| IP | Internet Protocol |
| ID | Identity or Identifier |
| L1 | Layer-1 |
| L2 | Layer-2 |
| LCH | Logical Channel |
| LoL | Local Link |
| LTE | Long Term Evolution |
| L-TEID | Local TEID |
| MAC | Medium Access Control |
| MM | Mobility Management |
| N2 | Reference point between the (R)AN and the AMF |
| N3 | Reference point between the (R)AN and the UPF |
| N6 | Reference point between the UPF and a Data Network |
| N11 | Reference point between the AMF and the SMF |
| NAS | Non-AS |
| NB | NodeB |
| NG | Next Generation |
| NR | New Radio |
| NW | Network |
| PC5 | The reference point between ProSe-enabled UEs used for control and user plane for ProSe Direct Discovery, ProSe Direct Communication and ProSe UE-to-Network Relay |
| PDCP | Packet Data Convergence Protocol |
| PDU | Protocol Data Unit |
| PHY | Physical layer |
| ProSe | Proximity-Based Services |
| PS | Protocol Stack |
| PSID | Provider Service Identifier |
| QoS | Quality of Service |
| R | Reserved |
| RaL | Relay Link |
| RaLAP | Relay Link Adaptation Protocol |
| RaLTP | Relay Link Tunneling Protocol |
| RAN or R(AN) | Radio Access Network |
| RLC | Radio Link Control |
| ROHC | Robust Header Compression |
| RRC | Radio Resource Control |
| RSU | Roadside Unit |
| RX | Receiver, Receive |
| SA | System Aspects |
| SA1 | SA working group 1 |
| SA2 | SA working group 2 |
| SCTP | Stream Control Transmission Protocol |
| SDAP | Service Data Adaptation Protocol |
| SDU | Service Data Unit |
| SI | Study Item |
| SL | Sidelink |
| SM | Session Management |
| SMF | SM Function |
| SRC | Source or SOURCE |
| TCP | Transmission Control Protocol |
| TEID or TE-ID | Tunnel Endpoint ID |
| TS | Technical Specification |
| TR | Technical Report |
| TX | Transmitter, Transmit |
| U2N | UE to Network |
| U2U | UE to UE |
| UDP | User Datagram Protocol |
| UE | User Equipment |
| UL | Uplink |
| UP | User Plane |
| Uu | Radio Interface between the base station (e.g. Node B) and the UE |
| V2X | Vehicle-to-X Communication |

Figure 51:
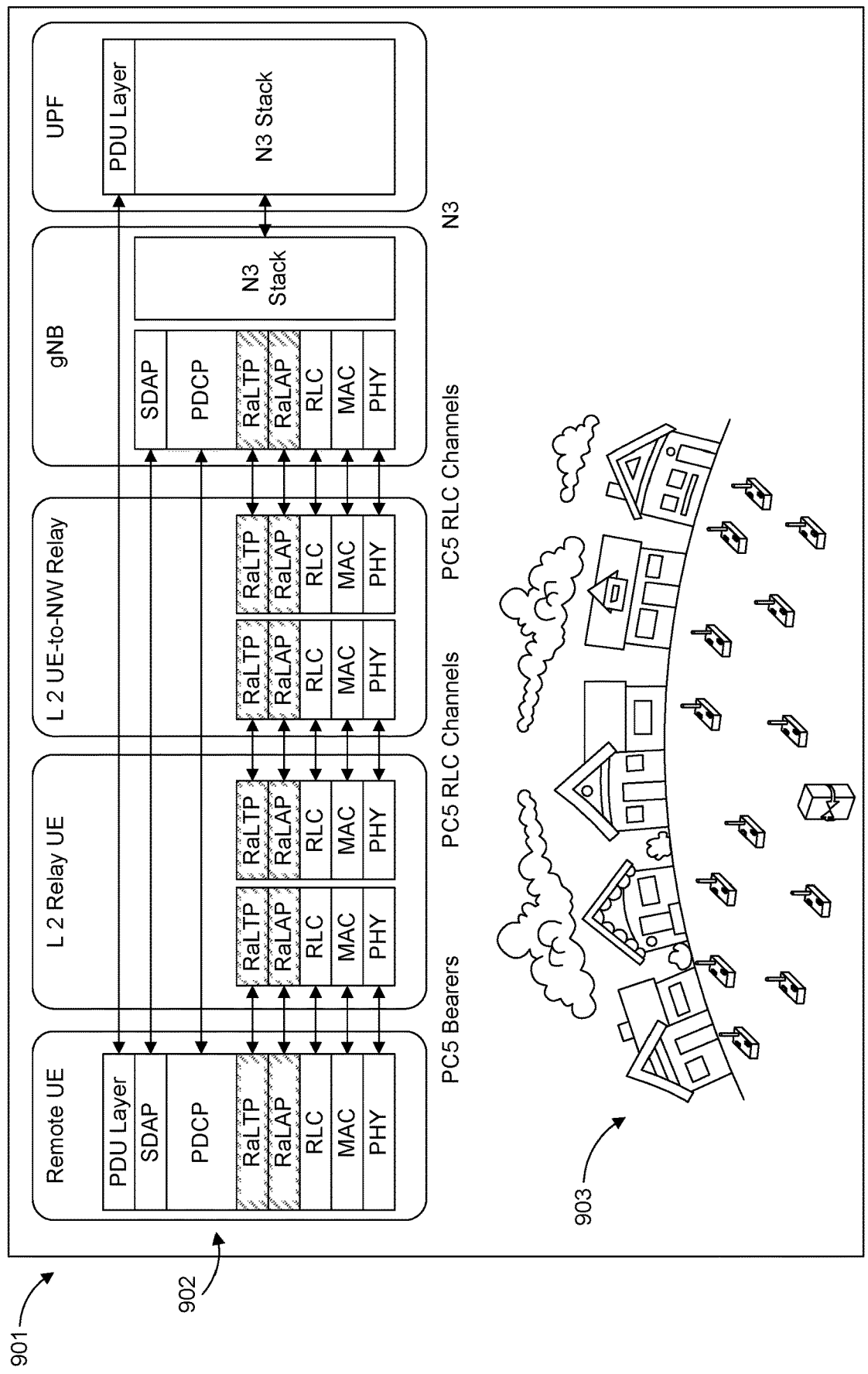
FIG. 51 illustrates an exemplary display (e.g., graphical user interface) that may be generated based on the methods, systems, and devices of sidelink adaptation protocol for remote UE connectivity.

FIG. 51 illustrates an exemplary display (e.g., graphical user interface) that may be generated based on the methods, systems, and devices of sidelink adaptation protocol for remote UE connectivity, as discussed herein. Display interface 901 (e.g., touch screen display) may provide text in block 902 associated with of sidelink adaptation protocol for remote UE connectivity, such as sidelink adaptation related parameters, method flow, and sidelink adaptation protocol associated current conditions. Progress of any of the steps (e.g., sent messages or success of steps) discussed herein may be displayed in block 902. In addition, graphical output 902 may be displayed on display interface 901. Graphical output 903 may be the topology of the devices implementing the methods, systems, and devices of sidelink adaptation protocol for remote UE connectivity, a graphical output of the progress of any method or systems discussed herein, or the like.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 52A:
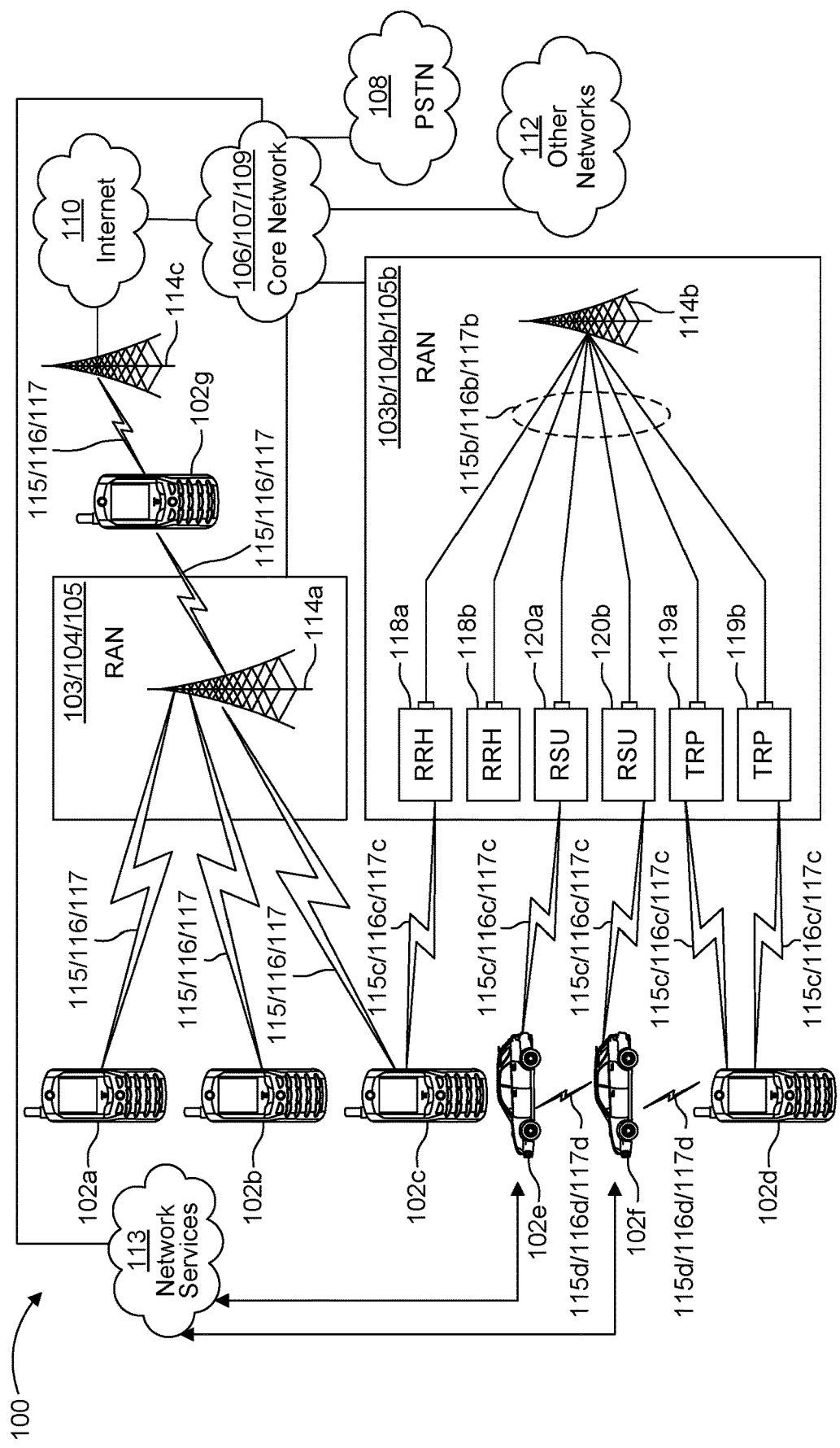
FIG. 52A illustrates an example communications system.

FIG. 52A illustrates an example communications system 100 in which the methods and apparatuses of sidelink adaptation protocol for remote UE connectivity, such as the systems and methods illustrated in FIG. 5 through FIG. 50 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/ 105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 52A, FIG. 52B, FIG. 52C, FIG. 52D, FIG. 52E, or FIG. 52F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 52A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/ 105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of sidelink adaptation protocol for remote UE connectivity, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/ 117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/ 116d/117d, such as Sidelink communication, which may be any suitable wireless communication link (e.g., radio frequency (RF), microwave, infrared (IR), ultraviolet (UV), visible light, cmWave, mmWave, etc.). The air interface 115d/116d/117d may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and RSUs 120a, 120b, in the RAN 103b/104b/105b and the WTRUs 102c, 102d, 102e, 102f, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114a and the WTRUs 102a, 102b, 102c, or RRHs 118a, 118b, TRPs 119a, 119b, or RSUs 120a, 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) or LTE-Advanced (LTE-A). In the future, the air interface 115/116/117 or 115c/116c/117c may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114a in the RAN 103/104/105 and the WTRUs 102a, 102b, 102c, and 102g or RRHs 118a, 118b, TRPs 119a, 119b or RSUs 120a, 120b in the RAN 103b/104b/105b and the WTRUs 102c, 102d, 102e, 102f may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 52A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of sidelink adaptation protocol for remote UE connectivity, as disclosed herein. In an example, the base station 114c and the WTRUs 102, e.g., WTRU 102e, may implement a radio technology such as IEEE 802.11 to establish a wireless local area network (WLAN). similarly, the base station 114c and the WTRUs 102d, may implement a radio technology such as IEEE 802.15 to establish a wireless personal area network (WPAN). In yet another example, the base station 114c and the WTRUs 102, e.g., WTRU 102e, may utilize a cellular-based RAT (e.g., WCDMA, CDMA2000, GSM, LTE, LTE-A, NR, etc.) to establish a picocell or femtocell. As shown in FIG. 52A, the base station 114c may have a direct connection to the Internet 110. Thus, the base station 114c may not be required to access the Internet 110 via the core network 106/107/109.

The RAN 103/104/105 or RAN 103b/104b/105b may be in communication with the core network 106/107/109, which may be any type of network configured to provide voice, data, messaging, authorization and authentication, applications, or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 52A, it will be appreciated that the RAN 103/104/105 or RAN 103b/104b/105b or the core network 106/107/109 may be in direct or indirect communication with other RANs that employ the same RAT as the RAN 103/104/105 or RAN 103b/104b/105b or a different RAT. For example, in addition to being connected to the RAN 103/104/105 or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102a, 102b, 102c, 102d, 102e to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links for implementing methods, systems, and devices of sidelink adaptation protocol for remote UE connectivity, as disclosed herein. For example, the WTRU 102g shown in FIG. 52A may be configured to communicate with the base station 114a, which may employ a cellular-based radio technology, and with the base station 114c, which may employ an IEEE 802 radio technology.

Although not shown in FIG. 52A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115c/116c/117c may equally apply to a wired connection.

Figure 52B:
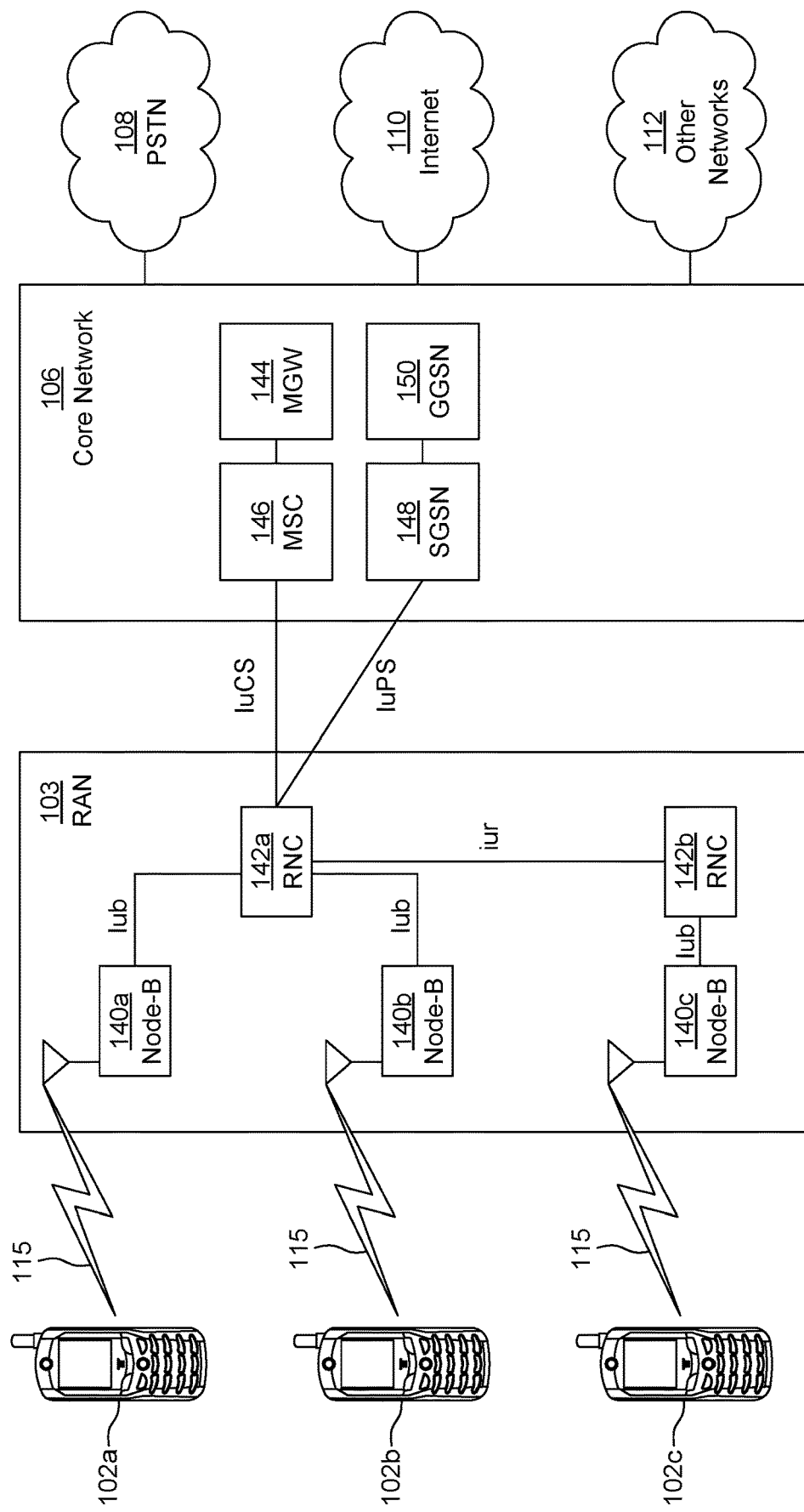
FIG. 52B illustrates an exemplary system that includes RANs and core networks.

FIG. 52B is a system diagram of an example RAN 103 and core network 106 that may implement methods, systems, and devices of sidelink adaptation protocol for remote UE connectivity, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 52B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 52B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 52B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 52C:
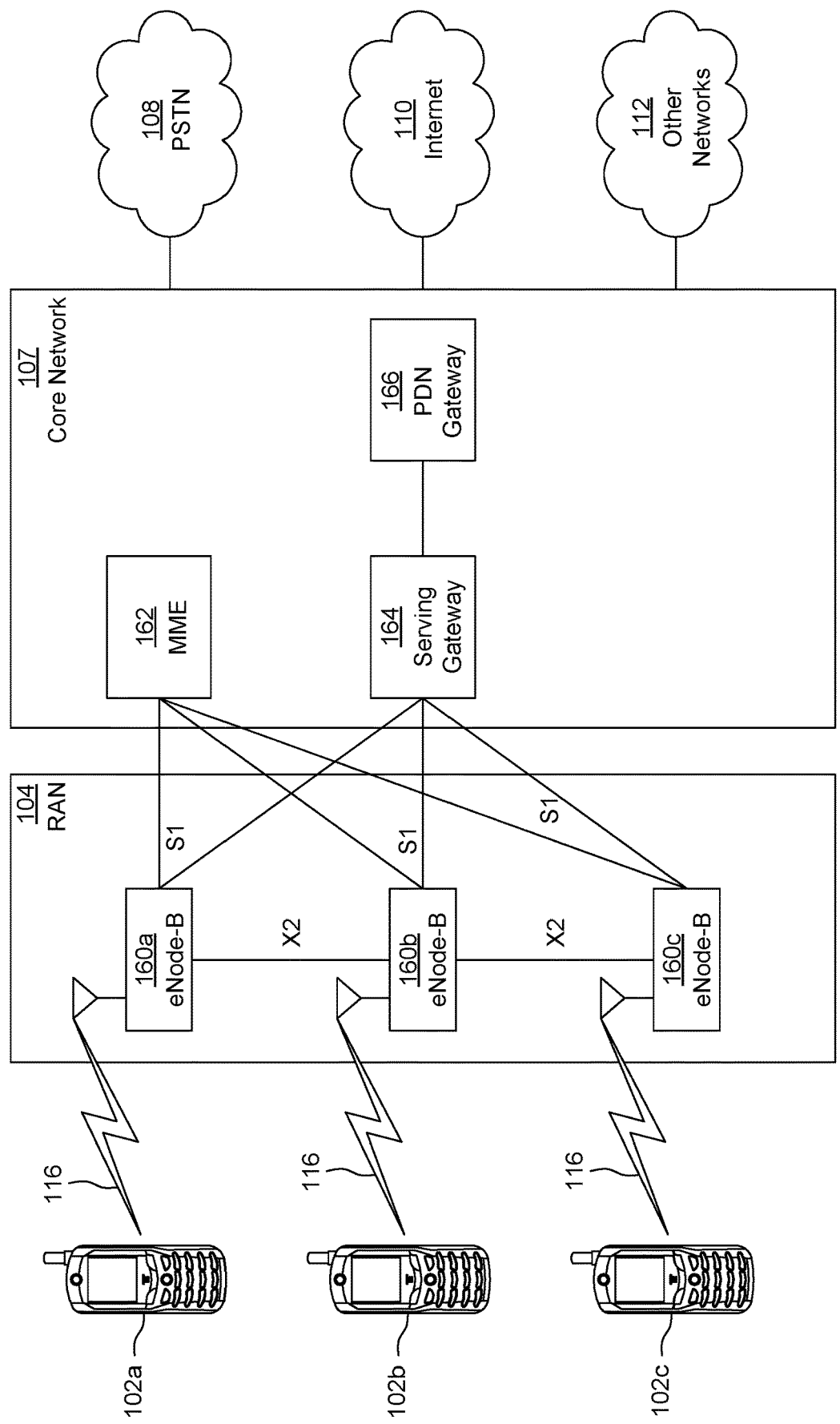
FIG. 52C illustrates an exemplary system that includes RANs and core networks.

FIG. 52C is a system diagram of an example RAN 104 and core network 107 that may implement methods, systems, and devices of sidelink adaptation protocol for remote UE connectivity, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 52C, the eNode-Bs 160a, 160b, and 160c may communicate with one another over an X2 interface.

The core network 107 shown in FIG. 52C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 52D:
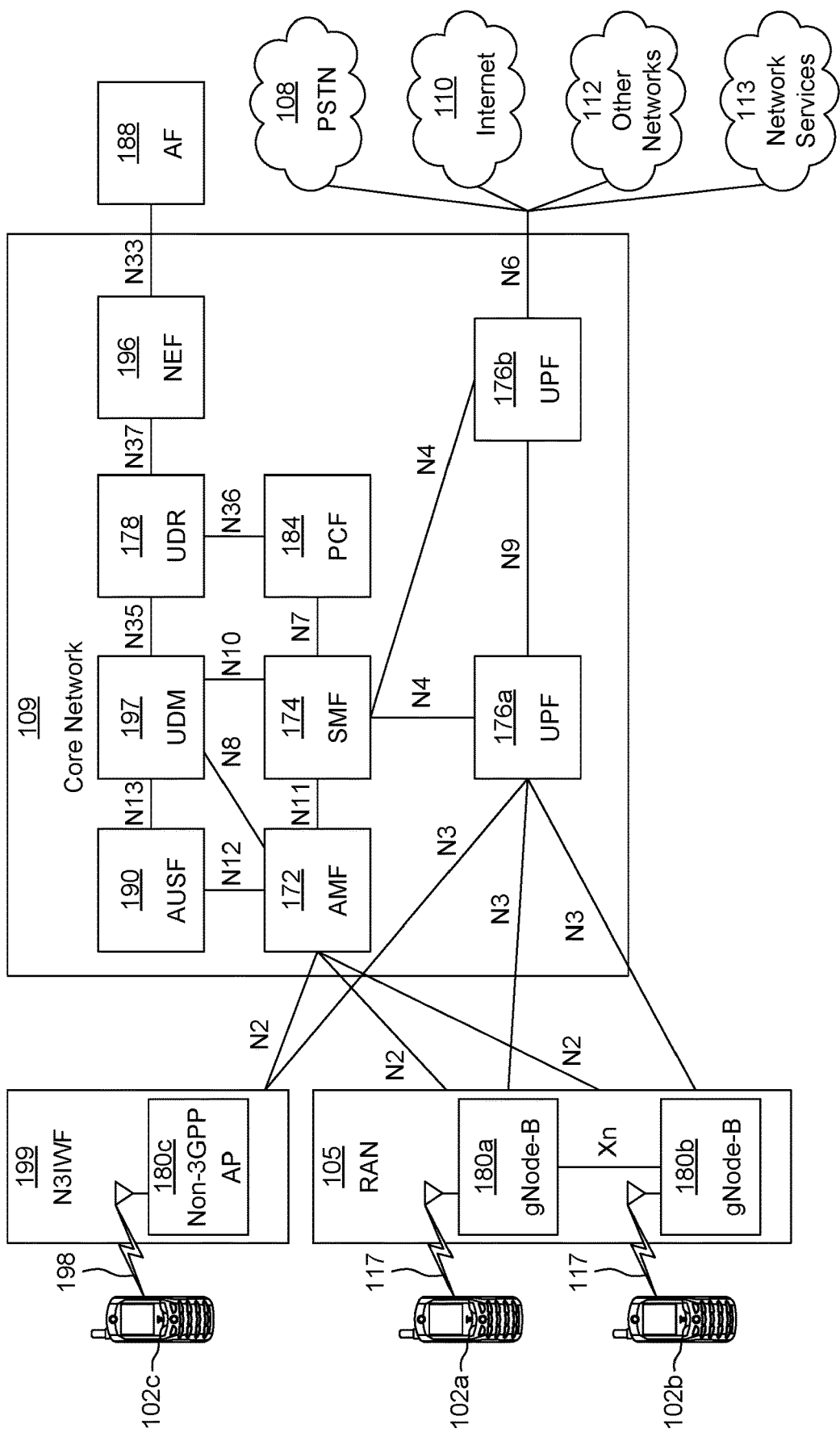
FIG. 52D illustrates an exemplary system that includes RANs and core networks.

FIG. 52D is a system diagram of an example RAN 105 and core network 109 that may implement methods, systems, and devices of sidelink adaptation protocol for remote UE connectivity, as disclosed herein. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117.

When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 52D, the gNode-Bs 180a and 180b may communicate with one another over an Xn interface, for example.

The core network 109 shown in FIG. 52D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 52G.

In the example of FIG. 52D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 52D shows that network functions directly connect with one another, however, it should be appreciated that they may communicate via routing agents such as a diameter routing agent or message buses.

In the example of FIG. 52D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 52D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 52D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 52D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

The core network entities described herein and illustrated in FIG. 52A, FIG. 52C, FIG. 52D, or FIG. 52E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 52A, FIG. 52B, FIG. 52C, FIG. 52D, or FIG. 52E are provided by way of example only, and it is understood that the subject matter disclosed and claimed herein may be embodied or implemented in any similar communication system, whether presently defined or defined in the future.

Figure 52E:
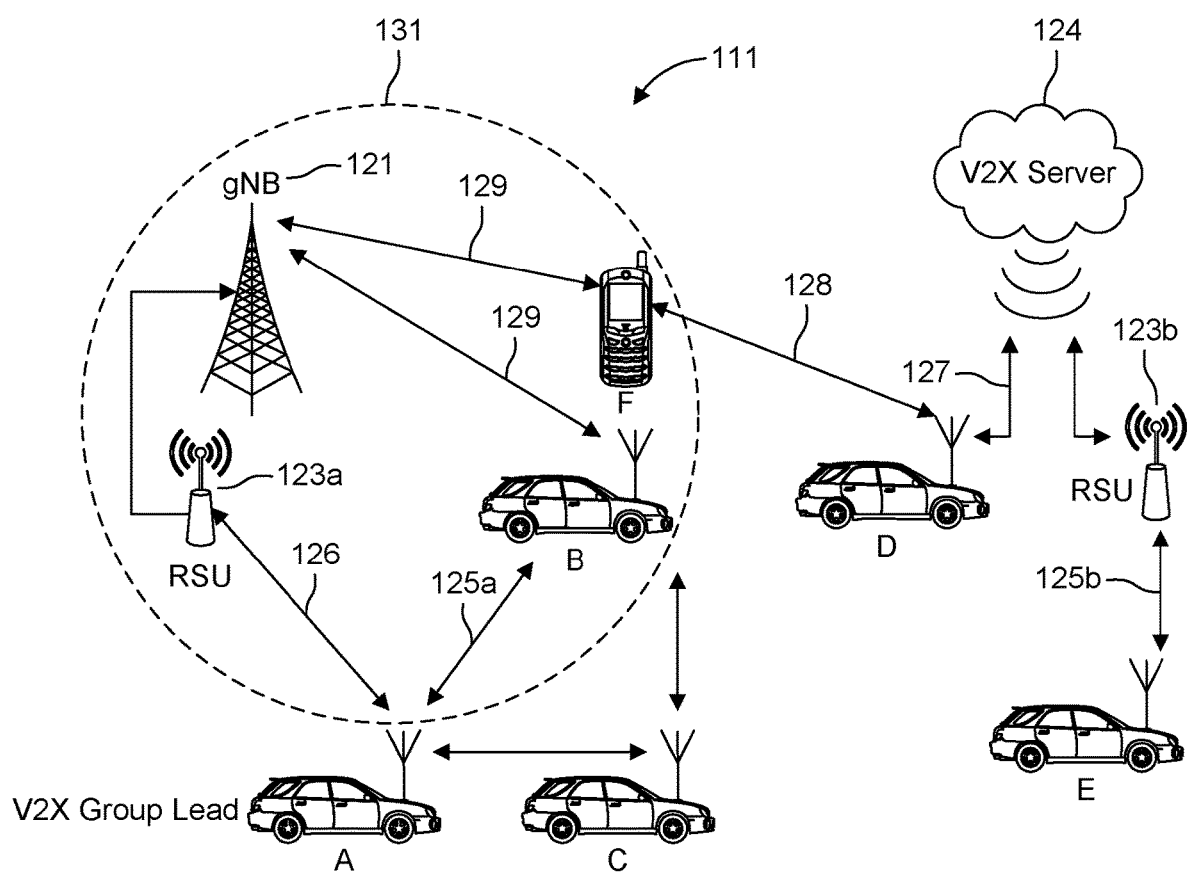
FIG. 52E illustrates another example communications system.

FIG. 52E illustrates an example communications system 111 in which the systems, methods, apparatuses that implement sidelink adaptation protocol for remote UE connectivity, described herein, may be used. Communications system 111 may include Wireless Transmit/Receive Units (WTRUs) A, B, C, D, E, F, a base station gNB 121, a V2X server 124, and Road Side Units (RSUs) 123*a* and 123*b*. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 52E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 52E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 52F:
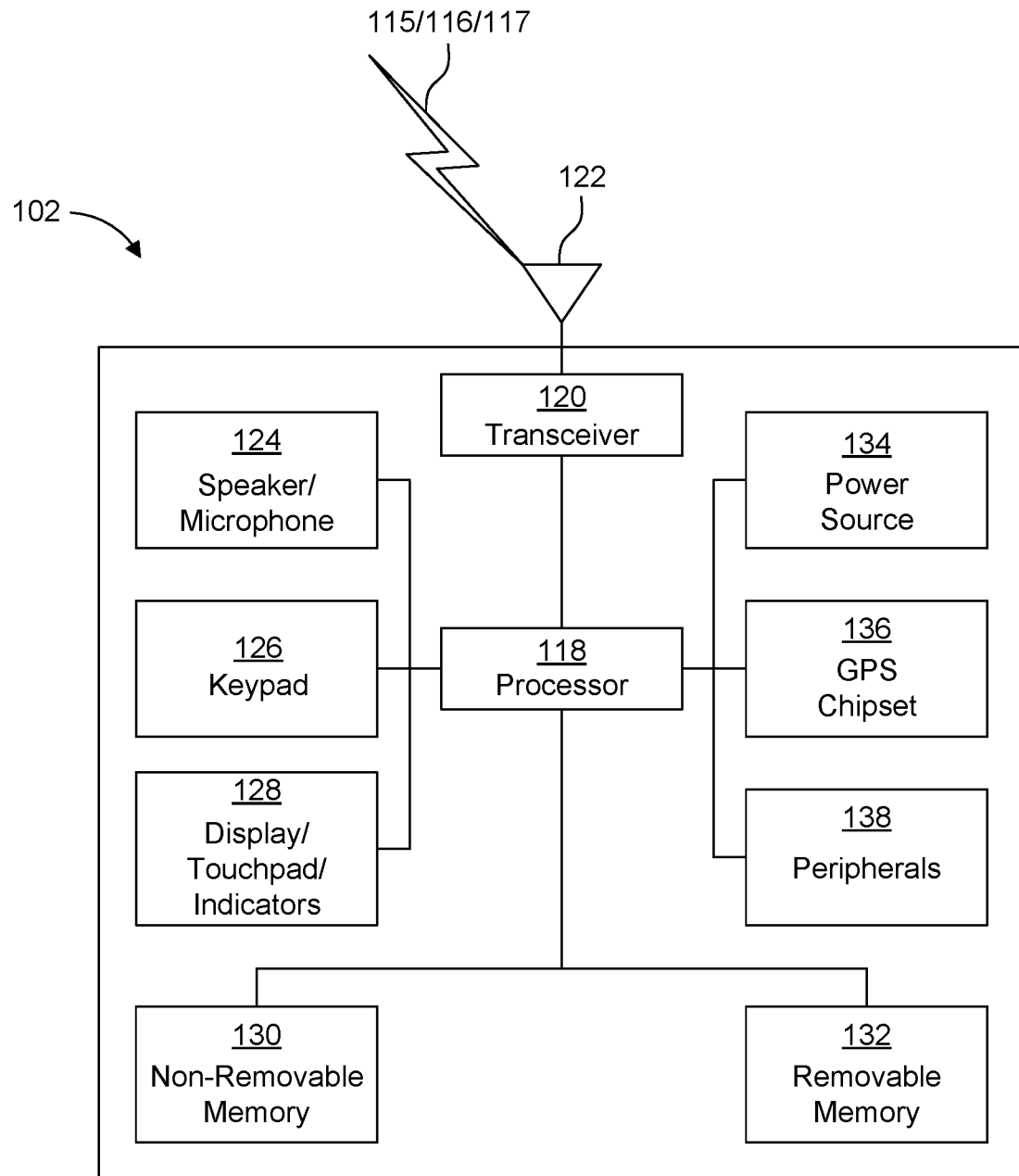
FIG. 52F is a block diagram of an example apparatus or device, such as a WTRU.

FIG. 52F is a block diagram of an example apparatus or device WTRU 102 that may be configured for wireless communications and operations in accordance with the systems, methods, and apparatuses that implement sidelink adaptation protocol for remote UE connectivity, described herein, such as a WTRU 102 of FIG. 52A, FIG. 52B, FIG. 52C, FIG. 52D, or FIG. 52E, or FIG. 5-FIG. 50 (e.g., remote UE 201, relay UE 202, UE-to-NW relay 203, base station 204, AMF 206, SMF 207, relay UE 208, remote UE 209, UPF 210, or relay UE 211). As shown in FIG. 52F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 52F and may be an exemplary implementation that performs the disclosed systems and methods for sidelink adaptation protocol for remote UE connectivity described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 52F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 52A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 52F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the sidelink adaptation protocol for remote UE connectivity in some of the examples described herein are successful or unsuccessful, or otherwise indicate a status of sidelink adaptation protocol for remote UE connectivity and associated components. The control lighting patterns, images, or colors on the display or indicators 128 may be reflective of the status of any of the method flows or components in the FIG.'S illustrated or discussed herein (e.g., FIG. 5-FIG. 50, etc.). Disclosed herein are messages and procedures of sidelink adaptation protocol for remote UE connectivity. The messages and procedures may be extended to provide interface/API for users to request resources via an input source (e.g., speaker/microphone 124, keypad 126, or display/touchpad/indicators 128) and request, configure, or query sidelink adaptation protocol for remote UE connectivity related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 52G:
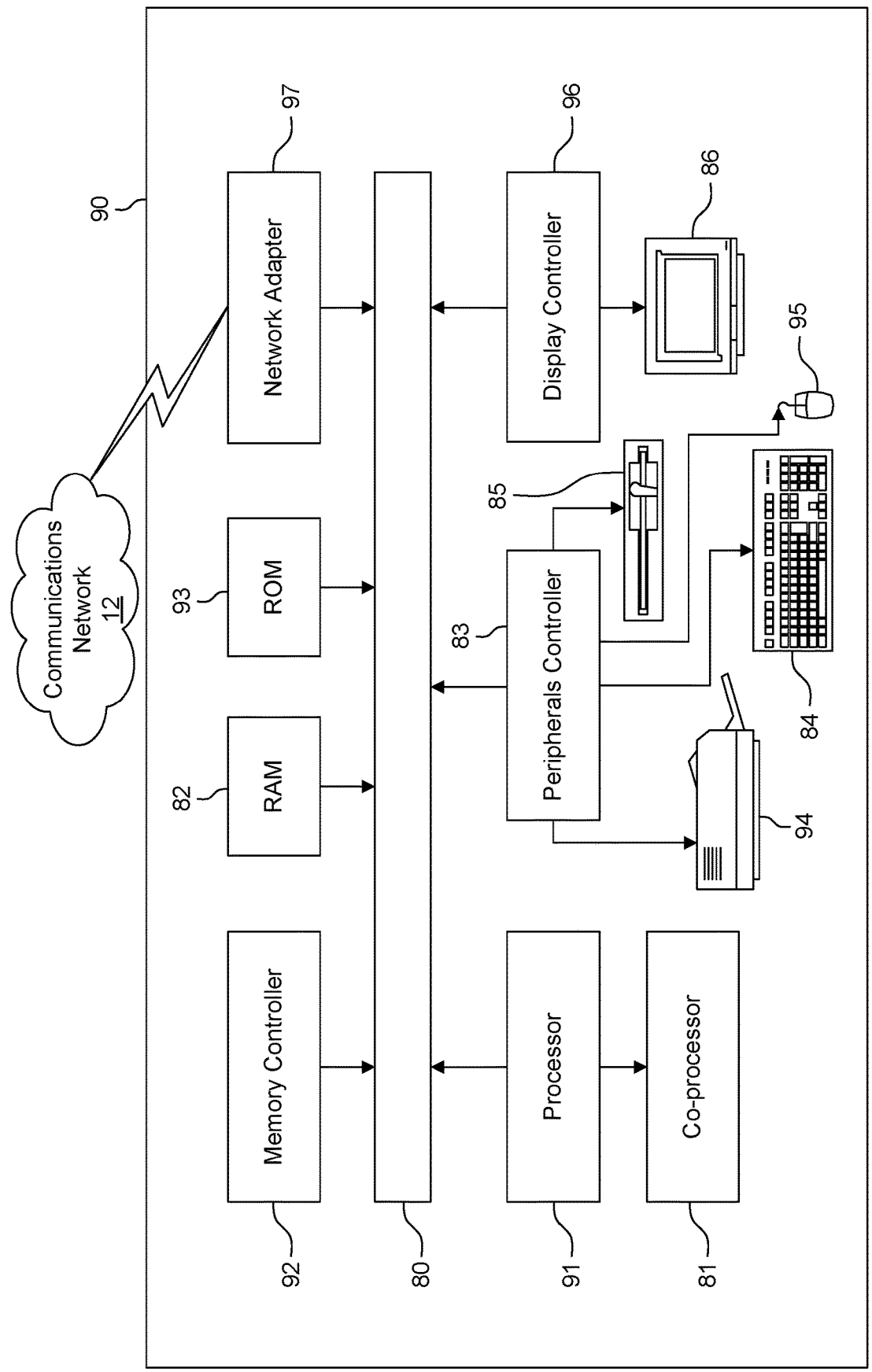
FIG. 52G is a block diagram of an exemplary computing system.

FIG. 52G is a block diagram of an exemplary computing system 90 in which one or more apparatuses of the communications networks illustrated in FIG. 52A, FIG. 52C, FIG. 52D and FIG. 52E as well as sidelink adaptation protocol for remote UE connectivity, such as the systems and methods illustrated in FIG. 5 through FIG. 50 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for sidelink adaptation protocol for remote UE connectivity, such as receiving messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 52A, FIG. 52B, FIG. 52C, FIG. 52D, or FIG. 52E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—sidelink adaptation protocol for remote UE connectivity—as illustrated in the Figures, specific terminology is employed for the sake of clarity. The claimed subject matter, however, is not intended to be limited to the specific terminology so selected.

The various techniques described herein may be implemented in connection with hardware, firmware, software, or where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter (e.g., option 1 and option 2) may include other examples that occur to those skilled in the art (e.g., skipping steps, combining steps, or adding steps between exemplary methods disclosed herein).

Methods, systems, and apparatuses, among other things, as described herein may provide for controlling (e.g., using) intra-device packet routing data link layer (DLL) protocol (RaLTP) for packet routing to data link upper layer protocols based on a RaLTP DLL routing entries; controlling inter-device packet routing DLL protocol (RaLAP) for packet routing between the first device and a second device based on a RaLAP DLL routing entries; controlling Quality of Service of packet transfer function based on RaLAP or RaLTP DLL QoS entries; performing inter-device packet routing actions on a packet based on a first RaLAP address or RaLAP path identity or a first RaLTP identity; performing intra-device packet routing actions on a packet based on a first RaLAP address or first RaLTP identity; or performing Quality of Service actions for a packet transfer based a first RaLAP address and first RaLTP identity, or an upper layer protocol identity. Methods, systems, and apparatuses, among other things, as described herein may provide for receiving from a third device, information indicating parameters. All combinations in this paragraph and the following paragraph (including the removal or addition of steps) are contemplated in a manner that is consistent with the other portions of the detailed description.

Methods, systems, and apparatuses, among other things, as described herein may provide for using relay link tunneling protocol (RaLTP) for packet routing to data link upper layer protocols based on RaLTP data link layer (DLL) routing entries, wherein RaLTP is located in DLL and functions to perform intra-device packet routing; and performing intra-device packet routing actions on a packet based on a first relay link adaptation protocol (RaLAP) address or first RaLTP identity. Methods, systems, and apparatuses, among other things, as described herein may provide for using relay link adaptation protocol (RaLAP) for packet routing between a first device and a second device based on a RaLAP data link layer (DLL) routing entries, wherein the RaLAP is located in the DLL and functions to perform inter-device packet routing; and performing inter-device packet routing actions on a packet based on a first RaLAP address or RaLAP path identity, and a first Relay Link Tunneling Protocol (RaLTP) identity. RaLAP—located in DLL and functions to perform inter-device packet routing. RaLTP-located in DLL and functions to perform intra-device packet routing. Methods, systems, and apparatuses, among other things, as described herein may provide for using Quality of Service of packet transfer function based on RaLAP or Relay Link Tunneling Protocol (RaLTP) DLL QoS entries and performing Quality of Service actions for a packet transfer based on a first RaLAP address or first RaLTP identity, and an upper layer protocol identity. All combinations in this paragraph and the below (including the removal or addition of steps) are contemplated in a manner that is consistent with the other portions of the detailed description.

Methods, systems, and apparatuses, among other things, as described herein may provide for using relay link tunneling protocol (RaLTP) for packet routing to data link upper layer protocols based on RaLTP data link layer (DLL) routing entries, wherein RaLTP is located in DLL and functions to perform intra-device packet routing; and performing intra-device packet routing actions on a packet based on a first relay link adaptation protocol (RaLAP) address or first RaLTP identity. Methods, systems, and apparatuses, among other things, as described herein may provide for using inter-device packet routing DLL protocol (RaLAP) for packet routing between the first device and a second device based on a RaLAP DLL routing entries; and performing inter-device packet routing actions on a packet based on a first RaLAP address or RaLAP path identity, and a first Relay Link Tunneling Protocol (RaLTP) identity. Methods, systems, and apparatuses, among other things, as described herein may provide for using Quality of Service of packet transfer function based on RaLAP and Relay Link Tunneling Protocol (RaLTP) DLL QoS entries; and performing Quality of Service actions for a packet transfer based on a first RaLAP address or first RaLTP identity, and an upper layer protocol identity. Methods, systems, and apparatuses, among other things, as described herein may provide for receiving first information, second information, or second information. First information indicating one or more first parameters for controlling intra-device packet routing, controlling inter-device packet routing, or controlling QoS for transfer of a packet from upper layer protocol above RaLAP and RaLTP to next hop, wherein the one or more first parameters comprise upper layer protocol IDentity (ID), RaLAP routing ID that includes RaLAP address and RaLAP path ID, translated RaLAP ID that includes a translated RaLAP address and a translated RaLAP path ID, RaLTP ID, translated RaLTP ID, next hop RaLAP address, egress link ID, or egress RLC Channel ID. Second information indicating one or more second parameters for controlling intra-device packet routing, controlling inter-device packet routing, or controlling QoS for transfer of a packet from ingress link RaLAP and RaLTP to next hop, wherein the one or more second parameters comprise RaLAP ID that includes RaLAP address and RaLAP path identity, translated RaLAP ID that includes a translated RaLAP address and a translated RaLAP path identity, RaLTP ID, translated RaLTP ID, next hop RaLAP address, ingress link ID, ingress RLC Channel ID, egress link ID, or egress RLC Channel ID. Third information indicating one or more third parameters for controlling intra-device packet routing, controlling inter-device packet routing of a packet from ingress link RaLAP and RaLTP to upper layer protocol or local link, wherein the one or more third parameters comprise RaLAP address and RaLAP path ID, RaLTP ID, or Upper layer protocol ID. All combinations in this paragraph and below (including the removal or addition of steps) are contemplated in a manner that is consistent with the other portions of the detailed description.

The one or more first parameters, the one or more second parameters, or the one or more third parameters are preconfigured or specified by standards. The first RaLTP identity is an identity of a bearer, an identity of a tunnel associated with a bearer, an identity of a tunnel associated with an upper layer protocol above the intra-device routing DLL protocol, or an identity of an upper layer protocol above the intra-device routing DLL protocol. The upper layer protocol may be a Packet Data Convergence Protocol (PDCP). The tunnel may be between a first device and a second device. The tunnel may be a multi-hop tunnel. The performing intra-device packet routing actions may include: selecting from the plurality of entries for control of inter-device packet routing, control of intra-device packet routing, or control of QoS for transfer of a packet from upper layer protocol above RaLAP and RaLTP to next hop, the entry with its upper layer protocol identity corresponds to the upper layer protocol identity of this packet; selecting the RaLTP identity in the entry selected above as the first RaLTP entity; or including the first RaLTP identity into the Tunnel End Point ID (TEID) field of this packet header. The performing inter-device packet routing actions may include: selecting from the plurality of entries for control of inter-device packet routing, control of intra-device packet routing, or control of QoS for transfer of a packet from upper layer protocol above RaLAP and RaLTP to next hop, the entry with its upper layer protocol identity corresponds to the upper layer protocol identity of this packet; selecting the RaLAP address from the routing identity in the entry selected above as the first RaLAP address; selecting the path identity from the routing identity in the entry selected above if the path identity is available; or including into the destination field of this packet header the first RaLAP address and if available the path identity. All combinations in this paragraph and below (including the removal or addition of steps) are contemplated in a manner that is consistent with the other portions of the detailed description.

The performing Quality of Service actions comprise selecting from the plurality of entries for control of inter-device packet routing, control of intra-device packet routing, or control of QoS for transfer of a packet from upper layer protocol above RaLAP and RaLTP to next hop, the entry with its upper layer protocol identity corresponds to the upper layer protocol identity of this packet; selecting the egress link ID and the egress RLC channel ID in the entry selected above; or submitting the packet to the RLC entity that corresponds to the selected egress link ID and the selected egress RLC channel ID. The performing inter-device packet routing actions comprise determining the first RaLTP identity as the identity in the Tunnel End point ID (TEID) field of this packet header; determining the first RaLAP address and the RaLAP path identity as the address and path identity in the destination field of this packet header; selecting from the plurality of entries for control of inter-device packet routing, control of intra-device packet routing, or control of QoS for transfer of a packet from ingress link RaLAP and RaLTP to next hop, the entry with its RaLAP address corresponds to the first RaLAP address, and whose egress link corresponding to the Next hop RaLAP address is available and its RaLTP identity corresponds to the first RaLTP identity; selecting the egress link corresponding to the next hop RaLAP address in the entry selected above; selecting the translated RaLAP address in the selected entry as the first RaLAP address if RaLAP address translation applies, and including the first RaLAP address into the destination field of this packet header; or selecting the translated RaLTP identity in the selected entry as the first RaLTP identity if RALTP identity translation applies, and including the first RaLTP identity into the TEID field of this packet header. All combinations in this paragraph and below (including the removal or addition of steps) are contemplated in a manner that is consistent with the other portions of the detailed description.

The performing Quality of Service actions comprise: selecting from the plurality of entries for control of inter-device packet routing, control of intra-device packet routing, or control of QoS for transfer of a packet from upper layer protocol above RaLAP and RaLTP to next hop, the entry with its upper layer protocol identity corresponds to the upper layer protocol identity of this packet; selecting the egress link ID and the egress RLC channel ID in the entry selected above; or submitting the packet to the RLC entity that corresponds to the selected egress link ID and the selected egress RLC channel ID. The performing inter-device packet routing actions comprise determining the first RaLTP identity as the identity in the Tunnel End point ID (TEID) field of this packet header; determining the first RaLAP address and the RaLAP path identity as the address and path identity in the destination field of this packet header; selecting from the plurality of entries for control of inter-device packet routing, control of intra-device packet routing, or control of QoS for transfer of a packet from ingress link RaLAP and RaLTP to next hop, the entry with its RaLAP address corresponds to the first RaLAP address, and whose egress link corresponding to the Next hop RaLAP address is available and its RaLTP identity corresponds to the first RaLTP identity; selecting the egress link corresponding to the next hop RaLAP address in the entry selected above; selecting the translated RaLAP address in the selected entry as the first RaLAP address if RaLAP address translation applies, and including the first RaLAP address into the destination field of this packet header; or selecting the translated RaLTP identity in the selected entry as the first RaLTP identity if RALTP identity translation applies, and including the first RaLTP identity into the TEID field of this packet header. The performing Quality of Service actions comprise: selecting from the plurality of entries for control of inter-device packet routing, control of intra-device packet routing or control of QoS for transfer of a packet from ingress link RaLAP and RaLTP to next hop, the entry with its ingress link ID corresponds to this packet ingress link, its ingress RLC channel ID correspond to this packet ingress RLC channel, its egress link ID corresponds to selected egress link; selecting the egress RLC channel corresponding to the egress RLC channel ID of the selected entry above; or submitting this packet to the RLC entity that corresponds to the selected egress link ID and the selected RLC channel ID. All combinations in this paragraph and below (including the removal or addition of steps) are contemplated in a manner that is consistent with the other portions of the detailed description.

The performing intra-device packet routing actions comprise: determining the first RaLTP identity as the identity in the Tunnel End point ID (TEID) field of this packet header; determining the first RaLAP address and the RaLAP path identity as the address and path identity in the destination field of this packet header; selecting from the plurality of entries for control of inter-device packet routing, control of intra-device packet routing, or control of QoS for transfer of a packet from ingress link RaLAP and RaLTP to upper layer or local link, the entry with its RaLAP address corresponds to the first RaLAP address, and its RaLTP identity corresponds to the first RaLTP identity; selecting the upper layer protocol identity in the selected entry; removing the RaLAP and RaLTP headers from the packet; or submitted the packet without the RaLAP header and without RaLTP header to the upper layer protocol that corresponds to the selected upper layer protocol identity. The first device and the second device exchange: end-to-end keep-alive messages, end-to-end radio link failure (RLF) indication message, or end-to-end flow control message. The first device and the second device are connected through one or more PC5 interface links. The first device and an another device exchange: hop-by-hop keep-alive message, with the another device being on the communication path between the first device and the second device; hop-by-hop RLF indication, with the another device being on the communication path between the first device and the second device; or hop-by-hop flow control message, with the another device being on the communication path between the first device and the second device. Selecting the first entry egress link when available corresponding to the next hop RaLAP address in the first entry. Including into a destination field of the second packet header the first RaLAP address if not already included, and including into a path field of the second packet header, the first path identity when available and not already included. The first entry egress link corresponds to a selected egress link. Submitting the third packet to an RLC entity that corresponds to the egress link ID and the egress RLC channel ID. The first entry egress link corresponds to a selected egress link. The address in the destination field of the second packet header, and the first path identity as the path identity in the path field of the second packet header. The first path identity as the path identity in the path field of the first packet header. Selecting a first entry from a plurality of entries for control of inter-device packet routing, control of intra-device packet routing, or control of QoS from ingress link RaLAP and RaLTP to upper layer or local link, the first entry RaLAP address corresponds to the first RaLAP address, and first entry RaLTP identity corresponds to the first path identity. All combinations in this paragraph and the above paragraphs (including the removal or addition of steps) are contemplated in a manner that is consistent with the other portions of the detailed description.

What is claimed is:

1. A wireless transmit/receive unit (WTRU) comprising:
a processor; and
a memory coupled with the processor, the memory storing executable instructions that when executed by the processor cause the processor to effectuate operations comprising:
receiving, from a network node, configuration information for a remote WTRU, wherein the configuration information comprises an identity of the remote WTRU and an identity of a radio link control (RLC) channel associated with the remote WTRU;
receiving a data packet from the network node;
determining information associated with the data packet, wherein the information associated with the data packet comprises a WTRU identifier (ID) and a bearer ID;
based on the information associated with the data packet and on the configuration information received from the network node, determining an egress communication link and an RLC channel of the egress communication link; and
submitting the data packet to the determined RLC channel of the egress communication link for transmission to the remote WTRU.

2. The WTRU of claim 1, wherein the WTRU ID and the bearer ID are in a header of the data packet.

3. The WTRU of claim 1, wherein the WTRU is a relay WTRU.

4. The WTRU of claim 1, wherein the WTRU ID comprises a remote WTRU ID.

5. The WTRU of claim 1, wherein the information associated with the data packet comprises configuration information that is provided to a plurality of nodes through radio resource control signaling.

6. A method comprising:
receiving, from a network node, configuration information for a remote wireless transmit/receive unit (WTRU), wherein the configuration information comprises an identity of the remote WTRU and an identity of a radio link control (RLC) channel associated with the remote WTRU;
receiving a data packet from the network node;
determining information associated with the data packet, wherein the information associated with the data packet comprises a WTRU identifier (ID) and a bearer ID;
based on the information associated with the data packet and on the configuration information received from the network node, determining an egress communication link and an RLC channel of the egress communication link; and
submitting the data packet to the determined RLC channel of the egress communication link for transmission to the remote WTRU.

7. The method of claim 6, wherein the WTRU ID and the bearer ID are in a header of the data packet.

8. The method of claim 6, wherein a WTRU performing the method is a relay WTRU.

9. The method of claim 6, wherein the WTRU ID comprises a remote WTRU ID.

10. The method of claim 6, wherein the information associated with the data packet comprises configuration information that is provided to a plurality of nodes through radio resource control signaling.

11. A non-transitory computer readable storage medium storing computer executable instructions that when executed by a computing device cause the computing device to effectuate operations comprising:
receiving, from a network node, configuration information for a remote wireless transmit/receive unit (WTRU), wherein the configuration information comprises an identity of the remote WTRU and an identity of a radio link control (RLC) channel associated with the remote WTRU;
receiving a data packet from the network node;
determining information associated with the data packet, wherein the information comprises a WTRU identifier (ID) and a bearer ID;
based on the information associated with the data packet and on the configuration information received from the network node, determining an egress communication link and an RLC channel of the egress communication link; and
submitting the data packet to the determined RLC channel of the egress communication link for transmission to the remote WTRU.

12. The non-transitory computer readable storage medium of claim 11, wherein the WTRU ID and the bearer ID are in a header of the data packet.

13. The non-transitory computer readable storage medium of claim 11, wherein the computing device comprises a WTRU that is a relay WTRU.

14. The non-transitory computer readable storage medium of claim 11, wherein the WTRU ID comprises a remote WTRU ID.

15. The WTRU of claim 1, wherein the configuration information for the remote WTRU is received via a Radio Resource Control (RRC) signaling.

16. The WTRU of claim 1, wherein the identity of the RLC channel is an identity of a sidelink (SL) RLC channel.

17. The WTRU of claim 1, wherein the network node is a base station.

18. The method of claim 6, wherein the configuration information for a remote WTRU is received via a Radio Resource Control (RRC) signaling.

19. The method of claim 6, wherein the identity of an RLC channel is an identity of a sidelink (SL) RLC channel.

20. The method of claim 6, wherein the network node is a base station.

* * * * *